US006886010B2

(12) United States Patent
Kostoff

(10) Patent No.: US 6,886,010 B2
(45) Date of Patent: Apr. 26, 2005

(54) METHOD FOR DATA AND TEXT MINING AND LITERATURE-BASED DISCOVERY

(75) Inventor: Ronald N. Kostoff, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 53 days.

(21) Appl. No.: 10/645,633

(22) Filed: Aug. 22, 2003

(65) Prior Publication Data

US 2004/0064438 A1 Apr. 1, 2004

Related U.S. Application Data

(60) Provisional application No. 60/414,416, filed on Sep. 30, 2002.

(51) Int. Cl.[7] .............................................. G06F 17/30
(52) U.S. Cl. ...................... 707/3; 707/4; 707/6; 707/10
(58) Field of Search ............................... 707/3, 4, 5, 6, 707/10, 100, 102

(56) References Cited

U.S. PATENT DOCUMENTS

| | | | | |
|---|---|---|---|---|
| 4,744,050 A | * | 5/1988 | Hirosawa et al. ............... | 704/4 |
| 5,440,481 A | * | 8/1995 | Kostoff et al. .................. | 707/5 |
| 5,745,602 A | | 4/1998 | Chen et al. | |
| 5,809,499 A | * | 9/1998 | Wong et al. .................... | 707/6 |
| 5,873,056 A | * | 2/1999 | Liddy et al. .................... | 704/9 |
| 6,119,114 A | | 9/2000 | Smajda | |
| 6,154,213 A | * | 11/2000 | Rennison et al. ........... | 715/854 |
| 6,253,169 B1 | | 6/2001 | Apte et al. | |
| 6,430,557 B1 | * | 8/2002 | Gaussier et al. ................ | 707/5 |
| 6,442,545 B1 | * | 8/2002 | Feldman et al. ............... | 707/6 |
| 6,519,602 B1 | * | 2/2003 | Sundaresan et al. ........ | 707/100 |
| 6,651,058 B1 | * | 11/2003 | Sundaresan et al. ........... | 707/6 |
| 6,687,696 B1 | * | 2/2004 | Hofmann et al. ............. | 707/6 |
| 6,735,592 B1 | * | 5/2004 | Neumann et al. ........... | 707/101 |

OTHER PUBLICATIONS

Greengrass, Ed, Inf'n Retrieval: An Overview. TR–R52–02–96, Nat'l Security Org'n, Feb. 20, 1997,pp 1–109.

* cited by examiner

Primary Examiner—Jean M. Corrielus
(74) Attorney, Agent, or Firm—Barry A. Edelberg; Charles H. Harris; Thomas E. McDonnell

(57) ABSTRACT

Text searching is achieved by techniques including phrase frequency analysis and phrase-co-occurrence analysis. In many cases, factor matrix analysis is also advantageously applied to select high technical content phrases to be analyzed for possible inclusion within a new query. The described techniques may be used to retrieve data, determine levels of emphasis within a collection of data, determine the desirability of conflating search terms, detect symmetry or asymmetry between two text elements within a collection of documents, generate a taxonomy of documents within a collection, and perform literature-based problem solving. (This abstract is intended only to aid those searching patents, and is not intended to limit the disclosure of claims in any manner.)

26 Claims, 4 Drawing Sheets

METHOD FOR DATA AND TEXT MINING AND LITERATURE-BASED DISCOVERY

This application claims the benefit of Provisional Application No. 60/414,416, filed Sep. 30, 2002.

BACKGROUND OF THE INVENTION

1. Field of the Invention

The present invention relates generally to literature searching and more specifically to the extraction of useful information from large text databases.

2. Description of the Background Art

Data mining is the extraction of useful information from any type of data. In modern context, it is the employment of sophisticated computer algorithms to extract useful information from large quantities of data. Text mining is an analogous procedure applied to large volumes of free unstructured text. S&T (Science and Technology) text mining is the application of text mining to highly detailed technical material. It is the primary technique for extracting useful information from the global technology literature.

The added complexity of text mining relative to data mining stems from the multiple meanings and interpretation of language, and their intrinsic dependence on context. The further complexity of S&T text mining relative to text mining of non-technical material arises from the need to generate a lexicon for each technical area mined, and the need to have technical experts participate in the analysis of the technical material.

There are three major components of S&T text mining.
1) Information Retrieval
2) Information Processing
3) Information Integration Information retrieval is the selection of relevant documents or text segments from source text databases for further processing. Information processing is the application of bibliometric and computational linguistics and clustering techniques to the retrieved text to typically provide ordering, classification, and quantification to the formerly unstructured material. Information integration combines the computer output with the human cognitive processes to produce a greater understanding of the technical areas of interest.

Underlying these three text mining components are five conditions required for high quality text mining. The quality of a text mining study cannot exceed the quality of any of these conditions.

1) A large fraction of the S&T conducted globally must be documented (INFORMATION COMPREHENSIVENESS).

2) The documentation describing each S&T project must have sufficient information content to satisfy the analysis requirements (INFORMATION QUALITY).

3) A large fraction of these documents must be retrieved for analysis (INFORMATION RETRIEVAL).

4) Techniques and protocols must be available for extracting useful information from the retrieved documents (INFORMATION EXTRACTION).

5) Technical domain and information technology experts must be closely involved with every step of the information retrieval and extraction processes (TECHNICAL EXPERTISE).

The approaches presently used by the majority of the technical community to address all five of these requirements have serious deficiencies.

1) Information Comprehensiveness is limited because there are many more disincentives than incentives for publishing S&T results. Except for academic researchers working on unclassified and non-proprietary projects, the remainder of S&T performers have little motivation for documenting their output.

a) For truly breakthrough research, from which the performer would be able to profit substantially, the incentives are to conceal rather than reveal.

b) For research that aims to uncover product problems, there is little motivation (from the vendor, sponsor, or developer) to advertise or amplify the mistakes made or the shortcuts taken.

c) For highly focused S&T, the objective is to transition to a saleable product as quickly as possible; no rewards are forthcoming for documentation, and the time required for documentation reduces the time available for development.

Therefore, only a very modest fraction of S&T performed ever gets documented. Of the performed S&T that is documented, only a very modest fraction is included in the major databases. The contents of these knowledge repositories are determined by the database developers, not the S&T sponsors or the potential database users.

Of the documented S&T in the major databases, only a very modest fraction is realistically accessible by the users. The databases are expensive to access, not very many people know of their existence, the interface formats are not standardized, and many of the search engines are not user-friendly.

Insufficient documentation is not an academic issue; in a variety of ways, it retards the progress of future S&T and results in duplication.

2) Information Quality is limited because uniform guidelines do not exist for contents of the major text fields in database records (Abstracts, Titles, Keywords, Descriptors), and because of logic, clarity, and stylistic writing differences. The medical community has some advantage over the non-medical technical community in this area, since many medical journals require the use of Abstracts that contain a threshold number of canonical categories (Structured Abstracts), while almost all non-medical technical journals do not.

Compatibility among the contents of all record text fields is not yet a requirement. As our studies have shown, this incompatibility can lead to different perspectives of a technical topic, depending on which record field is analyzed. This field consonance condition is frequently violated, because the Keyword, Title and Abstract fields are used by their creators for different purposes. This violation can lead to confusion and inconsistency among the readers.

3) Information Retrieval is limited because time, cost, technical expertise, and substantial detailed technical analyses are required to retrieve the full scope of related records in a comprehensive and high relevance fraction process. Of all the roadblocks addressed in this section, this is the one that attracts probably the most attention from the Information Technology (IT) community. Because much of the IT community's focus is on selling search engine software, and automating the information retrieval process, they bypass the 'elbow grease' component required to get comprehensive and high signal-to-noise retrieval.

4) Information Extraction is limited because the automated phrase extraction algorithms, required to convert the free text to phrases and frequencies of occurrence as a necessary first step in the text mining process, leave much to be desired. This is especially true for S&T free text, which the computer views as essentially a foreign language due to the extensive use of technical jargon. Both a lexicon and technical experts from many diverse disciplines are required for credible information extraction.

Poor performance by the automated phrase extraction algorithms can result in:
- lost candidate query terms for semi-automated information retrieval;
- lost new concepts for literature-based discovery;
- generation of incomplete taxonomies for classifying the technical discipline of interest, and;
- incorrect concept clustering.

For clustering in particular, the non-retrieval of critical technical phrases by the phrase extractor will result in artificial cluster fragmentation. Conversely, the retention of non-technical phrases by the phrase extractor will result in the generation of artificial mega-clusters.

SUMMARY OF THE INVENTION

It is an object of at least one embodiment of the present invention to maximize both the number of documents (defined herein as a text record in any format) retrieved and the ratio of relevant to non-relevant documents (signal to noise ratio) during a literature search.

It is an object of some embodiments of the present invention to use text and data mining to identify topical matters that have been emphasized in prior research.

It is also an object of some embodiments of the present invention to use text and data mining as a tool for innovation.

These and other objects are achieved, in one embodiment, by using a test query to retrieve a relative sample of documents from a database, classifying the retrieved documents as relevant or not relevant, finding text element (phrase) frequencies and text element co-occurrences in at least the relevant documents, grouping the extracted text elements into thematic categories, and then using the thematic grouping and phrase frequency data to develop new queries and query terms. New query terms are tested against the representative sample of documents. If the signal-to-noise ratio of the newly added terms is above a specified limit in the representative sample, the newly added terms are maintained in the developing query. The developed query is then applied to the full database.

In another embodiment of the invention, a taxonomy may be developed from a collection of documents. High technical content text elements are extracted from the collection, and used to generate a factor matrix. The text elements with the largest influence on the themes of each factor (category) are extracted from the factor matrix, and used to generate a co-occurrence matrix of high technical content phrases. The matrix cell values are then normalized (by equivalence index or inclusion index) and text elements are grouped, using clustering techniques, on the normalized matrix. The text element frequencies of occurrence within each group are summed to indicate a level of emphasis for each group. Document clustering techniques can also be used to assign document clusters to the groups defined above, to produce levels of emphasis.

In another embodiment of the invention, the factor matrix process for selecting text elements with the largest influence on the themes of each factor (described in the previous paragraph), or any similar latent semantic analysis approach for selecting important text elements within a thematic category, may be used to identify asymmetries in documented phenomena where none were expected.

In a further embodiment of the invention, text and data mining techniques are applied to assist in developing solutions to a given problem.

DESCRIPTION OF THE PREFERRED EMBODIMENTS

Figure 1:
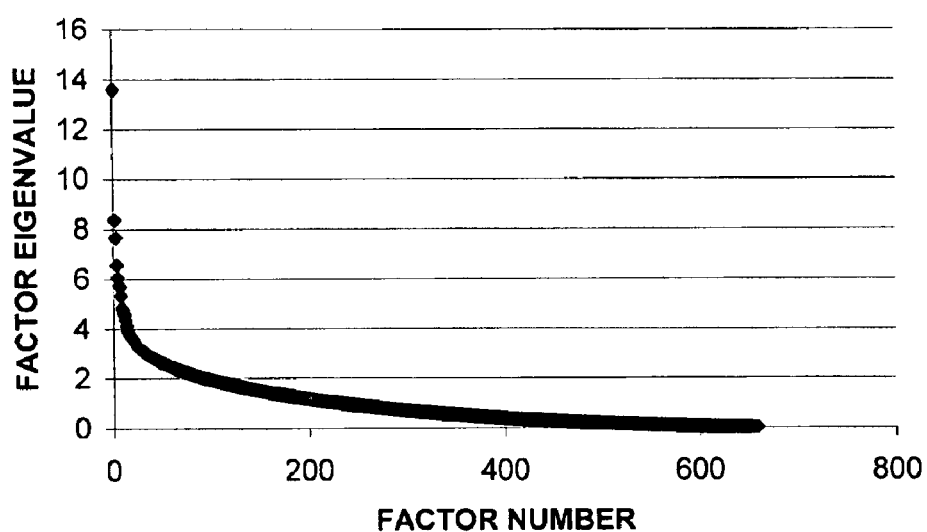
FIG. 1 shows the factor eigenvalue-factor number plot for un-rotated factors on a linear scale.

The following definitions will assist in a clear understanding of the present invention:

Anchor Text Element—Single- or multi-phrase text element that is too ambiguous to serve as stand-alone query term, but in combination with another similarly ambiguous text element, could be sufficiently specific to serve as stand-alone query term. Used in this application and the claims that follow synonymously with "anchor phrase" and "theme phrase."

Bibliometrics—Application of computational linguistics to structured text fields, such as bibliographic fields.

Citing Documents—One or more documents that cite another document.

Computational Linguistics—Study of computer systems for understanding and generating natural language. One component is generation of text element patterns, including numerical indicators, from text databases.

Conflation—Combination of text element (mainly word) variants into a common form (e.g., singulars and plurals).

Co-occurrence—Occurrence of two or more text elements (e.g., words, phrases) in the same text domain (e.g., sentence, paragraph, Abstract).

Co-occurrence Frequency—Frequency of occurrence of two or more text elements in the same text domain.

Co-occurrence Matrix—Matrix whose cells represent co-occurrence frequency of defining row and column text elements.

Cross-Field Co-occurrence Matrix—An Asymmetric Co-occurrence Matrix with rows from one database field and columns from another database field.

Directly Related Literatures—Literatures that have some records and themes in common.

Disjoint Literatures—Literatures with no common records.

Document Clustering—Grouping of documents into thematically similar groups. Can be done manually by humans, or semi-automatically using computer algorithms and associated rules for determining group membership.

Domain—A bounded region of text (e.g., paragraph, sentence, clause, +-n words).

Equivalence Index-For a text element pair (i,j), where element i has an occurrence frequency (in the database being processed) of $C_i$ and element j has an occurrence frequency of $C_j$, and where the pair has a co-occurrence frequency of $C_{ij}$, the Equivalence Index is defined as $(C_{ij}^2)/(C_i*C_j)$ Factor—A theme of the database that is linearly related to the system variables.

Factor Analysis—A statistical clustering method that, when applied to text mining, groups text elements by degree of correlation with other text elements.

Factor Matrix—A matrix whose rows are text elements and whose columns are factors.

Factor Matrix Filtering—The process of using Factor Matrices to separate text elements that have minimal influence on determining the themes of the factors from those text elements that have substantial influence on determining the themes of the factors.

Free Text Mining—Application of computational linguistics techniques to unstructured text.

High Technical Content Phrase—Phrase text element that unambiguously describes scientific or technological concept/device/phenomenon.

Indirectly Related Literatures—Literatures that do not have common records, but are linked through common records or themes with their directly related literatures.

Levels of Emphasis—Generically, estimates levels of effort for selected categories through proxy metric of sum of frequencies of category text elements. For example, for technology levels of emphasis from technical databases, estimates technology category's levels of effort through proxy metric of sum of phrase frequencies of category's phrase text elements. For institutional levels of emphasis from technical databases, estimates institution category's levels of effort through proxy metric of sum of phrase frequencies of category's phrase text elements. Alternatively, documents can be used to estimate levels of emphasis. Documents are grouped, the groups are assigned to thematic categories, and the sum of documents in each category becomes the proxy metric for level of emphasis.

Manual Clustering of Text Elements—Clustering by qualitative means (e.g., manual assignment by visual inspection).

Marginal Utility—Generically, it is the unit increase in benefit per unit increase in cost. Applied to text elements constituting a query, it is the unit increase in relevant records retrieved per unit increase in query text elements, with a specified threshold floor on the ratio of relevant to non-relevant records retrieved.

Multi-Link Clustering of Text Elements—A statistical clustering method where each grouped text element has more than one strong link with other elements in the group.

Non-Relevant Records—Records from a source database not related to a study's main topic.

Numerical Boundary—A domain boundary based on pre-specified number (e.g., every adjacent block of text of 200 word length in a document).

PCA—Phrase co-occurrence analysis; generates list of all phrases that co-occur with some pre-selected phrase in a bounded domain, including numerical indicators that quantify strength of relationship of pre-selected phrase with each co-occurring phrase; could apply strictly to any text element. There are two metrics that may be used for phrase co-occurrence. One is the instance frequency, and th other is the document frequency. The instance frequency is the number of times that a phrase pair will co-occur within a domain in the total text being analyzed. The document frequency is the number of documents in the database being analyzed in which a phrase pair co-occurs (within a domain).

PCL—Phrase clustering analysis; generates list of groups of related phrases, including numerical indicators for each group's cohesiveness; could apply strictly to any text element.

PFA—Phrase frequency analysis; generates list of all phrases in database selected for processing, including associated frequencies of occurrence; could apply strictly to any text element.

Phrase co-occurrence—the occurrence of phrases in the same document within a domain defined by a numerical or semantic boundary. Phrase co-occurrence pairs are phrases that co-occur. For example, viewed in terms of numerical boundaries, a phrase co-occurrence pair may be defined as phrases that occur within n words of each other. For example, if "dog" is the first phrase, and "cat" is the second phrase, and n is 50, each occurrence of "dog" within fifty words of "cat" is a co-occurrence. A phrase co-occurrence may also be defined as the occurrence of phrases within the same paragraph or sentence. In a bibliographic field of a document, or in other defined fields of a document, such as the Summary or Abstract, a phrase co-occurrence may also be defined as the occurrence of phrases in the same section. For example, the occurrence of both "Smith" and "Jones" in the author field is a phrase co-occurrence.

Query—One or more text elements used to retrieve documents from source database.

Query Term—Each text element of a query.

Reference—A citation in a citing document, i.e., a cited document.

Relevant Records—Records from a source database that are related to a study's main topic. The judgement of relevancy or non-relevancy could be generated automatically using pre-defined rules, or could be generated manually by humans.

Semantic Boundary—A text domain based on semantic structure (e.g., sentence, paragraph, Abstract)

Statistical Clustering of Text Elements—Clustering using quantitative statistical techniques (e.g., Factor Matrix, partitional clustering, multi-link hierarchical aggregation).

Structured Text—Text that has a similar role to data, such as would be found in record Author, Journal, Institution, or Country fields.

Symmetric Co-occurrence Matrix—Matrix whose rows and columns are mirror images.

Taxonomy—A classification scheme, consisting of categories.

Text Database—One or more records containing textual material. Could be completely unstructured text (e.g., letter, report, etc), or have some structure that includes fields of unstructured text (e.g., multi-field records in commercial databases such as Science Citation Index, Medline, representing published papers in journals or conference proceedings).

Text Element—A word or group of words, extracted from a source database(s), that could be a technical phrase, non-technical phrase, name of person or entity, etc. Used in this application and the claims that follow synonymously with "phrase."

Text Element Cluster—Grouping of text elements by related characteristics, ranging from manual to fully automated.

Text Mining—Extraction of useful information from text. Typically, large amounts of text comprise the source database(s), and sophisticated computer-based techniques are used in the extraction process.

Theme—Technical focus of a category.

Theme phrase—a phrase that, when used alone, is too ambiguous to distinguish relevant from irrelevant records but, when used in combination (conjunctive other than "or") with another query term, can identify relevant records.

Topical Literature—All the documents in the source databases used related to the topic of interest. For all practical purposes, same as relevant records.

Unstructured Text—Free text, such as would be found in the body of a report, or in record Title, Abstract, and Full Text fields.

The present invention includes advances in clustering, advances in information retrieval, and unique applications of these clustering and information retrieval advances. In the present invention, the advances in clustering are an integral component of the advances in information retrieval. The advances in information retrieval may or may not be an integral component of the advances in clustering, depending on the specific application.

Because clustering is foundational to all the unique applications, it will be described first. Then, the information retrieval steps will be described, with the clustering inserted appropriately. Finally, the unique applications will be described, with the clustering and information retrieval inserted appropriately.

Clustering is the grouping of objects by similarity. In text mining, there are two main types of objects, text elements (e.g., words, phrases) and documents. Each of these object types can be grouped manually (assignment to groups by visual inspection) or statistically (assignment to groups by computer algorithms). Thus, there are four major clustering categories to be discussed in this invention:

1) Manual text element clustering;
2) Manual document clustering;
3) Statistical text element clustering;
4) Statistical document clustering.

These will be described in order of increasing complexity, relative to how they are used in the process and system covered by the present invention.

In the present invention, the advances in the manual clustering techniques are in the the unique applications of the techniques. The advances in the statistical clustering techniques are in the improved quality of the text elements, or documents, that are input to the clustering algorithms, as well as in the unique applications.

In manual text element clustering, a technical expert is presented with a list of text elements. The generation of that list will be described under information retrieval. The technical expert, by visual inspection, assigns selected (or all) text elements from the list into categories. These categories could be pre-selected from a standard classification scheme, or could be generated by the technical expert during the assignment process to include all the text elements. The use of these categories of grouped text elements will be described in the section on unique applications.

In manual document clustering, a technical expert is presented with a set of documents. The generation of that set will be described under information retrieval. The remainder of the process is identical to the manual text element clustering.

In statistical text element clustering, a list of text elements is presented to a computer algorithm. The generation of that list will be described under information retrieval. The first step of the algorithm is to generate a factor matrix (or similar latent semantic category generator), whose rows are the text elements, and whose columns are factors. These factors represent the major themes of the database being analyzed. The matrix elements are numerical values called factor loadings. Each matrix element $M_{ij}$ represents the contribution of text element i to the theme of factor j.

If the text elements in a specific factor are arranged in numerical order, one tail of the factor will have high positive value text elements, and the other tail of the factor will have high negative value text elements. Usually, but not always, the absolute value of the text elements in one tail will dominate the absolute value of the text elements in the other tail. The relatively few high factor loading text elements in the predominant tail will determine the theme of the factor.

The predominance of a few high factor loading text elements (in the high factor loading tails) in determining the factor themes leads to the second step of the algorithm. The high factor loading text elements that determine the theme of each factor in the factor matrix are extracted and combined. The remaining text elements that do not have high factor loadings in any factor are treated as trivial text elements in the context of the database being analyzed, and are excluded from the text element clustering that follows. Some of these excluded text elements may have the appearance of high technical content text elements. However, in the context of determining factor themes, their contribution is negligible. Thus, one major advance of this factor matrix filtering technique is to select high factor loading text elements for clustering that are context-dependent (see Example 1).

Before these filtered text elements are input to the clustering algorithm, some of them are conflated to reduce the dimensionality of the system; i.e., reduce the number of different text elements that the algorithm has to process. Conflation is the process of combining text element (mainly word) variants into a common form. This could include combining singulars and plurals, different tenses, etc. Most, if not all, conflation software available today is context independent. The various stemming algorithms (e.g., Porter's) have fixed rules for conflation, independent of context. The present technique of factor matrix filtering allows variants to be conflated only if they appear on the list of high factor loading extracted text elements. Thus, if the singular variant of a text element is on the high factor loading list, and the plural version has low factor loading, then these text elements are being used in a different context in the specific database being analyzed, and cannot be conflated. Conversely, if both variants are on the high factor loading list, and especially if their numerical values are close, they are being used interchangeably in determining factor themes in the specific database being analyzed, and can be conflated. Thus, a second major advance of this factor matrix filtering technique is to select text elements for conflation that are context dependent (see Example 2).

The text elements that have been filtered by the factor matrix (and, typically, conflated) are then input to a text element clustering algorithm. Depending on the application, a multi-link hierarchical aggregation clustering algorithm, or a partitional clustering algorithm, may be used for text element clustering. The multi-link clustering approach provides a hierarchical categorization structure, and is particularly useful when the database being analyzed has a strong central theme, with inter-related component sub-themes. Analyses of single technical disciplines (e.g., aerodynamics, fullerenes, electrochemistry) tend to fall within this category. The partitional clustering approach provides a flat (single level) categorization structure, and is particularly useful when the database being analyzed has multiple disparate themes. Analyses of multi-discipline organizations or national research programs tend to fall within this category.

However, a partitional clustering algorithm could provide a hierarchical structure if applied to a single discipline correctly. The clusters output by the computer algorithm would have to be combined to form the hierarchical structure. In addition, a hierarchical structure could provide a flat partitional structure. At any given level in the hierarchy, the separate categories could be viewed as a partitional structure.

In statistical document clustering, two general approaches can be used. One is the traditional context-independent approach, and the other is the context-dependent approach described in this application. In the traditional approach, a set of documents is presented to a computer algorithm for matching quantification (e.g., assignment of a similarity metric for the pair). The algorithm compares each pair of documents, and assigns a similarity metric to the pair. The similarity metric could be the text elements shared by the documents, or other type of metric. The algorithm then constructs a matrix (of all documents) whose elements are the similarity metrics. The algorithm then aggregates the documents into similar groups. Many document clustering algorithms are readily available commercially or through freeware. The use of these categories of grouped documents will be described in the section on unique applications.

In the context-dependent document clustering approach, pre-processing of the text in the documents is performed before the set of documents is presented to the computer algorithm for matching quantification. This pre-processing is the same as that described in the section on statistical text element clustering. Factor matrix filtering is performed on the text in the documents to conflate the text element variants in order to reduce dimensionality, and remove the text elements that do not influence the themes of any factors. This results in documents that consist of high factor loading context-dependent text elements being provided to the computer algorithm for matching quantification.

Some applications of the four different clustering approaches will be described. These include information retrieval, level of emphasis determination, citation mining, literature-based discovery, and literature-based asymmetry prediction.

Information retrieval, in the present context, is the retrieval of one or more documents from a source database that are relevant to the objective of the database search. The database search could be manual (e.g., reading a journal or conference proceedings and extracting relevant papers) or electronic (e.g., providing a set of instructions, called a query, to a database search engine to look for documents with desired characteristics). While the information retrieval advances to be described could conceptually be applied to either the manual or electronic searches, in practice they are mainly applicable to the electronic searches.

From another perspective, information retrieval can be differentiated by the boundedness of the source database; i.e., narrowly bounded or broadly bounded. Examples of narrowly bounded would include all the papers published in a specific journal volume or conference proceedings, or all the papers published by German authors in Medline journals in 2001. Examples of broadly bounded would include all papers published in Medline journals on cardiovascular problems, or all papers published in Science Citation Index journals on fluid flow problems. While the clustering techniques described previously could be applied to documents retrieved using either manual or electronic searches, or documents from narrowly bounded or broadly bounded source databases, the information retrieval advances independent of the component clustering advances (or non-advances) will mainly focus on documents retrieved with electronic searches from broadly bounded databases.

The information retrieval process of this invention is overviewed (see Example 3). Then, the specific steps and advances are described in detail. The retrieval process is focused on developing a query (group of terms that will retrieve comprehensive records from a source database and yield a high ratio of relevant to non-relevant records). This query is then provided to a database search engine, and comprehensive, highly relevant records are retrieved. The advances made in the information retrieval component of the invention occur during the course of query development.

The query development process is iterative, and incorporates relevance feedback at each iterative step. In the first step of query development, a collection of documents, such as a database, is selected. A test query is then applied to the collection of documents. The test query may be any search term, or number of terms. Terms in a query, or test query, may be joined by Boolean connectors such as "AND", "OR", or "NOT". Typically, the user will select a test query believed likely to retrieve a collection of text material having a greater ratio of relevant to non-relevant documents than that existing in the original collection of documents. A sample of the documents retrieved with the test query is then chosen using criteria unlikely to bias the selection of search terms. The sample size is selected to be both representative and manageable. Generally, the larger the sampling, the more likely the method of the present invention will produce improved search results when applied to the complete database. Of course, as the sample size increases, the development of sample searches according to the present invention becomes more time-consuming and labor-intensive. With improvements in computer technology, larger sample sizes will become more reasonable.

At this point, the sample of retrieved documents is classified according to the documents' relevance to the subject matter of the search. The relevance classification may be binary, such as either 'relevant' or 'not relevant', or may be graded or ranked on a verbal or numerical scale (e.g., 1–5, or 'strongly relevant', 'moderately relevant', etc). The classification may be performed in a computer-intensive mode, or a manually-intensive mode. The computer-intensive mode is much faster, but is moderately less accurate.

In the computer-intensive classification mode, document clustering software is used to group the documents in the retrieved sample by similarity. The document clustering is a three-step process. In the first step, the raw documents are processed by factor matrix filtering to remove trivial text elements and conflate text element variants. This step removes much of the background 'noise' from the documents, and minimizes similarity resulting from matching of trivial text elements. This is the pre-processing step. In the second step, all documents in the retrieved sample are compared on a pair-wise basis. A similarity metric is assigned to each pair (e.g., number of words in common divided by total words in both documents). This is the matching step. Then, the documents are grouped, such that the similarity among documents within the group is large, and the similarity of documents between groups is small. This is the clustering step. Commercial software is available to perform document clustering.

Document clustering tends to group documents into groups that are at similar levels of relevance. A technical expert then samples documents from each group, and performs a final judgment as to the relevance of each group.

In the manually-intensive classification mode, the technical expert reads each document in the retrieved sample, and performs the final relevance judgment.

Once the documents have been classified according to relevance, the unique text patterns in each relevance category are identified, and used to modify the query accordingly.

The approach described is a hybrid of statistical and manual. The first step in text pattern identification is the extraction of text elements from each relevance categorization of documents.

TextSlicer™ (TS) from Database Tomography (DT), for example, may be used for performing text element (word or phrase) extraction, although any other verified text element extraction software may be used. The TextSlicer™ software allows for multiple word/phrase counting; i.e., a word can be counted as a stand-alone single word as well as when it is used in multi-word phrases. This feature is especially valuable for generating taxonomies, where the shorter phrases can serve as category headings. (The Natural Language Processing software that we also use for multiple tasks, TechOasis™, does not allow this multiple counting.) There are typically two levels of filtering in TextSlicer™. Stop-words in the algorithm eliminate trivial words such as 'the', 'and', etc. Regardless of the software used, it is typically best to remove "stop-words" and other trivial phrases. Regardless of the software used, manual cleanup may then be performed to eliminate lower technical content phrases.

A frequency analysis is then performed on the extracted text elements. If the documents selected for extraction include more than the most relevant reviewed documents, this analysis can compare the frequency of a particular text element within highly relevant documents to its frequency within less relevant reviewed documents. The frequency analysis generates a list of extracted text elements, including frequency data for each listed text element. The frequency data includes the number of times the text element appears in the reviewed documents in a particular category of relevance to the subject matter of the search.

The next step in the text pattern identification is grouping of text elements in thematic categories. The process recommended primarily is statistical text element clustering. If time available is limited, then the first phase of statistical text element clustering, namely, factor matrix generation, can be used as an alternative to the full process. Here, the factors from the factor matrix serve as a proxy for the clusters from the clustering algorithm.

The purpose of the groupings in each relevance category is to insure that the query has representation from each of the major themes of each relevance category. This will insure a balanced query, and that major themes are not overlooked. For example, if a binary relevance system (relevant/non-relevant) is chosen, and clustering shows that the relevant documents can be thematically divided into four main clusters, then query text elements should be selected from each of the four clusters. Thus, the thematic grouping serves as a guide for query term selection, to be used in conjunction with the following criteria and process for selecting query terms. The use of groupings as guides for the query term selection, and the generation of these groupings by the statistical text element clustering process, represent advances of the present invention.

At this point in the process, a co-occurrence matrix of the highest frequency text elements in each relevance category is generated. Each element $M_{ij}$ of the text element co-occurrence matrix is the number of times that text element i occurs in the same spatial domain as text element j. In practice, the co-occurrence matrix element is usually the number of domains in which text element i co-occurs with text element j. The spatial domain could be a semantically-defined domain (e.g., sentence, paragraph, abstract, etc), or numerically-bounded domain (e.g., every 200 word block in a document). Typically, the matrix cell values of the co-occurrence matrix are normalized, e.g., by equivalence index or inclusion index. Cell values for the matrix may also be normalized by standard statistical techniques, resulting in a normalized correlation matrix.

The query term selection now proceeds as follows. The extracted text elements are reviewed by a technical expert(s) and divided into three groups:

1) those text elements that can function alone as query terms;

2) those text elements without significant value as query terms (typically, text elements that are too generic to be useful in a query, and tend to show up with equal frequency in relevant and non-relevant documents); and 3) text elements that have significant value as query terms but are too ambiguous to function as stand-alone query terms (Typically, these are potentially relevant text elements with multiple meanings.). Text elements from this last group are referred to herein as anchor text elements.

The co-occurrence of text elements in the frequency-analyzed documents is then analyzed to generate a list of co-occurrence pairs. Each of these co-occurrence pairs includes an anchor text element (selected so that each major thematic category generated by the grouping of text elements is represented by at least one anchor text element) and another extracted text element. This analysis generates a list of co-occurrence pairs including co-occurrence data for each listed co-occurrence pair. The co-occurrence data is combined with the frequency data for the extracted text elements.

A subject matter expert or expert system then reviews the frequency data for the extracted text elements and the co-occurrence data. From this analysis, the expert or expert system selects candidate query terms, thus forming a list. The list of candidate query terms should represent each of the thematic candidate terms.

The expert or expert system must then define an efficient query from the list of candidate query terms. Criteria to be considered for selecting a query term from the list of candidate query terms that will retrieve more relevant records include, but are not limited to, the following:

1) dominant relevant (high ratio of frequency in relevant category to frequency in non-relevant category);

2) high marginal utility for retrieving relevant records based on sample;

3) reasons for its appearance in the relevant records that are well understood 4) projected to retrieve additional records from the source database (e.g., SCI) mainly relevant to the scope of the study (especially important in the earlier iteration steps)

5) high factor loadings in factors located in relevant categories, and low factor loadings in factors located in non-relevant categories.

Criteria to be considered for selecting a query term from the list of candidate query terms that will eliminate non-relevant records include, but are not limited to, the following:

1) dominant non-relevant (high ratio of frequency in non-relevant category to frequency in relevant category);

2) high marginal utility for eliminating non-relevant records based on sample;

3) reasons for its appearance in the non-relevant records that are well understood;

4) projected to eliminate additional records from the source database (e.g., SCI) mainly non-relevant to the scope of the study (especially important in the later iteration steps);

5) high factor loadings in factors located in non-relevant categories, and low factor loadings in factors located in relevant categories.

One or more, or even all of the selected query terms may be bibliographic, such as author name, journal name, or institution name.

Generally, a query term tracking system marks (i.e., tags) each text element (term) selected for the query, as well as all text elements that would retrieve a subset of the total number of documents retrieved by the selected term. That is, if one selects the term "lithium battery" as a query text element, the tracking system automatically marks as previously selected the term "secondary lithium battery". This marking system avoids duplication of effort and redundancy, since all documents discovered using the term "secondary lithium battery" would have been already discovered using the term "lithium battery". The tracking system is best handled by a computer, but for very small searches may be done manually. For large searches, where large numbers of candidate query terms exist, this type of tracking system is mandatory for credible term selection feasibility. This tracking system is another advance of the present invention.

Where the relevance classification scheme is binary (relevant/not relevant), this comparison may be readily performed by comparing the number of occurrences of a text element within relevant retrieved records to the number of occurrences of that text element within non-relevant retrieved records. Where the relevance classification scheme is other than binary, each class of relevance may be assigned a numerical value (e.g., highly relevant=1, moderately relevant=0.5, not relevant=0). The occurrence of each text element in the record is then multiplied by the numerical value assigned to the relevance of the record, to provide a numerical rating for each text element. To obtain a relevance-weighted frequency rating for a given text element, the frequency ratings for that text element are summed over all records. To obtain a non-relevance weighted frequency rating for a given text element, the occurrence of each text element in the record is then multiplied by one minus the numerical value assigned to the relevance of the record (if relevance is graded from zero to one) to provide a numerical rating for each text element. The ratio of the relevance-weighted frequency rating for a given text element to its non-relevance weighted frequency rating can then be used to determine the value of a search term in the same manner as a binary rating system would use the ratio of the number of relevant records containing that text element to the number of non-relevant records containing a text element. This ratio suggests the usefulness of a text element as a search term. For example, a term with a high ratio would be considered for use with the "AND" connector, while a term with a low ratio might be considered for use with a "NOT" connector to eliminate less relevant or non-relevant records.

Generally, for each iteration in a search, a figure of merit may be used to determine the efficiency or value of the search at that iteration. Typically, when the slope of that figure of merit approaches zero, the addition of further search terms will yield little or no new relevant records. For example, after each iteration, one may determine the total number of new relevant records retrieved (for systems with more than two relevance ratings, the count for each record is weighted according to its relevance rating, i.e., a record with a relevance rating of 0.5 counts as one-half record). When this total drops sharply, the marginal utility of additional search terms will be sufficiently low that the user may wish to discontinue further searching. The development of this marginal utility capability for selecting efficient queries represents another advance in the present invention (see Example 3).

When the marginal utility is of this form (i.e., additional relevant records retrieved per additional query term), it is implicitly assumed that either the ratio of additional relevant records to non-relevant records retrieved will be above a threshold floor value, or the ratio of total relevant records to total non-relevant records will be above a threshold floor value.

Once the new query is defined, the new query (which may be a modification of the test query or may be an entirely new query) is applied to the same collection of documents (source database) to which the test query was applied. Application of the new query retrieves an additional set of documents from the collection.

The present invention also includes a text element method of determining levels of emphasis that is an alternative to using document clustering (and counting documents assigned to various categories) for determining levels of emphasis. Using the methods discussed above, a taxonomy of a collection of documents containing at least one unstructured field is generated, either statistically or manually. Text elements are statistically or manually assigned to each group (category) within the taxonomy. Within each group of the taxonomy, the frequencies of occurrence for the text elements in that group are summed. The summation cannot include the frequency component of text elements nested within other text elements. The figure of merit, the summation of text element frequencies within each group, indicates the relative emphasis placed on each group by the collection of documents. The development of this alternative to document clustering for determining levels of emphasis represents another advance in the present invention (See Example 4).

The present invention can also be used for citation mining. For citation mining, the user selects one or more documents before creating the collection to be studied. The collection to be studied can then be created, typically using a citation index, so that all documents within the collection either cite or are cited by the selected document or documents. This collection of documents is then subjected to text mining as described above. The development of a process for citation mining represents another advance in the present invention (See Example 5).

The present invention also includes a method of literature-based discovery. In a first approach, the user selects a problem and a collection of records believed to be relevant to the problem (problem literature). The problem literature is generally a subset of a larger collection (usually orders of magnitude larger) of records referred to herein as the "source database." Each record within the source database includes at least one unstructured field. Information retrieval and information processing, including text element extraction, text element-frequency analysis, and clustering (statistical and/or non-statistical) are performed. As a result, the text elements are grouped into thematic categories and subcategories.

Next a directly related topical literature is generated for each subcategory. The directly related topical literatures should be disjoint (that is, independent of each other (i.e., no overlapping records) and independent of the problem literature (i.e., no overlapping records)). Directly related topical literatures are literatures whose queries are essentially generated from the problem literature. (By "essentially," it is meant that text elements with conceptually similar meanings, such as synonyms, in addition to phrases taken directly from the problem literature, may be used). To generate directly related topical literatures, a query is developed for each subcategory, recognizing that each literature is representative of one of the subcategories of the taxonomy. Many of the text elements for the query can come from the text elements in the taxonomy. However, if the text elements retrieve only a narrow representation of a category, then the query should be expanded to include synonyms (or additional synonyms) for the text elements from the taxonomy to provide a more complete representation of the category. The query is inserted into the search engine and retrieves the directly related topical literatures (for each subcategory) from the source literature.

Each subcategory directly related topical literature is subjected to a text element frequency analysis, to generate a list of text elements for each directly related topical literature. Text elements on that list also found in the problem literature are removed from each list. The remaining text elements in each list become candidates for discovery since they could not be found in the problem literature. Both the number of lists in which a candidate text element appears and the frequencies with which the candidate text element appears in the lists compared to its appearance in the overall database may be used to rank the priority among the candidates. Use of this type of text element frequency comparison with the source literature for ranking, however, can sometimes overlook candidates that are related to a variety of conditions. Thus, according to the present invention, text element frequency comparison with the source literature will typically be used for ranking candidates less frequently, and with a lower weight, than the number of lists in which a candidate text element appears. Text element co-occurrences can also be reviewed and ranked as potential candidates.

Typically, the text elements (and text element co-occurrences) developed from the directly related topical literature fall into three categories:

1. not candidates for discovery (typically overly generic);
2. solution candidates (by inclusion or omission of act or material); and
3. candidate query terms to develop indirectly related intermediate literatures.

The indirectly related intermediate literatures are then retrieved from the source database by applying the candidate query terms to the source literature. The retrieved records are subjected to text element frequency analysis to generate a list of text elements for each indirectly related topical literature. Text elements found in the problem literature are removed from each list. The remaining text elements in each list become candidates for further discovery since they could not be found in the problem literature. Both the number of lists that a candidate text element appears in and the frequencies with which the candidate text element appears in the lists compared to its appearance in the overall database may be used to rank the priority among the candidates. Use of type of text element frequency comparison with the source literature for ranking, however, can sometimes overlook candidates that are related to a variety of conditions. Thus, according to the present invention, text element frequency comparison with the source literature will typically be used for ranking candidates less frequently, and with a lower weight, than the number of lists in which a candidate text element appears. Text element co-occurrences can also be reviewed and ranked as potential candidates. (See Example 6)

The above process with the indirectly related literature may be repeated as often as desired to identify text elements in higher order indirectly related literatures, although acceptable results are often obtained without further searches for indirectly related literature. Also, as one drifts further from the directly related literature, the candidate text elements are less likely to have a direct impact on the problem.

Another approach is start with a solution (technology), and then look for a problem (application) upon which the solution may have an impact. This approach basically follows the same steps as used from the problem based approach, i.e., it is analogous to that approach. The user selects a solution and a collection of records believed to be relevant to the solution (solution literature). The solution literature is generally a subset of a larger collection (usually orders of magnitude larger) of records referred to herein as the "source database" Information retrieval, and information processing, including text element extraction, text element-frequency analysis, and clustering (statistical and/or non-statistical) are performed. As a result, the text elements are grouped into thematic categories and subcategories.

Next a directly related topical literature is generated for each subcategory. The directly related topical literatures should be disjoint (that is, independent of each other (i.e., no overlapping records) and independent of the solution literature (i.e., no overlapping records)). Directly related topical literatures are literatures whose queries are essentially generated from the solution literature. (By "essentially," its meant that text elements with conceptually similar meanings, such as synonyms, in addition to text elements taken directly from the solution literature may be used). To generate directly related topical literatures, a query is developed for each subcategory, recognizing that each literature is representative of one of the subcategories of the taxonomy. Many of the text elements for the query can come from the text elements in the taxonomy. However, if the text elements retrieve only a narrow representation of a category, then the query should be expanded to include synonyms (or additional synonyms) for the text elements from the taxonomy to provide a more complete representation of the category. The query is inserted into the search engine and retrieves the directly related topical literatures (for each subcategory) from the source literature.

Each subcategory directly related topical literature is subjected to a text element frequency analysis, to generate a list of text elements for each directly related topical literature. Text elements found in the solution literature are removed from each list. The remaining text elements in each list become candidates for (applications) discovery since they could not be found in the solution literature. Both the number of lists in which a candidate text element appears and the frequencies with which the candidate text element appear in the lists compared to its appearance in the overall database may be used to rank the priority among the candidates. Use of this type of text element frequency comparison with the source literature for ranking, however, can sometimes overlook candidates that are related to a variety of conditions. Thus, according to the present invention, text element frequency comparison with the source literature will typically be used for ranking candidates less frequently, and with a lower weight, than the number of lists in which a candidate text element appears. Text element co-occurrences can also be reviewed and ranked as potential candidates.

Typically, the text elements (and text element co-occurrences) developed from the directly related topical literature fall into three categories:

1. not candidates for discovery (typically overly generic);
2. application candidates (by inclusion or omission of act or material); and
3. candidate query terms to develop indirectly related intermediate literatures.

The indirectly related intermediate literatures are then retrieved from the source database by applying the candidate query terms to the source literature. The retrieved records are subjected to text element frequency analysis to generate a list of text elements for each indirectly related topical literature. Text elements found in the solution literature are removed from each list. The remaining text elements in each list become candidates for further (applications) discovery since they could not be found in the solution literature. Both the number of lists in which a candidate text element appears, and the frequencies with which the candidate text element appears in the lists compared to its appearance in the overall database, may be used to rank the priority among the candidates. Use of type of text element frequency comparison with the source literature for ranking, however, can sometimes overlook candidates that are related to a variety of conditions. Thus, according to the present invention, text element frequency comparison with the source literature will typically be used for ranking candidates less frequently, and with a lower weight, than the number of lists in which a candidate text element appears. Text element co-occurrences can also be reviewed and ranked as potential candidates.

The above process with the indirectly related literature may be repeated as often as desired to identify text elements in higher order indirectly related literatures, although acceptable results are often obtained without further searches for indirectly related literature. Also, as one drifts further from the directly related literature, the candidate text elements are less likely to have a direct impact.

In yet another approach, the user may research the mechanism that links a solution to the problem to which it applies. In this approach, the user conducts the problem-based literature-based discovery and the solution-based literature-based discovery as described above, resulting in two separate lists of query terms. The two lists are then compared to determine the text elements that they have in common. These shared text elements represent mechanisms that potentially link the problem with the solution. The development of a systematic context-based clustering process for literature-based discovery represents another advance in the present invention. (See Example 6).

The present invention can also be used for literature-based asymmetry detection (see Example 7), another type of literature-based discovery. The objective is to identify differences in thematic categories where none would be expected, based on literature text element and/or document occurrences alone. For example, in a lung cancer literature, the objective might be to identify differences in patient incidence of right lung cancer vs. left lung cancer, or in patient incidence of upper lobe cancer vs. lower lobe cancer, and so on. The first step in literature-based asymmetry detection is to retrieve a set of documents that is representative of the topical literature of interest. In the lung cancer case, this set of documents (collection) could be all the documents in the Medline database that are lung cancer-related Case Reports (typically individual patient case reports written as journal articles).

The next step is identical to that used for the context-dependent text element conflation and trivial text element filtering described previously. The narrative material in the collection is converted to text elements with associated occurrence frequencies. A correlation matrix of these text elements is generated, and then a factor matrix is generated using the correlation matrix. The factor loadings in each factor of the factor matrix are examined. Substantial differences in factor loadings for text elements representing phenomena thought to be symmetrical will identify candidate text elements for further examination. This is especially true in the factor loading region where at least one of the text elements has a sufficiently high factor loading to have a major influence on the factor theme. For example, in the lung cancer example shown in Example 7, suppose the text element "right lung" had a factor loading of 0.4, and the text element "left lung" had a factor loading of 0.2, in a given factor. Then the potential for lateral (left vs. right) asymmetry becomes a candidate for further investigation.

The next step is to select those records from the collection that focus specifically on the elements of the potential asymmetry. In the lung cancer example, a query would be developed to select those records in the collection that focus specifically on right lung cancer, and those records in the collection that focus specifically on left lung cancer. Once these records have been selected, the ratio of records in each category is computed. This ratio is then used to estimate the degree of asymmetry reflected in the collection. If the collection is representative of the actual occurrence of the phenomena being examined, then the ratio can be used to estimate the degree of asymmetry of the occurrence of the phenomena. In the lung cancer example, if the lung cancer Medline Case Reports are assumed to be representative of actual lung cancer patient incidence, then the ratio can be used to estimate the actual right/left patient lung cancer incidence. The development of a systematic factor matrix filtering process for asymmetry detection represents another advance in the present invention.

Having described the invention, the following examples are given to illustrate specific applications of the invention including the best mode now known to perform the invention. These specific examples are not intended to limit the scope of the invention described in this application.

EXAMPLES

Example 1

Factor Matrix Text Filtering and Clustering

This example shows how factor analysis was used as a context-dependent word filter for cluster analysis, and demonstrates how the fractal nature of factor matrix-associated graphs affected the resultant number of factors used in the analysis.

In the first part of this example, 930 Medline Abstract-containing records related to Raynaud's Phenomenon, and published in the 1975–1985 time period, were retrieved. Non-trivial single words (659) were extracted from the database of Abstracts, along with the number of documents in which each word appeared (document frequency). The co-occurrence of word pairs in the same document (word co-occurrence frequency) was computed, and a correlation matrix (659×659) of word pairs was generated. The variables were factorized, and a factor matrix was generated. The factor matrix was then used to select the sub-set of the 659 words that had the most influence in determining the theme of each factor. This sub-set of context-dependent important words was then input to the clustering algorithm.

The core of this factor matrix-based filtering process was the factor matrix itself. Its rows were the input words/phrases, and columns were the number of factors used. A major challenge was selection of the number of factors to be analyzed, as well as grouped into a taxonomy. This example will also show that the fractal nature of the factor matrix selection process had to be taken into account when selecting the number of factors to be used in generating the factor matrix.

The example starts with a discussion of factor matrices. Then, the fractal nature of the factor matrix selection process is shown using the Raynaud's Phenomenon database as an example. This is followed by a thematic analysis of two factor matrices. Then, the use of the factor matrix for filtering high technical content words for input to the hierarchical clustering algorithms is presented. The resulting clustering algorithm output is analyzed thematically, and a taxonomy is generated. The themes from the factor matrix analysis and from the hierarchical clustering analysis are compared.

One of the key challenges in factor analysis has been defining the number of factors to select. The two most widely used factor number selection methods are the Kaiser criterion and the Scree test (1). The Kaiser criterion states that only factors with eigenvalues greater than unity should be retained, essentially requiring that a factor extracts at least as much variance as the equivalent of one original variable. The Scree test plots factor eigenvalue (variance) vs factor number, and recommends that only those factors that extract substantive variance be retained. Operationally, the factor selection termination point in the Scree test becomes the 'elbow' of the plot, the point where the slope changes from large to small. In this example, the location of the slope change point depended on the resolution level of the eigenvalue plot, and therefore had a fractal characteristic.

In the example, once the desired value of the Scree Plot 'elbow' was determined, and the appropriate factor matrix was generated, the factor matrix was used as a filter to identify the significant technical words/phrases for further analysis. Specifically, the factor matrix complemented a basic trivial word list (e.g., a list containing words that are trivial in almost all contexts, such as 'a', 'the', 'of', 'and', 'or', etc) to select context-dependent high technical content words/phrases for input to a clustering algorithm. The factor matrix pre-filtering improved the cohesiveness of clustering by eliminating those words/phrases that are trivial words operationally in the application context.

In the example, the Scree plot was used for factor number determination, since the Kaiser criterion yielded 224 factors. This number was far too large for detailed factor analysis, and of questionable utility, since many of the eigenvalues were not too different from unity.

Factor matrices with different numbers of factors specified were computed. Eigenvalues were generated by Principal Components Analysis, and these eigenvalues represented the variance accounted for by each underlying factor. FIG. 1 shows the factor eigenvalue-factor number plot for the 659 un-rotated factors on a linear scale. The 'elbow', or break point, of the curve appeared to be about fourteen factors. To improve resolution, the curve was stretched in the x direction by halving the number of factors shown on one page. The curve had a similar shape to the 659 factor case, but the factor termination point appeared to decrease. The halving process was repeated until ten factors were plotted on one page, and the resolution effectively increased by an order of magnitude overall.

Figure 2:
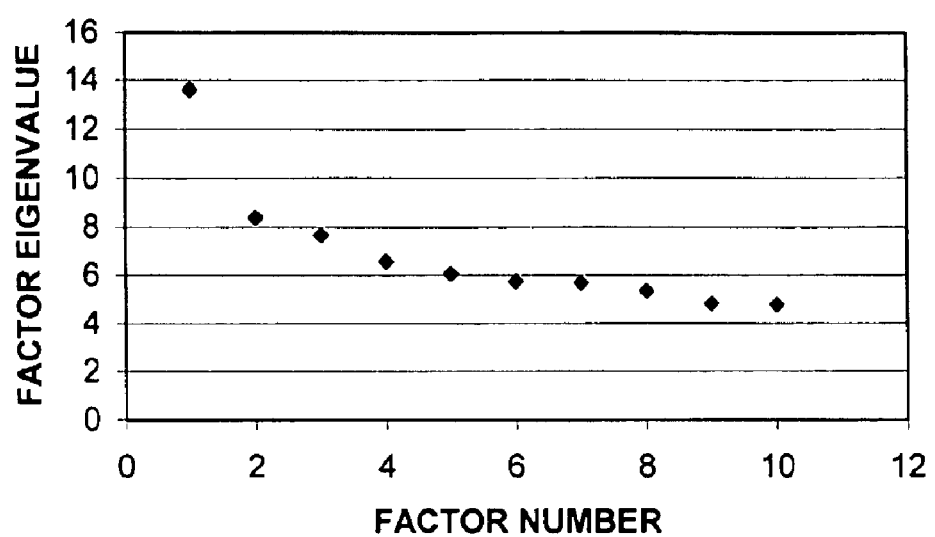
FIG. 2 is a ten factor plot.

FIG. 2 shows the ten factor plot. The elbow of the curve appeared to be about two factors. Thus, the number of factors selected based on significant slope change decreased from fourteen in the 659 factor plot to two in the ten factor plot.

In fractal analysis, a fractal object has a number of characteristics. Among these are self-similarity (similar to itself at different magnifications), and adherence to a scaling relationship (the measured value of a property will depend on the resolution used to make the measurement). The Scree Plot had these two fractal properties. As the resolution increased, more structure appeared, and the value of the break point changed.

Figure 3:
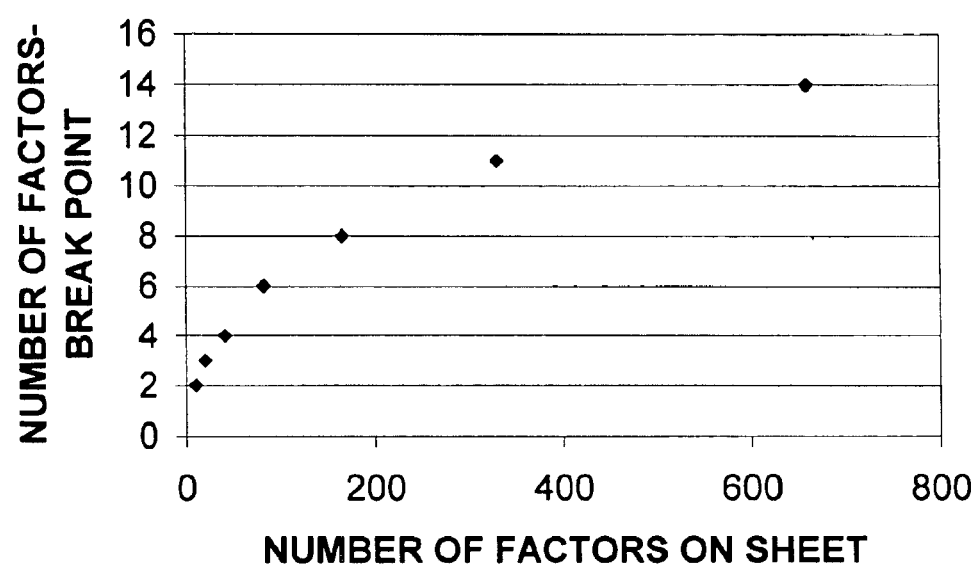
FIG. 3 is a plot of Break Point vs. Number of Factors on a linear scale.
Figure 4:
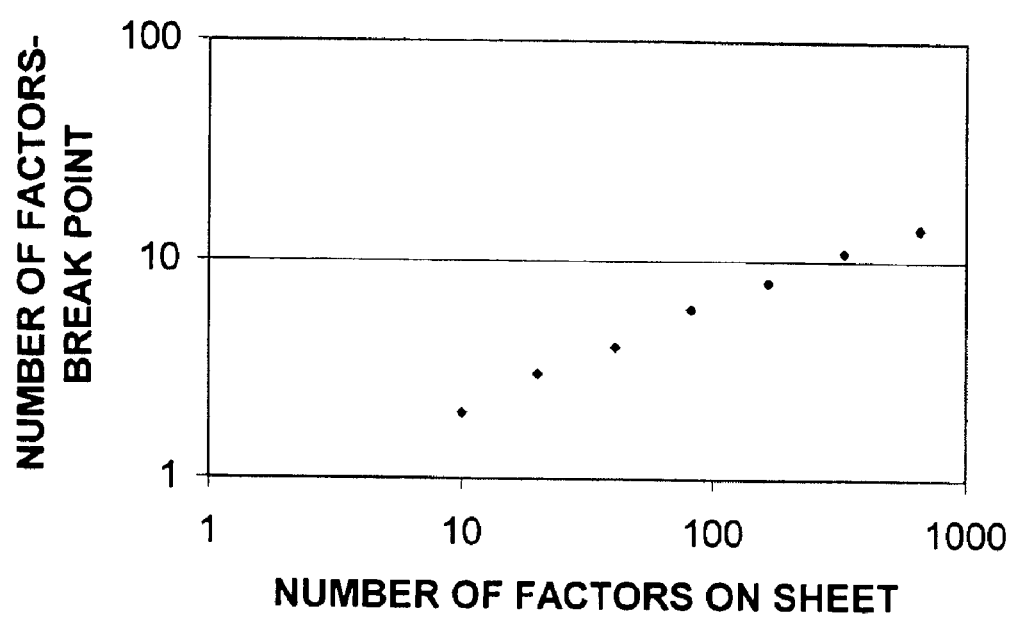
FIG. 4 is a re-plot of FIG. 3 on a log-log scale.

The simplest and most common form of the scaling relationship is that of a power law. When such a power law is plotted on a log-log scale, the scaling relationship appears as a straight line. FIG. 3 is a plot of the break point on a linear scale, and FIG. 4 is a re-plot of FIG. 3 on a log-log scale. The log-log plot was approximately linear, reflected power law scaling, and validated the break point selection as a fractal process.

2) Factor Matrix Filtering

The factor matrices determined by the various Scree Plots, ranging from two factor to fourteen factor, were examined. Only the results from the extremes, two and fourteen factor matrices, were examined. To diversify the factor loading patterns, and simplify interpretation of each factor, varimax orthogonal rotation was used.

In the factor matrices used, the rows were the words and the columns were the factors. The matrix elements $M_{ij}$ were the factor loadings, or the contribution of word/phrase i to the theme of factor j. The theme of each factor was determined by those words that had the largest values of factor loading. Each factor had a positive value tail and negative value tail. For each factor, one of the tails dominated in terms of absolute value magnitude. This dominant tail was used to determine the central theme of each factor.

Since each theme addressed some aspect of Raynaud's Phenomenon, an overview of Raynaud's Phenomenon will be presented before discussing the themes. Because the main Raynaud's terminology used in the literature was not consistent (in many cases, Raynaud's Disease was used interchangeably with Raynaud's Phenomenon or Raynaud's Syndrome), the overview will include the distinction among these Raynaud variants.

Raynaud's Phenomenon Overview

Raynaud's Phenomenon is a condition in which small arteries and arterioles, most commonly in the fingers and toes, go into spasm (contract) and cause the skin to turn pale (blanching) or a patchy red (rubor) to blue (cyanosis). While this sequence is normally precipitated by exposure to cold, and subsequent re-warming, it can also be induced by anxiety or stress. Blanching represents the ischemic (lack of adequate blood flow) phase, caused by digital artery vasospasm. Cyanosis results from de-oxygenated blood in capillaries and venules (small veins). Upon re-warming, a hyperemic phase ensues, causing the digits to appear red.

Raynaud's Phenomenon can be a primary or secondary disorder. When the signs of Raynaud's Phenomenon appear alone without any apparent underlying medical condition, it is called Primary Raynaud's, or formerly, Raynaud's Disease. In this condition, the blood vessels return to normal after each episode. Conversely, when Raynaud's Phenomenon occurs in association with an underlying condition or is due to an identifiable cause, then it is referred to as Secondary Raynaud's, or formerly, as Raynaud's Syndrome. The most common underlying disorders associated with Secondary Raynaud's are the auto-immune disorders, or conditions in which a person produces antibodies against his or her own tissues. In contrast to Primary Raynaud's, where the blood vessels remain anatomically normal after each episode, in Secondary Raynaud's there may be scarring and long-term damage to the blood vessels; thus Secondary Raynaud's is potentially a more serious disorder than Primary. Certain repetitive activities may result in a predisposition to Raynaud's Phenomenon. These cases of so-called "Occupational Raynaud's" typically result from the chronic use of vibrating hand tools.

Thus, while Raynaud's Phenomenon is a direct consequence of reduced blood flow due to reversible blood vessel constriction, it may be a function of many variables that can impact blood flow. These include:

Inflammation from the auto-immune disorders that can cause swelling and thereby constrict blood vessels;

Increased sympathetic nervous system activity, that can affect the timing and duration of the blood vessel muscular contractions that cause constriction;

Heightened digital vascular reactivity to vaso-constrictive stimuli, that cause the blood vessels to over-react and over-contract;

Deposits along the blood vessel walls that can reduce blood flow and increase the flow sensitivity to contraction stimuli;

Blood Theological properties that offer additional resistance to blood flow, and magnify the impact of blood vessel constriction;

Blood constituents and hormones that can act as vaso-constrictors or vaso-dilators.

Fourteen Factor Matrix

For the fourteen factor matrix, the high factor loading words in the dominant tail of each factor are shown in parentheses after the factor number, followed by a brief narrative of the factor theme.

Factor 1 (nuclear, antibodies, extractable, speckled, connective, immunofluorescence, antinuclear, tissue, anti-RNP, MCTD, mixed, ribonucleoprotein, swollen, RNP, antibody, antigen, titer, SLE, lupus, erythematosus) focused on different types of autoantibodies, especially anti-nuclear and extractable nuclear, and their relation to auto-immune diseases.

Factor 2 (double-blind, placebo, mg, daily, weeks, times, agent, nifedipine, trial) focused on double-blind trials for vasodilators.

Factor 3 (vibration, tools, workers, vibrating, exposure, chain, prevalence, time, exposed, sensory, white, circulatory, complaints) focused on the impact of vibratory tools on circulation.

Factor 4 (coronary, ventricular, heart, angina, hypertension, myocardial, cardiac, failure, pulmonary) focused on coronary circulation and blood pressure problems.

Factor 5 (prostaglandin, platelet, E1, prostacyclin, aggregation, infusion, hours, healing, ischaemic, thromboxane, administered, vasodilator, intravenous) focused on the administration of vasodilators to improve circulation.

Factor 6 (calcinosis, sclerodactyly, esophageal, dysmotility, telangiectasia, anticentromere, variant, diffuse, scleroderma) focused on scleroderma-spectrum types of autoimmune diseases.

Factor 7 (extremity, sympathectomy, artery, surgery, arteries, upper, occlusions, arterial, brachial, thoracic, operation, surgical, angiography, occlusive) focused on surgical solutions to remove constrictions on circulation.

Factor 8 (C, degrees, systolic, pressure, cooling, blood, finger, measured, flow) focused on blood flow, and associated finger blood pressure and temperature measurements.

Factor 9 (capillaries, capillary, nail-fold, microscopy, capillaroscopy) focused on the diagnostic use of nail-fold capillary microscopy.

Factor 10 (training, biofeedback, relaxation, stress, outcome, measures, headaches, temperature, conducted, thermal, physiological, responses) focused on the use of biofeedback training to reduce stress headaches, and raise temperatures through improved circulation.

Factor 11 (vasodilation, peripheral, immersion, calcium, water) focused on vasodilation of the peripheral circulatory system after immersion, and the role of calcium in this process.

Factor 12 (complexes, immune, circulating, complement, IgG, serum, levels, IgM) focused on serum levels of circulating immune complexes and immunoglobulins, especially IgG and IgM.

Factor 13 (eosinophilia, fasciitis, fascia, eosinophilic, visceral, hypergammaglobulinemia, absent, scleroderma-like, corticosteroids) focused on inflammation, especially of the fascia.

Factor 14 (systemic, lupus, RA, erythematosus, PSS, sclerosis, rheumatoid, arthritis, SLE) focused on autoimmune diseases associated with Raynaud's Phenomenon.

Two Factor Matrix

Factor 1 (placebo, double-blind, mg, weeks, degrees, C, patients, attacks, measured, daily, P, crossover, trial, thromboxane, systolic, pressure, blood, temperature, agent, inhibitor, prostaglandin, nifedipine) had a circulation focus, specifically double-blind trials on coronary and peripheral circulation vasodilators.

Factor 2 (antibodies, nuclear, antinuclear, connective, lupus, tissue, systemic, erythematosus, antibody, immunofluorescence, speckled, sera, SLE, extractable, antigen, arthritis, mixed, anti-RNP, rheumatoid, ribonucleoprotein, MCTD, CREST, serum, features, antigens) had an auto-immune focus, specifically the study of (mainly anti-nuclear) autoantibodies and their relation to inflammation-based auto-immune diseases.

Thus, the two factor matrix showed the main thematic thrusts of circulation and auto-immunity (as were verified by the results of the clustering analysis). The fourteen factor matrix themes were divided into these two thrusts, where circulation covered factors 2, 3, 4, 5, 7, 8, 9, 10, and 11, and autoimmunity covered factors 1, 6, 12, 13, 14. The factor themes from the fourteen factor matrix were more detailed, and to some degree represented the next sub-categorization of the themes from the two factor matrix.

Factor Matrix Word Filtering and Selection

Because of the greater specificity of the themes in the fourteen factor matrix, and the desire to have the capability to do multi-level hierarchical categorization in the clustering, the fourteen factor matrix was used for word filtering and selection. In the present experiment, the 659 words in the factor matrix had to be culled to the 250 allowed by the Excel-based clustering package, WINSTAT. The 250 word limit is an artifact of Excel. Other software packages may allow more or less words to be used for clustering, but all approaches perform culling to reduce dimensionality. The filtering process presented here was applicable to any level of filtered words desired.

Another caveat. A trivial word list of the type described previously (words that are trivial in almost all contexts) was used to arrive at the 659 words used for the factor matrix input. This was not necessary. The raw words from the word generator could be used as input, and would be subject to the same filtering process. To allow more important words to be used in this demonstration, the very trivial words were removed.

The factor loadings in the factor matrix were converted to absolute values. Then, a simple algorithm was used to automatically extract those high factor loading words at the tail of each factor. If word variants were on this list (e.g., singles and plurals), and their factor loadings were reasonably close, they were conflated (e.g., 'agent' and 'agents' were conflated into 'agents', and their frequencies were added). See example 2 for more detail about conflation. A few words were eliminated manually, based on factor loading and estimate of technical content.

An examination of the words eliminated and those retained showed that most of those retained appeared to have high technical content, and would have been selected by previous manual filtering processes for input to the clustering algorithms. Some of the words appeared not to have the highest technical content, also as shown above, but it was concluded that they were important because of their contribution to theme determination in the present clustering application. Similarly, some of the words eliminated by the factor matrix filter appeared to be high technical content, and in previous manual filtering processes might have been selected for the clustering algorithm input (e.g., acrocyanosis, vasomotor, cerebral, gastrointestinal). The conclusion for these words was not that they were unimportant per se. Rather, they did not have sufficient influence in determining the factor themes, and would not make an important contribution to the cluster structure determination. Thus, the context dependency (their influence on factor theme determination) of the words was the deciding factor in their selection or elimination, not only the judgment of their technical value independent of factor theme determination, as was done in previous manual filtering approaches.

Word Clustering

The 252 filtered and conflated words were input to the WINSTAT clustering algorithm, and the Average Link option was selected for clustering. A dendrogram was generated. This was a tree-like structure that showed how the individual words clustered into groups in a hierarchical structure. One axis was the words, and the other axis ('distance') reflected their similarity. The lower the value of 'distance' at which words, or word groups, were linked together, the closer their relation. As an extreme case of illustration, words that tended to appear as members of multi-word phrases, such as 'lupus erythematosus', 'connective tissue', or 'double blind' appeared adjacent on the dendrogram with very low values of 'distance' at their juncture.

The top three hierarchical levels were determined, as follows:

The top hierarchical level was divided into two major clusters. Cluster 1 focused on autoimmunity, and cluster 2 focused on circulation. The second hierarchical level was divided into four clusters, where cluster 1 was divided into clusters 1a and 1b, and cluster 2 was divided into clusters 2a and 2b. Cluster 1a focused on autoimmune diseases and antibodies, while cluster 1b focused on inflammation, especially fascial inflammation. Cluster 2a focused on peripheral vascular circulation, while cluster 2b focused on coronary vascular circulation.

Most of the clusters in the second hierarchical level were divided into two sub-clusters, to produce the third hierarchical level clusters. Cluster 1a1 had multiple themes: different types of antibodies, especially anti-nuclear and extractable nuclear, and their relation to autoimmune diseases; sclerotic types of autoimmune diseases; and autoimmune diseases associated with Raynaud's Phenomenon. It incorporated the themes of factors 1, 6, and 14. Cluster 1a2 focused on circulating immune complexes, and paralleled the theme of factor 12. Cluster 1b was too small to subdivide further, and stopped at the second hierarchical level. It paralleled the theme of factor 13.

Cluster 2a1 had multiple themes: double-blind clinical trials for vasodilators; administration of vasodilators to reduce platelet aggregation and improve circulation; blood flow, and associated finger blood pressure and temperature measurements; and occupational exposures, mainly vibrating tools and vinyl chloride, that impact the peripheral and central nervous systems and impact circulation. It incorporated the themes of factors 2, 3, 5, 7, 8. Cluster 2a2 focused on nailfold capillary microscopy as a diagnostic for microcirculation, and paralleled the theme of factor 9. Cluster 2b1 focused on cardiovascular system problems, and paralleled the theme of factor 4. Cluster 2b2 focused on biofeedback training to reduce stress and headaches, and increase relaxation, and paralleled the theme of factor 10.

In summary, factor matrix filtering proved to be an effective method for:

identifying the major themes in a text database, identifying the critical words that define the theme, selecting these critical words in context for clustering, and identifying which variants of these words can be conflated within the context of the specific database examined.

Selecting the number of factors for the factor matrix was complex, and the fractal nature of the Scree Plot had to be considered for final factor selection.

Factor matrix filtering was used as a precursor for text element clustering. It eliminated words that had little influence on determining the factor themes, and that effectively served as trivial, or 'noise', words. It effectively preprocessed the raw text to eliminate the background clutter, and allowed the processed text to be used for any application where clutter removal is required.

Example 2

Context-Dependent Conflation

This example showed that word stemming in text processing was strongly context and application dependent, and that selection of word variants for stemming was context/application dependent. In addition, this example showed that the conflation filter rule proposed in (2) did not have a strong rational basis.

A simple experiment was run, as part of a larger text mining study on the Fractals literature, to test the effect of word stemming on cluster theme definition. A Fractals-based query retrieved 4389 Science Citation Index records containing Abstracts, covering the period 2001–October 2002. All the single Abstract words were extracted, and the highest frequency highest technical content words (820) were selected for word clustering. A two step clustering process was used, where a factor matrix was generated initially with no word combination required, then a hierarchical clustering was performed using word combinations based on the factor matrix results.

The factor matrix generator in the TechOasis software package used a correlation matrix of the uncombined 820 words as input. The generator produced a 29 factor matrix (820×29), where each factor represented a theme of the Fractals database. The value of each matrix element $M_{ij}$ was the factor loading, the contribution of word i to factor j.

For the analysis of each factor, the factor column was sorted in descending numerical order. Each factor had two tails, one with large positive value and one with large negative value. The tails were not of the same absolute value size; one of the tails was always dominant. The theme of each factor was determined by the highest absolute value terms in the dominant tail.

For purposes of this example, the interchangeability of the singular and plural variants only was reported and discussed, although the results of interchangeability of all the word variants in the 820 word list were used to determine the word combinations input to the hierarchical clustering algorithm. All words were examined that had both singular and plural forms represented in the 820 words, especially where at least one of the variants was contained in the dominant tail of a factor and thereby was influential in determining the theme of the factor. Singular and plural forms that could be conflated credibly were interchangeable. They were located in close proximity in the dominant tail (similar factor loadings), and had similar influence in determining the cluster theme. Otherwise, they were being used in different contexts, and their conflation had the effect of artificially merging themes or clusters to produce erroneous groupings.

One benchmark for how well the factor matrix algorithm spotted interchangeability was its numerical performance with multi-word phrases. In the Fractals literature, there were multi-word phrases that appeared frequently, where each word in the multi-word phrase was either exclusive to the phrase, or used frequently in the phrase. Examples are: Atomic Force Microscopy and its acronym AFM, Scanning Electron Microscopy and its acronym SEM, Thin Film, Fractional Brownian Motion and its acronym FBM, and Monte Carlo. The component words of these strong multi-word phrases appeared close to each other in the dominant tail, when the clustering was viewing them as a unit. The dominant factor tails that included the multi-word phrases above, and the word factor loadings (in parenthesis) were as follows.

Factor 6: microscopy (−0.59), atomic (−0.58), AFM (−0.58), force (−0.52); scanning (−0.47), microscope (−0.44), electron (−0.40), SEM (−0.34); film (−0.34), thin (−0.31)

Factor 8: Brownian (−0.68), fractional (−0.64), motion (−0.62), FBM (−0.50)

Factor 3: Monte (−0.47), Carlo (−0.46)

The threshold absolute value for high factor loading across all factors was about 0.20, and the highest absolute value for factor loading across all factors was about 0.70. All the words above were well above the threshold and at or near the end of the dominant tail in their respective factor. All the multi-word phrase components had high factor loadings in close proximity, with words relatively unique to the multi-word phrase being in very close proximity.

The performance of singular and plural variants was then examined. There was a continuum of relative values between the singular and plural variants, and only the extremes were used to illustrate the main points. Singular/plural variants had a high absolute value factor loading in one factor only. Low value factor loadings did not determine the factor theme. However, it was clear that variants closely related in their dominant tail appearance also tended to be closely related in most of their appearances in other factors. Variants not closely related in their dominant tail appearance tended not to be closely related in appearances in other factors.

Sample closely-related singular-plural variants, accompanied by their factor loadings/factors in parenthesis, were as follows: avalanche (0.453/10), avalanches (0.502/10); earthquake (0.599/17), earthquakes (0.541/17); gel (0.539/18), gels (0.495/18); island (0.42/24), islands (0.38/24); network (0.49/21), networks (0.45/21).

Sample disparately-related singular-plural variants included: angle (0.31/23), angles (0.08/23); control (−0.25/21), controls (−0.01/21); electron (−0.40/6), electrons (−0.02/6), force (−0.52/6), forces (0.01/6), state (−0.26/10), states (−0.01/10).

Thus, the closely-related singular-plural variants had similar high factor loadings, and were conflated with minimal impact on the clustering results, since they were acting interchangeably in the clustering context. The disparately-related singular-plural variants had one high and one low factor loading, and were not conflated, since they were operationally different concepts with similar superficial appearance.

It should be strongly emphasized that the metric used for conflation justification was interchangeability, not co-occurrence of the variants in the same document, as proposed by (2). While intra-document co-occurrence may have been operable under some scenarios, there was no a priori reason that it should have been stated as a condition, metric, or requirement. One could have easily envisioned a corpus where singular-plural variants never co-occurred in the same document, yet behaved interchangeably (or didn't behave interchangeably). For example, a corpus of small documents, such as Titles or Abstracts, might not have contained word variants in the same document, but could have contained word variants behaving interchangeably even though they were in different documents. The condition to require was that the variants should have correlated or co-occurred similarly with other words in the corpus for the purpose of the application context. Thus, their variant was transparent from the perspective of the other words in the specific context of the application. Reference (2) would have had a much more credible condition had the metric been co-occurrence similarity of each word variant with other (non-variant) words in the text, rather than high co-occurrence with other forms of the variant.

Once the conflation-justified variants were identified by the factor matrix filter, they were then combined to lower the dimensionality of the system, and used to generate a co-occurrence matrix. This 250 word square matrix was imported into an Excel statistical package add-in named WINSTAT (Excel has an approximate 250 column limitation), and used as the basis for a multi-link clustering algorithm.

In summary, credible conflation was shown to be context and application sensitive. The metric for determining conflation credibility should have been driven by the context and application. For the clustering application described in this example, correlation-driven interchangeability was the appropriate metric, rather than the variant co-occurrence-based metric proposed in (2).

Example 3

Formation Retrieval/Marginal Utility/Tracking

This example describes an iterative full-text information retrieval approach based on relevance feedback with term co-occurrence and query expansion (Simulated Nucleation). The method generated search terms from the language and context of the text authors, and was sufficiently flexible to apply to a variety of databases. It provided improvement to the search strategy and related results as the search progressed, adding relevant records to the information retrieved and subtracting non-relevant records as well. Finally, it allowed maximum retrieval of relevant records with high signal-to-noise ratio by tracking marginal utility of candidate query modification terms using a semi-automated optimization procedure. The method was applied to information retrieval for the technical discipline of textual data mining (TDM).

In Simulated Nucleation for information retrieval, the purpose was to provide a tailored database of retrieved documents that contained all relevant documents from the larger literature. In the initial step of Simulated Nucleation, a small core group of documents mainly relevant to the topic of interest was identified by the topical domain experts. An inherent assumption was then made that the bibliometric and phrase patterns and phrase combinations characteristic of this relevant core group would be found to occur in other relevant documents. These bibliometric and phrase patterns and phrase combinations were then used to expand the search query.

While both bibliometrics and computational linguistics were used in Simulated Nucleation to identify unique characteristics of each category, the bulk of the development effort has concentrated on the computational linguistics. Therefore, the bulk of the remainder of this example will address the computational linguistics.

There were two major Simulated Nucleation approaches for expanding the number of relevant documents and contracting the number of non-relevant documents. The first was a manually intensive approach that required the reading of many sample Abstracts to separate the relevant from non-relevant documents, and then identified candidate query terms from computational linguistics analysis of each document category. The second was a semi-automated approach that used computer-based document clustering techniques for separating the relevant from non-relevant records, but still required manual identification of candidate query terms from computational linguistics analysis of each separate document category. Since the first approach provided somewhat more accurate results, albeit requiring substantially more time and labor, it will be the only approach described in detail.

The operational objective of Simulated Nucleation was to generate a query that had the following characteristics:

Retrieve the maximum number of records in the technical discipline of interest

Retrieve substantial numbers of records in closely allied disciplines

Retrieve substantial numbers of records in disparate disciplines that have some connection to the technical discipline of interest Retrieve records in aggregate with high signal-to-noise ratio (number of desirable records large compared to number of undesirable records)

Retrieve records with high marginal utility (each additional query term will retrieve large ratio of desirable to undesirable records)

Minimize query size to conform to limit requirements of search engine(s) used

To achieve these objectives, the Simulated Nucleation process contained the following steps:

Definition of study scope

Generation of query development strategy

Generation of test query

Retrieve records from database; select sample

Divide sample records into relevant and non-relevant categories

Perform computational linguistics on each category

Use new algorithms to identify phrases unique to each category

Use new algorithms to identify phrase combinations unique to each category

Use new algorithms to identify marginal value of adding each phrase and phrase combination to query Construct modified query Repeat process until convergence obtained Each of these steps will now be described in more detail.

The process began with a definition of the scope of the study by all participants. Within the context of this scope, an initial query was constructed. (Since each iterative step follows the same procedure, only one iterative step from the study of TDM will be described.) Queries were scope dependent. Typically, when a new scope was defined, a new query was developed. However, due to the iterative nature of Simulated Nucleation, when the scope became more focused within the overall topical domain as the study proceeded, the new scope was accommodated within succeeding iterations. Such a scope sharpening did occur during the course of the illustrative TDM example, and the accommodation of the new scope within the iterative process will be summarized now.

For the TDM study example, the initial TDM scope was defined as retrieving records related to textual data mining in the larger context; i.e., including information retrieval. As the study proceeded, the scope was restricted to documents that focused on understanding and enhancing the quality of the TDM process, as opposed to using standard TDM approaches to perform specific studies.

The next step in the Simulated Nucleation process was generation of a query development strategy. Past experience with Simulated Nucleation has shown that the structure and complexity of a query were highly dependent on:

the objectives of the study;

the query construction philosophy;

the contents of the database selected;

the fields queried within the database;

the background and perspectives of the expert(s) constructing the query;

the parametric tradeoffs made (comprehensiveness of records, signal-to-noise ratio, number of iterations, resources available)

These query dependencies were taken into account when structuring the initial query. Different initial queries eventually evolved to similar final queries through the iterative process. However, higher quality initial queries resulted in a more streamlined and efficient iterative process.

Specifically, one of the key findings from ongoing text mining studies was that, in general, a separate query had to be developed for each database examined. Each database accessed a particular culture, with its unique language and unique types of documentation and expression. A query that optimized (retrieved large numbers of desirable records with high signal-to-noise ratio) for one database within the context of the study objectives was sometimes inadequate for another database.

For example, a text mining study published in 2000 focused on the R&D of the aircraft platform. The query philosophy was to start with the generic term AIRCRAFT, then add terms that would expand the numbers of aircraft R&D records (mainly journal paper Abstracts) retrieved and would eliminate records not relevant to aircraft R&D. Two databases were queried, the Science Citation Index (SCI—a database accessing basic research records) and the Engineering Compendex (EC—a database accessing applied research and technology records). The SCI query required 207 terms and three iterations for an acceptable signal-to-noise ratio, while the EC query required 13 terms and one iteration to produce an even better signal-to-noise ratio. Because of the technology focus of the EC, most of the records retrieved using an aircraft or helicopter type query term focused on the R&D of the aircraft platform itself, and were aligned with the study goals. Because of the research focus of the SCI, many of the records retrieved focused on the science that could be performed from the aircraft platform, rather than the R&D of the aircraft platform, and were not aligned with the study goals.

Therefore, no adjustments were required to the EC query, whereas many negation terms (NOT Boolean terms) were required for the SCI query to eliminate aircraft records not aligned with the main study objectives.

In TDM, queries, as well as follow-on computational linguistics analyses, sometimes provided misleading results if applied to one database field only. The text fields (Keywords, Titles, Abstracts) were used by their originators for different purposes, and the query and other computational linguistics results sometimes provided a different picture of the overall discipline studied based on which field was examined.

As an example, in the aircraft study referenced previously, queries were applied to all text fields (Keywords, Titles, Abstracts) simultaneously. However, follow-on phrase frequency analyses for TDM were performed on multiple database fields to gain different perspectives. A high frequency Keyword focal area concentrated on the mature technology issues of longevity and maintenance; this view of the aircraft literature was not evident from the high frequency Abstract phrases. The lower frequency Abstract phrases had to be accessed to identify thrusts in this mature technology/longevity/maintenance area.

Also, the Abstract phrases from the aircraft study contained heavy emphasis on laboratory and flight test phenomena, whereas there was a noticeable absence of any test facilities and testing phenomena in the Keywords. There was also emphasis on high performance in the Abstract phrases, a category conspicuously absent from the Keywords. In fact, the presence of mature technology and longevity descriptors in the Keywords, coupled with the absence of high performance descriptors, provided a very different picture of aircraft literature research from the presence of high performance descriptors in the Abstract phrases, coupled with the absence of mature technology and longevity/maintenance descriptors.

The TDM analytical procedure in which Simulated Nucleation was imbedded and the query construction were not independent of the analyst's domain knowledge; they were, in fact, expert-centric. The computer techniques played a strong supporting role, but they were subservient to the expert, and not vice versa. The computer-derived results helped guide and structure the expert's analytical processes; the computer output provided a framework upon which the expert constructed a comprehensive story. The final query and study conclusions, however, reflected the biases and limitations of the expert(s). Thus, a fully credible query and overall analysis required not only domain knowledge by the analyst(s), but probably domain knowledge representing diverse backgrounds (i.e., multiple experts). It was also found useful in past and ongoing text mining studies to incorporate a generalist with substantial experience in constructing queries and analyzing different technical domains. This person identified efficient query terms and unique patterns for that technical domain not evident to the more narrowly focused domain experts.

Constructing an R&D database query that will retrieve sufficient technical documents to be of operational use was not a simple procedure. It required:

close interaction with technical experts;

in-depth understanding of the contents and structure of the potential databases to be queried by the study performers;

sufficient technical breadth of the study performers in aggregate to understand the potentially different meanings and contexts that specific technical phrases could have when used in different technical areas and by different technical cultures (e.g., SPACE SATELLITES, SATELLITE CLINICS, SATELLITE TUMORS);

an understanding of the relation of these database contents to the problem of interest; and substantial time and effort on the part of the technical expert(s) and supporting information technologist(s).

There were two generic types of query construction philosophy that have been used with Simulated Nucleation. One philosophy started with relatively broad terms, and built the query iteratively. Many of the additional terms were non-relevant to the scope of the study due to the multiple meanings the more general terms may be assigned. Some query modification procedure was required to eliminate non-relevant records. For example, in the aircraft R&D study, this general approach was used. The query started with AIRCRAFT, and then was modified to remove terms that would result in retrieving aircraft records not related to the R&D of the aircraft platform. While the emphasis of these later iterations was reduction of non-relevant records, there were terms added to the query that retrieved new records.

The other philosophy started with relatively specific terms, and built the query iteratively as well. Most of the additional query terms retrieved relevant records. Because of the specificity of the query terms, records relating to the more general theme and scope of the study were, in some cases, overlooked.

Also, within both philosophies, if multiple iterations were used, the focus was different for each iterative step in the temporal sequence. The earlier iterations emphasized adding query terms to expand the number of relevant records retrieved, while the later iterations emphasized modifying the query to reduce the number of non-relevant records retrieved.

Each iteration allowed new related literatures to be accessed, and additional relevant records to be retrieved. However, additional time and money were required for each added iteration, because of the intense analysis required per iteration.

In practice, the two main limiting parameters to the length of a study were number of iterations and resources available. Two practical cases of interest were addressed.

The first case resulted from severe resource constraints. In this case, the objective was to minimize the number of iterations required to develop the query subject to a threshold signal-to-noise ratio on retrieved records. The strategy for a single iteration query was to generate a test query (initial guess), categorize the retrieved records into relevant and non-relevant bins, apply computational linguistics to each bin, and select only those phrases and phrase combinations that are strongly characteristic of the relevant bin for the modified query. The ratio for phrase selection cutoff was determined by the marginal utility of each phrase as a query term. The resulting records retrieved with this modified query had very high signal-to-noise ratio, as confirmed by sampling a few records retrieved with this modified query. However, their coverage was limited. The more generic terms that could have retrieved additional relevant records (along with some non-relevant records) were not employed.

The second case resulted from relaxed resource constraints. In this case, the objective was to maximize the number of records retrieved subject to a threshold signalto-noise ratio. The general strategy for multiple iteration query development was to focus the initial iterations on expanding the number of relevant records retrieved, including the addition of non-relevant records, and then devote the last iteration mainly to eliminating the non-relevant records. A two iteration query development was used to illuminate the concept.

The strategy for the first iteration of a two iteration signal maximization query was to generate a test query (initial guess), categorize the retrieved records into relevant and non-relevant bins, apply computational linguistics to each bin, and select only those phrases and phrase combinations that were moderately to strongly characteristic of the relevant bin for the modified query. The resulting records retrieved with this modified query had a modest signal-to-noise ratio. However, their coverage was expanded relative to the previous (single iteration) case. The more generic terms that could retrieve additional relevant records (along with some non-relevant records) were employed.

The strategy for the second iteration of the two iteration signal maximization query was to use the modified query generated from the first iteration as a starting point, and categorize the retrieved records into relevant and non-relevant bins. Then, computational linguistics was applied to each bin, and those phrases and phrase combinations that are strongly characteristic of the non-relevant bin for the modified query were selected. Since new phrases resulted from the expanded relevant records retrieved by the modified first iteration query, some phrases and phrase combinations that were very strongly characteristic of the relevant bin were also added. Again, the threshold ratio for phrase selection cutoff was determined by the marginal utility of each phrase as a query term. Then, these mainly negation phrases were added to the second iteration starting point query to produce the final modified query. The resulting records retrieved with this final modified query had a very high signal-to-noise ratio, as confirmed by sampling a relatively few records retrieved by this final query, and their coverage was expanded relative to the previous case.

In the truly resource unlimited case where the number of iterations were relatively unbounded, the following approach was taken. The number of relevant records after each iteration were plotted as a function of iteration number, and the process was terminated as the slope decreased to zero.

An initial guess of relevant query terms was made, and this test query was entered into the search engine. As in most iterative solutions, the iteration efficiency and speed depended on the initial test query, although the final query structure was moderately independent of the test query. As resources became more constrained, and the number of iterations was reduced, the final query quality became more dependent on initial test query quality.

As stated above, the query selection was also database, and database field, dependent. Since multiple databases with multiple fields tended to be used in many TDM studies, in theory a query would have to be tailored for each field in each database. In order to minimize multiple query development, the query development philosophy with respect to databases and database fields has been to select the database and field for query construction that required development of the most complex query. Then, this query, or segments thereof, was used to search all the fields in all the databases. This approach contained the inherent assumption that queries adequate for all the databases examined will be subsets of the most complex query developed.

For the semi-structured R&D databases, experience has shown that the SCI tended to require the most complex query, since the language of research was quite diverse and filled with multiple meanings and interpretations. Within the SCI, the Abstract field contained the richest diversity and interpretation of language. Most of the queries used so far in the text mining studies have been developed for the Abstract field of the SCI, and have been applied in whole or part to the other text fields in the SCI and the other semi-structured databases used. These SCI Abstract-based queries have been adequate for high quality record retrieval from the other databases, for the topical areas examined so far.

After the test query, database, and database fields had been selected, the query was entered into the database search engine, and the resulting records were retrieved. Because of the large volume of records that were sometimes retrieved, the operational philosophy of the text mining studies using Simulated Nucleation has been to select a sample $S_0$ of the records retrieved, and use this sample as the basis for analysis during each iterative step. The full complement of records retrieved was accessed when the final query had been entered into the search engine, and a small sample Sf was examined to insure that the signal-to-noise ratio was at or greater than a desired threshold.

This sample size $S_0$ depended on a number of factors, including which of the two Simulated Nucleation options is chosen. Since the reading of some or all of these records was a necessary component of the manually intensive Simulated Nucleation protocol, and since this reading was a time consuming process, the number of records selected for reading became a critical factor in the labor intensity of the process. For the semi-automated document clustering option, minimizing the sample size was not as critical as in the manually intensive option.

From a statistical perspective, there were two main determinants of sample size $S_0$. The weaker determinant was statistical adequacy for dividing the sample into two categories: relevant and non-relevant. Relatively few records were required for making this black-white decision. The more stringent determinant was that the phrase and phrase combination frequencies resulting from the computational linguistics analysis of the sample were of sufficient magnitude that:

1) Important and unique phrases and phrase combinations were separated from background phrases and phrase combinations within the same relevance/non-relevance category, and 2) Important and unique phrases and phrase combinations in one relevance/non-relevance category were distinguished from phrases and phrase combinations in the other relevance/non-relevance category to establish the dominant category for specific phrases and phrase combinations.

Because of language breadth and richness differences among myriad disciplines, fixed size samples yielded far different results in absolute values of phrase frequencies from the retrieved records. For example, Table 1 is a compendium of the statistics of high frequency technical content phrases from previous text mining studies using variants of Simulated Nucleation. The first column is the abbreviated title of the study. The second column is the number of records retrieved from the database (SCI) by the final query. The third column in the upper table is the frequency of occurrence of the highest technical content single word phrase, and the fourth and fifth columns are the frequencies for the commensurate double and triple word phrases. The third and succeeding columns in the lower table are the unitized version of the upper table; i.e., frequencies divided by number of records. The sixth column in the upper table is the frequency of occurrence of the second highest technical content single word phrase, and the seventh and eighth columns are the same for double and triple word phrases.

A scan of the unitized results showed that, for a specific phrase word length, the variation across different studies was a factor of five or more. For a specific study, the single word phrases were about an order of magnitude higher frequency than the double word phrases, which were in turn typically factors of two to three larger than the triple word phrases. For some of the text mining studies in process, where the phrase combination frequencies were being tracked, the highest technical content phrase combinations had single word phrases for each member. The phrase combinations had frequencies typically between the frequencies of single and double word phrases not in combination.

quality of the textual content contained within the fields accessed. There was a tradeoff of evaluation time vs. level of description for each field, or combination of fields, selected for the relevance judgment. If, for example, the only textual field supplied from each record for the relevance judgment were Keywords, the evaluation time per record was short, but relatively little technical content and contextual information was available to serve as a basis for making a credible relevance judgment. Addition of the Title field provided more context, with a negligible addition in evaluation time. Addition of the Abstract field provided substantially more technical content and context, along with a noticeable increase in evaluation time. Finally, addition of the full paper's text provided the most content and context, along with an unacceptably large increase in evaluation time. Most of the semi-structured databases supplied the

TABLE 1

STATISTICS OF HIGH FREQUENCY TECHNICAL CONTENT PHRASES

STATISTICAL SAMPLING OF RETRIEVED RECORDS

| TOPIC | #REC | TOP 1 WORD FREQ | TOP 2 WORD FREQ | TOP 3 WORD FREQ | SECOND 1 WORD FREQ | SECOND 2 WORD FREQ | SECOND 3 WORD FREQ |
|---|---|---|---|---|---|---|---|
| RIA | 2300 | 1189 | 152 | 36 | 632 | 54 | 31 |
| JACS | 2150 | 1190 | 356 | 57 | 710 | 165 | 53 |
| NES | 5481 | 6517 | 579 | 227 | 6268 | 541 | 193 |
| HYP | 1284 | 3686 | 696 | 187 | 2061 | 517 | 69 |
| AIR | 4346 | 3959 | 329 | 176 | 3147 | 231 | 114 |
| HYD | 4608 | 5503 | 1839 | 393 | 3483 | 803 | 213 |
| FUL | 10515 | 12879 | 764 | 764 | 6791 | 479 | 191 |

NORMALIZED PHRASE FREQUENCIES PER RECORD RETRIEVED

| TOPIC | TOP 1 WORD FREQ | TOP 2 WORD FREQ | TOP 3 WORD FREQ | SECOND 1 WORD FREQ | SECOND 2 WORD FREQ | SECOND 3 WORD FREQ |
|---|---|---|---|---|---|---|
| RIA | 0.516957 | 0.066087 | 0.015652 | 0.274783 | 0.023478 | 0.013478 |
| JACS | 0.553488 | 0.165581 | 0.026512 | 0.330233 | 0.076744 | 0.024651 |
| NES | 1.189017 | 0.105638 | 0.041416 | 1.143587 | 0.098705 | 0.035213 |
| HYP | 2.870717 | 0.542056 | 0.145639 | 1.60514 | 0.402648 | 0.053738 |
| AIR | 0.910953 | 0.075702 | 0.040497 | 0.724114 | 0.053152 | 0.026231 |
| HYD | 1.194227 | 0.399089 | 0.085286 | 0.755859 | 0.174262 | 0.046224 |
| FUL | 1.224822 | 0.072658 | 0.072658 | 0.645839 | 0.045554 | 0.018165 |

Thus, the driving factor for statistical representation was the frequency of triple word phrases. Operationally, it was desirable if this frequency were about an order of magnitude higher than background. This was needed both for purposes of discrimination, and because frequencies of all types of phrases declined very rapidly from the maximum. Because of the wide range of frequencies possible, sample sizes in previous Simulated Nucleation studies have tended to be over-selected to insure statistically significant representation.

The division of sample records into relevant and non-relevant categories was a crucial step in the process, since it represented the conversion of the study's scope from a theoretical abstract to an implementation requiring decisions on each retrieved record. In the manually intensive option, the technical domain experts associated with the study read each of the sample records, and assigned a level of relevance to each record. There were two main determinants to the quality of the relevance judgment: the quality of the records, and the expertise and background of the experts.

The quality of the records relative to the requirements for the relevance judgment task depended on the records' fields accessed and displayed for the relevance judgment, and the Abstract, as opposed to the full text of the paper, and a substantial additional amount of time was necessary in the process of obtaining the full paper.

Thus far, the text mining studies have almost exclusively used Keywords, Titles, and Abstracts as the text fields for making the relevance judgment. One operational problem experienced was that the quality of the Abstracts varied substantially, and therefore provided an uneven playing field for the relevance decision. While much of the medical literature contained an informal protocol for the structure of its papers' Abstracts (called Structured Abstracts), and adherence to this protocol provided a threshold amount of useful information for relevance judgment purposes, the non-medical literature had no obvious structure or information threshold requirements. In some cases, the information in the Abstract was sufficiently vague that a credible relevance judgment could not be made, and this degraded the quality of the final query.

Up to the present, the text mining studies performed have used two relevance categories: relevant to the study's scope, and non-relevant to the scope. Degrees of relevance could be used, and this approach may be implemented at some future time, but the two categories have proven adequate for past studies.

Experience has shown that the process of having to make a binary decision (on the relevance or non-relevance of a retrieved record) sharpened the focus of the study measurably. In addition, the process of reading a representative sample of Abstracts provided an excellent overview and substantial insights into the total discipline being examined. Therefore, the extra time spent by the experts on this step due to the over-sampling of the retrieved records was time well spent. For the TDM example, and many of the other studies as well, about 60 records per hour were processed when the full Abstracts were read, and perhaps 80–90 records per hour were processed when the Abstracts were not read completely. Approximately 20–25 hours were required to read the records and place them into the appropriate category for the iterative step of the TDM study described here.

The time consumption of this categorization step in the manually intensive option was the major driver for developing the clustering option. There was still some sampling required for the document clustering option, to assess the fidelity of the separation process for each database and thematic topic used.

Once the documents had been divided into relevant/non-relevant categories, then characteristics of records in each category were obtained by a variety of computer-based techniques (bibliometrics, computational linguistics), and these characteristics were then used to select other documents from the source database with similar characteristics. The underlying assumption was that records in the source database (e.g., SCI, EC) that had the same characteristics as the relevant records from the sample were also relevant (or, more correctly, had a high probability of being relevant), and records in the source database that had the same characteristics as the non-relevant records from the sample were also non-relevant. Different degrees of relevance were of potential interest, depending on the overall study's objectives. Highly relevant, or similar, articles provided comprehensive retrieval of papers in the specific target field of interest. Less similar articles, but still containing some similar characteristic features, offered the opportunity for retrieval of papers in highly disparate, yet linked, disciplines. These types of papers offered the possibility of discovery and innovation from complementary literatures.

The myriad characteristics that were used in the search for congruency depended on the breadth of features (fields) available in the source database search engine. In addition to the text fields in the semi-structured databases to which computational linguistics have been applied for characteristic pattern matching, the following other fields have been used in selected cases:

Authors; Journals; Institutions; Sponsors; and Citations.

Use of these fields to help identify relevant records, in addition to use of the text fields only, produced more relevant records than use of the linguistics patterns in the text fields alone. For TDM analyses whose objective was to provide an overview of a topical domain, and focus on trends and higher-order statistics, the computational linguistics resulted in more than adequate statistically representative samples of retrieved records. For TDM analyses whose objective was to impact organizational operations and specific funding decisions, as many of the above fields as is practical were used to identify as many relevant records as possible.

The specific rationale for using some of these other fields is described briefly.

An author of a few relevant documents tended to work in technical areas similar to those characteristic of the relevant documents. Therefore, a search for other publications by the same author had a good probability of retrieving similar relevant documents. One problem with using the Author field was that present-day semi-structured databases don't assign unique names or numbers to each author. Searching for publications from an author with a common name resulted in retrieval of many extraneous records. Manual filtering required a time-intensive filtering process. Cluster filtering reduced the time intensity of the separation process.

A journal that contained a few relevant documents tended to contain many more, given the specialized nature of most journals.

An institution that produced a few relevant documents tended to produce many others as well. Institutions tended to concentrate their efforts in core competency areas. Accession to these institutions' program outputs resulted in uncovering related documents. Unfortunately, institution organizational unit levels specified by the author, and institutional abbreviations, were not standardized. As in the author field case, either substantial manually intensive filtering was required, or the problem was alleviated by cluster filtering.

An R&D sponsor whose output included a few relevant papers, or more specifically a program or project from such a sponsor, tended to produce other relevant documents. Sponsors, like institutions, tended to concentrate their funds in core competency areas. Accession to these sponsors' program outputs result in uncovering related documents. One problem is that this sponsor database field appeared only sporadically in semi-structured R&D databases.

There are at least three ways in which the citation field was used to help identify additional relevant papers.

Papers that cited relevant documents tended to have thematic similarity to the relevant document. The more relevant documents cited by a given paper, the higher was the probability that the citing document was relevant. One of the problems here was that cross-linked citations were not available in many semi-structured R&D databases.

In parallel with the previous sub-section, papers that were cited by relevant documents tended to be relevant. The more times a paper was cited by different relevant documents, the higher was the probability that the cited paper was relevant.

The first two examples dealt with relevance resulting from direct citations, where the probability of relevance increased as the numbers of citations increased. This third example is one step removed from a direct relationship. A paper had increased chances of being relevant when it was cited by a paper that also cited relevant documents. The larger the number of relevant documents that the citing paper referenced, and the larger the number of citing papers that referenced the paper of interest and also cited other relevant papers, the higher was the probability that the target paper was itself relevant.

In addition, other papers by authors/journals/organizations that cited relevant papers had increased probability of being relevant, as well as other papers/journals/organizations that were cited by relevant papers. The reasons parallel those given above for authors, journals, and organizations.

The remainder of this section will focus on use of the text fields as a source of linguistic patterns for identifying related documents.

Once the records had been sorted into relevant/non-relevant categories, or sometimes in more discrete relevance bands, then each band was clustered. The purpose of this clustering step was to identify the major characteristics, or thrusts, of each band for each level of relevance category. This thrust information was used later during term selection for query development, where it was desired to have some representation from each thrust contained in the query. This insured that no major relevance category characteristic was overlooked during the query development phase.

If document clustering was used for the relevance/non-relevance sorting process, it served two purposes. First, it generated groupings, which the human analyst(s) then assigned to the different relevance categories. Second, the groupings in the relevant categories were used as a guide to insure that query phrases were selected to represent each major thematic area. Any major non-relevant categories were represented in the query as well, to insure that the major classes of non-relevant records were not retrieved.

The purpose of this step was to identify linguistic patterns uniquely characteristic of each category (relevant and non-relevant records), and use this information to modify the query. The underlying assumption was that records in the source database (e.g., SCI, EC) that had the same linguistic patterns as the relevant records from the sample were also relevant (or, more correctly, had a high probability of being relevant), and records in the source database that had the same linguistic patterns as the non-relevant records from the sample were also non-relevant. Linguistic patterns characteristic of the relevant records were used to modify the query such that additional relevant records were retrieved from the source database. Linguistic patterns characteristic of the non-relevant records were used to modify the query such that existing and additional non-relevant records were not retrieved.

The example focused on two types of congruency metric patterns for identifying candidate query modification terms: phrase frequencies and phrase proximity statistics. In entropic terms, these pattern metrics were macro-state descriptors. There were many linguistic micro-states (where the ordering of the phrases was included in the descriptors) that corresponded to any one macro-state. These two high entropy macro characteristics proved to be adequate for identifying the full complement of relevant records.

For the TDM study, the frequencies of all single, adjacent double, and adjacent triple word phrases in the Abstract in each category were obtained with the phrase analysis algorithms, and then the phrases in close proximity to selected theme phrases in the Abstracts were also obtained with the same algorithms. The next few paragraphs summarize how the phrases and phrase combinations actually used for query modification were obtained from the raw computer output of this step using the recently developed selection-support algorithms.

In the following paragraphs, construction of a query with the aid of the new algorithms is presented as a two-step process. At the beginning of the first step (described in detail in the next section), all high technical content phrases occurring in the total sample were listed in descending numerical order based on their frequency of occurrence in each relevance category. Then, four types of generic judgments were made on each phrase.

1) It belonged in the modified query as a stand-alone phrase (e.g., the phrase 'TEXT DATA MINING' belongs in the modified query as is)
2) Its components belonged in the modified query in some combination (e.g., the combination 'TEXT' and 'DATA MINING' were added to the query)
3) The phrase and any component permutations did not belong in the modified query (e.g., 'TEXT DATA MINING' or any combination of component phrases did not belong in the modified query)
3) It was a candidate for the modified query in combination with some other phrase(s) (e.g., 'TEXT DATA MINING' was be too generic to be added to the query as a stand-alone phrase, but gained enough specificity when added to the query in combination with another phrase).

In addition, the condition that all thematic thrusts in the relevant category, and at least the major thematic thrusts in the non-relevant category, should be represented in the query was checked periodically for compliance.

When a large number of iterations were used to construct the query, the terms added to the query in the early iterations were those characteristic of the relevant category (for expanding records retrieved). The (negation) terms added to the query in the last iteration were those characteristic of the non-relevant category (for contracting records retrieved). The component of query construction resulting from the first step was the group of phrases positively identified from the first type of judgment.

In the second step, proximity runs were made using the candidate phrases from the fourth type of judgment (above) as themes. The resulting phrase combinations were listed in descending numerical order based on their frequency of occurrence in each category of the total sample. Then, two types of judgments were made on each phrase combination.

1) It belonged in the modified query as a phrase combination
2) It did not belong in the modified query The judgments in each step were made within the context of the larger query development objectives (discussed previously), and summarized as follows: The over-riding objective of query construction was to 1) select the minimum number of phrases that 2) retrieved the maximum number of relevant records with 3) the requisite threshold signal-to-noise ratio, while insuring representation from each of the thematic categories. Specifically, when dealing with a sample of records, the objective was to select the minimum number of phrases that retrieved the maximum number of sample records in each of the two categories. The assumption was that this retrieval efficiency for the sample would extrapolate to the total records retrieved.

Phrases and their associated frequencies were extracted from the text of the records in the relevant and non-relevant categories. These phrases and frequencies were then imported into the ACCESS-based database, hereafter referred to as a template. Then, a normalization procedure was performed on the frequencies such that they represented the situation where the numbers of records in each category were equated.

The template had two major components, phrase frequency and phrase proximity (phrase combination frequency). Each had a separate display window, but both components were linked algorithmically. The phrase frequency component aided in the selection of stand-alone phrases for the modified query and potential anchor phrases for phrase combinations. The phrase proximity component aided in selection of phrase combinations for the modified query. The present section describes the phrase frequency component.

Table 2 shows the display window from the template's phrase frequency component for the TDM example. Each template row contained a phrase extracted from the Abstracts' text, and nine associated numerical and other indicators for that phrase. The analyst saw the phrase and its indicators in ten fields/columns on the computer screen. Six of the fields/columns are shown in Table 2. Proceeding from the leftmost column, the columns/fields are defined as:

TABLE 2

TEMPLATE PHRASE FREQUENCY DISPLAY

| PHRASE | NORM REL FREQ | NORM NON-REL FREQ | RATIO | DOM FREQ | DOM CATEG |
|---|---|---|---|---|---|
| IR | 207 | 3 | 69 | 207 | Relevant |
| TEXTUAL | 68 | 3 | 23 | 68 | Relevant |
| SEARCH ENGINES | 243 | 11 | 22 | 243 | Relevant |
| DOCUMENT | 331 | 16 | 21 | 331 | Relevant |
| ENGINES | 279 | 16 | 17 | 279 | Relevant |
| RELEVANCE | 286 | 19 | 15 | 286 | Relevant |
| SPATIAL | 7 | 107 | 15 | 107 | Non-Relevant |
| DOCUMENTS | 427 | 32 | 13 | 427 | Relevant |
| LEXICAL | 65 | 5 | 13 | 65 | Relevant |
| RELEVANCE FEEDBACK | 47 | 4 | 12 | 47 | Relevant |

1) Shown in FIG. 1—Phrase Frequency Metrics

PHRASE—This entry was a single, adjacent double, or adjacent triple word phrase that was extracted from one or both of the relevant/non-relevant categories. It survived a filtering by a trivial phrase algorithm, and ots frequency of occurrence in either the relevant or non-relevant category was above some pre-defined threshold.

There were intrinsically two types of phrases: those phrases included in the initial iteration test query, and those phrases not included in the test query, but extracted from the records retrieved with use of the test query. The difference between these two types of phrases was significant with respect to the interpretation and utilization of the associated numerical indices shown, as discussed in the definitions of the next three fields.

NORMALIZED RELEVANT FREQUENCY—The occurrence frequency of the phrase in the relevant category, after the normalization had been done on the category. If the phrase was included in the test query, the frequency represented not only the relative sample occurrence, but also the expected relative occurrence in the total source database. If the phrase was not included in the test query, the frequency still represented the relative sample occurrence, but was not a good indicator of the expected relative occurrence in the total source database.

NORMALIZED NON-RELEVANT FREQUENCY—The occurrence frequency of the phrase in the non-relevant category, after the normalization had been done on the category. The same argument about the significance of the phrase's appearance in the test query used in the previous paragraph holds here as well.

RATIO—The ratio of the above two normalized frequencies, with the dominant frequecy selected for the numerator. The same argument about the significance of the phrase's appearance in the test query used in the previous two paragraphs held here as well. This metric was used as the starting point for selecting candidate query terms, with the single iteration query limited to the higher metric values, and the maximal coverage multi-iteration query incorporating somewhat lower metric values as well.

DOMINANT FREQUENCY—The larger of the normalized frequencies of the phrase in the relevant or non-relevant categories.

DOMINANT CATEGORY—The category in which the phrase had the larger normalized frequency.

2) Not Shown in Table 2—Phrase Tracking

INCLUDE—This field was a block that the analyst checked if he/she decided the phrase (e.g., SEARCH ENGINES) was a stand-alone candidate for the modified query.

INCLUDED PHRASE—This field was a block that was automatically checked if the phrase in the first column (e.g., WEB SEARCH ENGINES) included a more generic phrase (e.g., SEARCH ENGINES) that received a check in the INCLUDE field. The purpose of this field was to eliminate duplications, in order to satisfy the query development criterion of minimal number of query terms.

In the preceding example, use of the phrase SEARCH ENGINES in the query automatically retrieved all of the records that contained the more specific phrase WEB SEARCH ENGINES. Therefore, there was no need for the analyst to consider WEB SEARCH ENGINES once the phrase SEARCH ENGINES had been selected. As will be shown later, in the section on phrase combinations, the INCLUDED PHRASE field in the phrase combination template was automatically checked if the phrase combination on a template row (e.g., DATA and SEARCH ENGINES) included a phrase (e.g., SEARCH ENGINES) that received a check in the INCLUDE field.

This phrase tracking capability was a major capability enhancement to Simulated Nucleation. It allowed the analyst to eliminate duplicative phrases and phrase combinations without having to remember which parent phrases or phrase combinations had been selected previously. Without this capability, examination of the many thousands of candidate phrases and phrase combinations that occurred with use of Simulated Nucleation, and identification of those that were not duplicative, were not operationally feasible.

THEME CANDIDATE—This field was a block that the analyst checked if he/she decided the phrase (e.g., DATA) was a candidate for a phrase combination (e.g., DATA and MINING) in the modified query.

ADDITIONAL NEW RECORDS—This field informed the analyst of the number of additional sample records that the phrase in the first column would retrieve. The purpose of this field was to eliminate effective duplications resulting from co-occurrence, in order to satisfy the query development criterion of selecting the minimum number of phrases that would retrieve the maximum number of sample records in each of the two categories. There were seven other fields used (not reported here) that provided a full accounting of how the candidate phrase was distributed within the sample records (distribution in relevant and non-relevant sample records, cumulative and marginal distributions, etc). This marginal utility capability was a major capability enhancement to Simulated Nucleation, and is described in more detail later.

To facilitate the initial phrase selection judgments, the phrases were sorted by the ratio of frequencies (column 4), in decreasing order. The higher ratio phrases were more uniquely characteristic of a specific category. From Table 2, TEXTUAL was more uniquely characteristic of relevant records in the sample, whereas SPATIAL was more uniquely characteristic of non-relevant records in the sample. For sample categories of equal numbers of records, TEXTUAL appeared 23 times more frequently in relevant records than non-relevant records, whereas SPATIAL appeared 15 times more frequently in non-relevant records than relevant records.

In selecting candidate phrases for the minimal iteration query, the technical expert(s) started at the top of the list (highest ratio). If the field INCLUDED PHRASE had a check, the expert went to the next phrase. If the field INCLUDED PHRASE did not have a check, the expert examined the dominant category.

If the phrase:
1) was dominant non-relevant;
2) had a high marginal utility based on the sample;
3) had reasons for its appearance in the non-relevant records that are well understood; and
4) WAS PROJECTED TO ELIMINATE RECORDS FROM THE SOURCE DATABASE (E.G., SCI, EC) MAINLY NON-RELEVANT TO THE SCOPE OF THE STUDY (especially important in the later iteration steps), then it was selected as a candidate stand-alone query modification phrase (i.e., the expert entered a check in the INCLUDE block). An additional consideration in phrase selection was that all of the main characteristics defined by the relevance category clustering process should have representation. Especially when phrases on the margin were being considered for query inclusion, some consideration to balance among clusters was given.

If the phrase:
1) was dominant relevant;
2) had a high marginal utility based on the sample
3) had reasons for its appearance in the relevant records that are well understood; and
4) AND WAS PROJECTED TO RETRIEVE ADDITIONAL RECORDS FROM THE SOURCE DATABASE (E.G., SCI) MAINLY RELEVANT TO THE SCOPE OF THE STUDY (especially important in the earlier iteration steps), then it was selected as a candidate stand-alone query modification phrase (i.e., the expert entered a check in the INCLUDE block). If these four criteria were not met, the expert did not select the phrase as a stand-alone query modification candidate. If these four criteria were met, and the phrase contained multiple words, the phrase selection was viewed as tentative. As the next section on phrase combinations shows, there were some combinations of the phrase's component words that were uniquely characteristic of one of the categories. Use of the phrase's component words (e.g., SEARCH and ENGINES) instead of the actual phrase (e.g., SEARCH ENGINES) retrieved more desired records, and therefore the combination of the phrase's component words were used instead of the actual phrase.

The first two of the criteria above (dominant category, high marginal utility) were numerically based and straight-forward. The third criterion (understand appearance in dominant category) was essentially a requirement for, and supportive of, the fourth criterion (project dominant category occurrence in total source database). For the first type of phrase discussed previously (included in test query), the source database projection was straight-forward, and was reflected by the ratio metric. For the second type of phrase discussed previously (not included in test query), the actual source database occurrence ratio was, in some cases, far different from the projection based on the ratio metric. The IR example discussed after the next paragraph was an excellent demonstration of the misestimate of total source database occurrence possible with the second type of phrase. This estimation error for the second type of phrase was reduced as the third criterion was met more stringently.

The few text mining studies that have been done with these latest algorithmic capabilities for the minimal (one) iteration case showed that if high ratio dominant relevant terms were selected (with care), essentially all the retrieved records were relevant, and dominant non-relevant terms were not required. Examples from the general minimal iteration case of the TDM study will now be demonstrated.

As an example from Table 2, the phrase IR (an abbreviation used in many of the TDM study Abstracts for information retrieval) was dominant relevant (ratio of 69) based on the sample, and had a high marginal utility based on the sample. However, it was not 'projected to retrieve additional records from the source database mainly relevant to the scope of the study'. A test query of IR in the source SCI database showed that IR occurred in 65740 records dating back to 1973. Examination of only the first thirty of these records showed that IR was used in science and technology as an abbreviation for Infrared (physics), Immunoreactivity (biology), Ischemia-Reperfusion (medicine), current(I)× resistance(R) (electronics), and Isovolume Relaxation (medical imaging). The number of records in this database in which IR occurred as an abbreviation for information retrieval was probably one percent of the total records retrieved containing IR, or less. Therefore, the phrase IR was not selected as a stand-alone query modification candidate.

Continuing on Table 2, the phrase SEARCH ENGINES was dominant relevant based on the sample, had a high marginal utility based on the sample, tended to occur in Abstracts focused on the information retrieval component of textual data mining, and was 'projected to retrieve additional records from the source database mainly relevant to the scope of the study'. Therefore, the phrase SEARCH ENGINES was selected as a stand-alone query modification candidate, and a check was entered in its INCLUDE block.

Continuing further on Table 2, the phrase SPATIAL was dominant non-relevant, had a high marginal utility based on the sample, tended to occur in Abstracts focused on numerical data mining, and was 'projected to eliminate records from the source database mainly non-relevant to the scope of the study'. Whether SPATIAL was selected as a candidate stand-alone query term depended on the strategy for including or excluding terms from the original test query.

If the terms from the test query were retained for the modified query, and terms identified from the computational linguistics results added to this query, then SPATIAL was selected as a candidate stand-alone query modification phrase, and a check was entered in its INCLUDE block. If the terms from the test query were in general not retained as a starting point for the modified query, and only terms identified from the computational linguistics results were used to construct the modified query (some of these terms could also have been in the test query), then SPATIAL was not selected as a candidate stand-alone query modification phrase. The reasoning is straight-forward: SPATIAL was selected because it occurred mainly in non-relevant records that resulted from the inclusion of some of the terms in the test query. If these non-relevant record generating terms were not required for the modified query, than there was no reason to use terms that would negate these (non-existing) non-relevant records.

As these examples from Table 2 show, substantial judgment had to be exercised when selecting candidate phrases, even when using this new phrase selection-support algorithm. When potentially dominant relevant query modification terms were being evaluated, one had to consider whether substantial amounts of non-relevant records were also be retrieved, and when potentially dominant non-relevant query modification terms were being evaluated, one had to consider whether substantial amounts of relevant records were not being retrieved. For a fixed number of query modification iterations, excess 'noise' records retrieved by broad query terms with multiple meanings degraded the overall quality of the retrieved record database. Conversely, when the constraint was a fixed signal-to-noise ratio for the retrieved records database, then additional iterations were required to remove the 'noise' records resulting from the overly broad and multiple-meaning terms. This translated into additional time and other resources.

Thus, the relation of the candidate query term to the objectives of the study, and to the contents and scope of the total records in the full source database (e.g., all the records in the SCI, not just those retrieved by the test query), had to be considered in query term selection. The quality of this selection procedure depended upon the expert(s)' understanding of the scope of the study, and the expert(s)' understanding of the different possible meanings of the term across many different areas of R&D.

The expert then proceeded down the list identifying candidate query terms until one of two conditions was reached. Either the number of terms summed to some pre-determined maximum (e.g., a given search engine has a ceiling of fifty query terms), or the ratio of frequencies reached a threshold. For the TDM study, and other very recent studies in which this algorithm was used, a phrase frequency ratio threshold of eight was used for the minimal iteration objective. In addition, for the TDM study, a condition of marginal utility (new 'signal' records retrieved divided by new 'noise' records retrieved) for each term was used. This condition was determined by the latest selection-support algorithm, and will be described later.

Only the differences in procedures between this case and the previous minimal (one) iteration case will be discussed. The baseline minimal iteration case was where all the modified query terms result from the computational linguistics results. For this single iteration case, only the high ratio terms characteristic of the relevant records were selected as candidate stand-alone query modification terms.

For the maximal coverage case, the initial iterations were not restricted to selecting high ratio terms characteristic of the relevant records as stand-alone query modification terms. Lower ratio terms characteristic of the relevant records were selected as well for the initial iterations. This strategy resulted in the retrieval of more relevant records due to the use of the (typically) broader terms characteristic of the lower ratios, as well as the retrieval of some non-relevant records during the early iterations.

To eliminate the non-relevant records, there were two major options. In the more conservative option, the final iteration consisted of identifying only the high ratio phrases characteristic of the non-relevant records, and adding them to the test query for the final iteration. Since all new records were added as a result of the query from the previous iteration, and no new records were added as a result of adding negation terms to this query, there was no chance that new 'noise' records will be added as a result of the final query.

In the more risky option, the final iteration consisted of identifying the high ratio phrases characteristic of the relevant and non-relevant records, and adding them to the test query. This had two potentially negative effects. First, the phrases characteristic of the relevant records were the more restricted high ratio phrases rather than the more inclusive moderate ratio phrases. This was necessary to increase the probability that new 'noise' records were minimized. Second, the negation terms strictly addressed the records retrieved by the query resulting from the previous iteration, and one could not be completely sure that addition of high ratio phrases characteristic of the relevant records did not retrieve an anomalously large number of 'noise' records. On the positive side, one iteration had been eliminated by this option.

Until this point in the query term selection protocol, only the high frequency ratio relatively specific phrases had been considered for the minimal iteration case, and moderate to high ratio relatively specific phrases for the maximal coverage case. Phrases that had a high absolute frequency value in the dominant category, but a relatively low frequency ratio, had the potential to be used in combination with other phrases to still retrieve (or eliminate) a significant number of records in the desired category. One objective of the following step was to identify those high frequency low ratio phrases that had the potential for such beneficial combinations. In addition, phrases that had a high absolute frequency value in the dominant category and a high frequency ratio, but were too generic to be used in a stand-alone mode, had the potential to be used in combination with other phrases to still retrieve (or eliminate) a significant number of records in the desired category.

At this point in the protocol, the expert(s) re-sorted the rows in the ACCESS template's phrase frequency window by absolute frequency, first by dominant relevant category, then by dominant non-relevant category. Then, the analyst identified perhaps a dozen of the highest frequency high and low ratio promising phrases, and entered a check into the THEME CANDIDATE block for each of these phrases. Again, judgment played a very key role in this step, since the promising phrases had high potential to anchor combinations that would be highly relevant to the study's scope (or highly non-relevant). Typically, the higher the specificity of a phrase, the higher was its frequency ratio, and the more likely it resulted in combinations that were uniquely characteristic to the appropriate category.

TABLE 3

TEMPLATE PHRASE FREQUENCY DISPLAY - RELEVANCE SORTED

| PHRASE | NORM REL FREQ | NORM NON-REL FREQ | RATIO | DOM FREQ | DOM CATEG |
| --- | --- | --- | --- | --- | --- |
| INFORMATION | 1796 | 637 | 3 | 1796 | Relevant |
| RETRIEVAL | 895 | 245 | 4 | 895 | Relevant |
| SEARCH | 736 | 194 | 4 | 736 | Relevant |
| SYSTEM | 596 | 740 | 1 | 740 | Non-Relevant |
| WEB | 527 | 69 | 8 | 527 | Relevant |
| KNOWLEDGE | 457 | 1264 | 3 | 1264 | Non-Relevant |
| INFORMATION RETRIEVAL | 448 | 85 | 5 | 448 | Relevant |
| DATA | 436 | 1151 | 3 | 1151 | Non-Relevant |
| SYSTEMS | 436 | 486 | 1 | 486 | Non-Relevant |
| DOCUMENTS | 427 | 32 | 13 | 427 | Relevant |
| PAPER | 410 | 595 | 1 | 595 | Non-Relevant |

Table 3 shows a template phrase frequency window in which the rows were sorted by absolute (normalized) frequency of relevant category-dominant phrases, in descending order. The phrase INFORMATION had high absolute frequency of occurrence in both categories, and a modest focus. Its frequency ratio (~3) offered promise that probably many phrases could be located that would form a combination with INFORMATION strongly characteristic of relevant records. INFORMATION was therefore perceived to have high potential to anchor combinations that would appear in substantial numbers of records strongly relevant to the study's scope. Because of the large value of absolute frequency in both categories, INFORMATION also had potential to anchor combinations that would appear in reasonable numbers of records strongly non-relevant to the study's scope as well. The probability of anchoring combinations characteristic of relevant records was greater than the corresponding probability of anchoring combinations characteristic of non-relevant records. Therefore, INFORMATION was selected as a candidate query phrase combination anchor, and a check is entered in its CANDIDATE THEME block.

Continuing on Table 3, the phrase SYSTEM also had high absolute frequency of occurrence in both categories. However, its focus was weak. Its frequency ratio (~1) was sufficiently low that the relative probability was low that many phrases could be located that would form a combination with SYSTEM strongly characteristic of either relevant or non-relevant records. Therefore, SYSTEM was not selected as a candidate query phrase combination anchor.

TABLE 4

TEMPLATE PHRASE FREQUENCY DISPLAY - NON-RELEVANCE SORTED

| PHRASE | FREQ NORM REL | FREQ NORM NON-REL | RATIO | FREQ DOM | CATEG DOM |
|---|---|---|---|---|---|
| KNOWLEDGE | 457 | 1264 | 3 | 1264 | Non-Relevant |
| DATA | 436 | 1151 | 3 | 1151 | Non-Relevant |
| SYSTEM | 596 | 740 | 1 | 740 | Non-Relevant |
| INFORMATION | 1796 | 637 | 3 | 1796 | Relevant |
| PAPER | 410 | 595 | 1 | 595 | Non-Relevant |
| SYSTEMS | 436 | 486 | 1 | 486 | Non-Relevant |
| MODEL | 263 | 441 | 2 | 441 | Non-Relevant |

Table 4 shows a template phrase frequency window in which the rows were sorted by absolute frequency of non-relevant category-dominant phrases, in descending order. The phrase KNOWLEDGE had high absolute frequency of occurrence in both categories, and a modest focus. Its frequency ratio (~3) offered promise that probably many phrases could be located that would form a combination with KNOWLEDGE strongly characteristic of non-relevant records. KNOWLEDGE was therefore perceived to have high potential to anchor combinations that would appear in substantial numbers of records strongly non-relevant to the study's scope. Because of the large value of absolute frequency in both categories, KNOWLEDGE may also have had potential to anchor combinations that would appear in reasonable numbers of records strongly relevant to the study's scope as well. The probability of anchoring combinations characteristic of non-relevant records was greater than the corresponding probability of anchoring combinations characteristic of relevant records. Therefore, KNOWLEDGE was selected as a candidate query phrase combination anchor, and a check was entered in its CANDIDATE THEME block.

Continuing on Table 4, the phrase PAPER also had high absolute frequency of occurrence in both categories. However, its focus was weak. Its frequency ratio (~1) was sufficiently low that the relative probability was low that many phrases could be located that would form a combination with PAPER strongly characteristic of either relevant or non-relevant records. Therefore, PAPER was not selected as a candidate query phrase combination anchor.

Each of these selected high frequency high and low ratio phrases was entered into the phrase proximity algorithm. Phrases in the sample's aggregated records (Abstracts, in recent studies) that were located in close proximity to each high frequency low ratio phrase (essentially located in the same Abstract), in both the relevant and non-relevant categories, were identified.

This section ends with a caveat. To avoid division by zero and subsequent ratio of infinity, a phrase that had a finite frequency in one category (relevant or non-relevant) and did not appear in the other category was given a default frequency of one in the non-appearing category. Thus, a low ratio phrase contained a substantial number of noise records if it also had high absolute occurrence frequency, but had no noise records if its absolute occurrence frequency was very low. The absolute occurrence frequency of a low ratio phrase was always considered when deciding how the phrase should be used in the analysis.

Structure of Phrase Combination Selection Algorithm

These phrase combinations and their associated frequencies were extracted from the text of the records in the relevant and non-relevant categories. These phrase combinations and frequencies were then imported into the ACCESS-based template. Then, a normalization procedure was performed on the phrase combination frequencies, similar to that performed on the phrase frequencies.

Table 9 shows the display window from the template's phrase combination frequency component for the TDM example. Each template row contained a phrase combination extracted from the Abstracts' text, and nine associated numerical and other indicators for that phrase. The analyst saw the phrase combination and its indicators in ten fields/columns on the computer screen, and seven of the fields/columns are shown in Table 5.

TABLE 5

PHRASE COMBINATION FREQUENCY DISPLAY

| THEME | PHRASE | NORM REL FREQ | NORM NON REL FREQ | RATIO | DOM FREQ | DOM CATEG |
|---|---|---|---|---|---|---|
| INFORMATION | DOCUMENT | 224 | 1 | 224 | 224 | Relevant |
| INFORMATION | IR | 198 | 1 | 198 | 198 | Relevant |
| RETRIEVAL | IR | 184 | 1 | 184 | 184 | Relevant |
| QUERY | SEARCH | 182 | 1 | 182 | 182 | Relevant |
| INFORMATION RETRIEVAL | IR | 178 | 1 | 178 | 178 | Relevant |
| SEARCH | SEARCH ENGINES | 178 | 1 | 178 | 178 | Relevant |
| INFORMATION RETRIEVAL | SEARCH | 168 | 1 | 168 | 168 | Relevant |
| KNOWLEDGE | USING | 1 | 157 | 157 | 157 | Non_Relevant |
| SEARCH | SYSTEMS | 140 | 1 | 140 | 140 | Relevant |
| RETRIEVAL | METHOD | 134 | 1 | 134 | 134 | Relevant |
| KNOWLEDGE | FUZZY | 1 | 132 | 132 | 132 | Non_Relevant |
| RETRIEVAL | KNOWLEDGE | 126 | 1 | 126 | | Relevant |

Proceeding from the leftmost column, the column/fields are defined as:

THEME—This entry was a single, adjacent double, or adjacent triple word phrase that was identified as a promising phrase combination anchor from the stand-alone phrase selection process.

PHRASE—This entry was a single, adjacent double, or adjacent triple word phrase that was located within a specified number of words from the theme phrase in one or both of the relevant/non-relevant categories. The capability also allowed specification of co-occurrence within the same Abstract, paragraph or sentence, The phrase survived a filtering by a trivial phrase algorithm, and the frequency of its occurrence in combination with the theme phrase in either the relevant or non-relevant category in the aggregate sample was above some pre-defined threshold.

The remaining fields displayed had the same headings and definitions as those on the template's phrase frequency window, and will not be repeated. The remaining fields not displayed had the same headings and definitions as those on the template's phrase frequency window, with the exception that the THEME CANDIDATE field had been eliminated.

The selection procedure for phrase combinations proceeded the same as for stand-alone phrases shown previously, and the same type of logic and reasoning was used.

This phrase combination selection procedure tended to:
1) involve many more database entries to examine than the phrase only procedure;
2) have many more high ratio entries due to the increased specificity of the more detailed entries; and
3) have somewhat lower absolute frequency values due to the fact that higher specificity terms have reduced occurrence frequencies.

So far, the surgical precision provided by the two-phrase combination has been adequate for study purposes, and extrapolation to three or four phrase combinations has not been pursued.

Marginal utility is now described. Marginal utility, in the present context, was a measure of the ratio of 1) additional desirable records (signal) retrieved by the addition of a query term to 2) additional non-desirable records (noise) retrieved by the addition of this term. It was also used as an efficiency measure for eliminating undesirable records. It became an important consideration when query size reduction was required.

The frequency ratio metric approximately reflected marginal utility only when phrases did not co-occur in the same Abstract. For the first few phrases selected, there was probably a relatively modest level of co-occurrence, because of the low-density factor. As more and more phrases were selected for query modification candidates, the number of un-retrieved sample records in which the next candidate phrase appeared decreased substantially. Thus, some method of taking co-occurrence into account was necessary for achieving the initial query development objective of selecting the minimal term query for maximum record retrieval.

The upgraded query term selection-support algorithm showed the aggregate level of co-occurrence, and allowed the marginal utility of each additional query term to be estimated. All the sample records from each category (relevant and non-relevant) were entered in the ACCESS database. The records in which each query term appeared are tracked continuously. When a candidate query modification term was selected, the number of new sample records in the desired category (signal) in which the term appeared was identified, as well as the number of new sample records in the un-desired category (noise). The aggregate, as well as the marginal, number of sample records in each category was tracked, allowing estimates of the marginal benefit of each term to the query. For consistency, the normalization used to balance relevant and non-relevant record categories was also employed to track marginal utility.

Table 6 shows generic marginal utility operation. Example 3A presents a specific marginal utility computational result from a recent text mining study on the discipline of Nonlinear Dynamics.

TABLE 6

MARGINAL UTILITY ESTIMATION

| PHRASE/ | RECORD→ RELEVANT | | | | | NON-RELE-VANT | | DELTA RELEV | DELTA NON RELEV | CUMUL RELEV | CUMUL NON RELEV |
|---|---|---|---|---|---|---|---|---|---|---|---|
| | $R_1$ | $R_2$ | $R_3$ | $R_4$ | $R_5$ | $R_6$ | $R_7$ | | | | |
| $P_1$ | X | X | | | | | | 2 | 0 | 2 | 0 |
| $P_2$ | | X | X | | | X | | 1 | 1 | 3 | 1 |
| $P_3$ | | | X | X | | X | X | 1 | 1 | 4 | 2 |
| $P_4$ | | | | | X | | X | 1 | 0 | 5 | 2 |

In the first column, the $P_i$ represented different candidate query phrases. The $R_j$ column headings represented different records. An X in element ij meant that phrase $P_i$ was present in record $R_j$. Records $R_1$–$R_5$ have been judged to be relevant, and records $R_6$–$R_7$ were non-relevant. Thus, phrase $P_1$ was present in the relevant records $R_1$ and $R_2$, and phrase $P_4$ was present in the relevant record $R_5$, and the non-relevant record $R_7$.

The four columns on the right contained summary statistics for the marginal utility computation. The column headed DELTA RELEV contained the additional number of relevant records identified by the candidate query phrase. Thus, phrase $P_1$ appeared in the two previously unmarked relevant records $R_1$ and $R_2$, and the number 2 was entered into the DELTA RELEV column. Phrase $P_2$ appeared in relevant records $R_2$ and $R_3$, but since $R_2$ contained the previously entered phrase $P_1$, only one additional relevant record ($R_3$) was identified by phrase $P_2$. Therefore, the number 1 was entered into the column DELTA RELEV.

The column headed DELTA NON-RELEV contained the additional number of non-relevant records identified by the candidate query phrase. Thus, phrase $P_2$ appeared in the previously unmarked non-relevant record $R_6$, and the number 1 was entered into the DELTA NON-RELEV column. Phrase $P_3$ appeared in non-relevant records $R_6$ and $R_7$, but since $R_6$ contained the previously entered phrase $P_2$, only one additional non-relevant record ($R_7$) had been identified by phrase $P_3$. Therefore, the number 1 was entered into the column DELTA NON-RELEV. Phrase $P_4$ appeared in the non-relevant record $R_7$, but since $R_7$ contained the previously entered phrase $P_3$, no additional non-relevant records were identified by $P_4$.

The columns headed CUMUL RELEV and CUMUL NON-RELEV contained running sums of the columns headed DELTA RELEV and DELTA NON-RELEV, respectively.

Presently, this procedure is being automated. Once a pool of candidate query modification terms had been selected, and the maximum number of query terms had been specified, the automation algorithm examined each term in the pool, and the terms that provided the greatest marginal benefit at each step were added to the query. Two approaches to computing 'greatest marginal benefit' were examined. The first maximized the objective function signal-to-noise ratio of the records retrieved, and the second maximized the objective function of total relevant records retrieved subject to a signal-to-noise ratio floor.

The objective of the maximum signal-to-noise ratio option was to maximize the signal-to-noise ratio (relevant/non-relevant records) of the retrieved relevant records, subject to the constraint of an upper bound on the number of query terms allowed by the search engine. As an example of this case, 200 candidate query terms had been identified by the expert(s). A query limit of fifty terms had been specified. Then, this semi-automated optimization protocol proceeded as follows.

1) The highest ratio candidate phrase was selected to initialize the system. This phrase was called Term 1. Its approximate marginal utility was the ratio of frequencies, since there was no co-occurrence of selected phrases at this point.
2) Then, each of the remaining 199 terms was examined. The term with the highest marginal utility (Term 2) was identified. Term 2 and Term 1 were the selected query modification terms at this point.
3) Then, each of the remaining 198 terms was examined. The term with the highest marginal utility (Term 3) was identified. Terms 3 and 2 and 1 were the selected query modification terms at this point.
4) This process was repeated until the fifty term limit was reached.

The purpose of this process was to keep the marginal utility of the most recent terms selected from the relevant and non-relevant categories approximately equal throughout the selection procedure. At the query cut-off point, the marginal utility of terms from the relevant category was approximately equal to the marginal utility of terms from the non-relevant category. This provided a good balance between maximizing signal and minimizing noise. Obviously, if signal maximization, or noise minimization, became more important for a given study, the differing thresholds for marginal utility for each category were incorporated into the selection algorithm.

The objective of this maximizing relevant records retrieved option was to maximize the number of relevant records retrieved, subject to the constraints of a signal-to-noise ratio floor, and a ceiling on the number of query terms allowed. A simple heuristic procedure for solving this problem was demonstrated with the use of Table 6 and the Excel Solver (a linear/non-linear optimization package). The Excel solver required that three parameters be specified in an optimization problem: 1) an objective function to be maximized or minimized; 2) the constraints on the problem; 3) the variables to be changed. On Table 6, the matrix cell $P_4$-CUMUL RELEV is the entity to be maximized. An additional column was entered containing the variables to be changed. These variables were the binary coefficients of the phrases $P_i$. These coefficients assumed a value of either 0 or 1 (an integer programming solution).

The phrases and phrase combinations selected by the above protocols were added to the query, some existing query terms were removed, and the final query was inserted into the search engine for the next iteration.

Example 3A

Marginal Utility Application

Three iterations were used to generate a query for the Nonlinear Dynamics study. In order to generate an efficient final query, Marginal Utility was applied. At the start of the final iteration, a modified query (Q1—See below) was inserted into the SCI, and records were retrieved. A sample of these records was then categorized into relevant and non-relevant. Each term in Q1 was inserted into the Marginal Utility algorithm, and the marginal number of relevant and non-relevant records in the sample that the query term would retrieve was computed (see below for these numerical indicators). Only those terms that retrieved a high ratio of relevant to non-relevant records were retained. Since (by design) each query term had been used to retrieve records from the SCI as part of Q1, the marginal ratio of relevant to non-relevant records from the sample represented the marginal ratio of relevant to non-relevant records from the SCI. The final efficient query Q2, consisting of the highest marginal utility terms, is shown below.

In the Marginal Utility algorithm, terms that co-occurred strongly in records with terms selected previously were essentially duplicative from the retrieval perspective, and were eliminated. Thus, the order in which terms were selected became important. In the manual selection process described here, the candidate query terms were ordered by occurrence frequency, and tested for Marginal Utility. This was not the most efficient use of Marginal Utility.

An automated query term selection algorithm using Marginal Utility is being developed presently. In the automated approach, all the terms in Q1 are inserted into the Marginal Utility algorithm. The highest relevant frequency term (T1) is selected first. Then, the Marginal Utility of every other term is examined, in conjunction with only the first term selected. The term that retrieves the most marginal relevant records (T2), above a pre-specified floor of relevant to non-relevant record ratio, is added to the query. At this point, the query consists of terms T1 and T2. Then, the Marginal Utility of every other term is examined, in conjunction with only the first two terms selected. The same process used to select T2 is used to select T3. This recursive process is continued until either a pre-specified limit on total number of query terms, or the floor ratio of relevant records to non-relevant records retrieved, is reached.

The full 146 term query that was used to retrieve the SCI records for the final iteration (Q1) was:

((CHAO* AND (SYSTEM* OR DYNAMIC* OR PERIODIC* OR NONLINEAR OR NON-LINEAR OR BIFURCATION* OR MOTION* OR OSCILLAT* OR CONTROL* OR EQUATION* OR EXPONENT* OR FEEDBACK* OR LYAPUNOV OR MAP* OR ORBIT* OR ALGORITHM* OR HAMILTONIAN OR LIMIT* OR QUANTUM OR RANDOM OR REGIME* OR REGION* OR SERIES OR SIMULA-

TION* OR THEORY OR AMPLITUDE* OR COMMUNICATION* OR COMPLEX* OR CONVECTION OR CORRELATION* OR COUPLING OR CYCLE* OR DEGREES OF FREEDOM OR DETERMINISTIC OR DIFFUSION OR DIMENSION* OR DISTRIBUTION* OR DUFFING OR ENTROPY OR EQUILIBRIUM OR FLUCTUATION* OR FRACTAL* OR INITIAL CONDITION* OR INVARIANT* OR LASER* OR LOGISTIC OR LORENZ OR MAGNETIC FIELD* OR MECHANISM* OR MODES OR NETWORK* OR ONSET OR TIME OR FREQUENC* OR POPULATION* OR STABLE OR ADAPTIVE OR CIRCUIT* OR DISSIPAT* OR EVOLUTION OR EXPERIMENTAL OR GROWTH OR HARMONIC* OR HOMOCLINIC OR INSTABILIT* OR OPTICAL)) OR (BIFURCATION* AND (NONLINEAR OR HOMOCLINIC OR QUASIPERIODIC OR QUASI-PERIODIC OR DOUBLING OR DYNAMICAL SYSTEM* OR EVOLUTION OR INSTABILIT* OR SADDLE-NODE* OR MOTION* OR OSCILLAT* OR TRANSCRITICAL OR BISTABILITY OR LIMIT CYCLE* OR POINCARE OR LYAPUNOV OR ORBIT*)) OR (NONLINEAR AND (PERIODIC SOLUTION* OR OSCILLAT* OR MOTION* OR HOMOCLINIC)) OR (DYNAMICAL SYSTEM* AND (NONLINEAR OR STOCHASTIC OR NON-LINEAR)) OR ATTRACTOR* OR PERIOD DOUBLING* OR CORRELATION DIMENSION* OR LYAPUNOV EXPONENT* OR PERIODIC ORBIT* OR NONLINEAR DYNAMICAL) NOT (CHAO OR CHAOBOR* OR CHAOTROP* OR CAROTID OR ARTERY OR STENOSIS OR PULMONARY OR VASCULAR OR ANEURYSM* OR ARTERIES OR VEIN* OR TUMOR* OR SURGERY)

In the order presented, each of the terms preceding the NOT Boolean was inserted into the manual selection Marginal Utility algorithm, and the following numerical indicators shown in Table 7 were obtained:

TABLE 7

MARGINAL UTILITY INDICATORS

| THEME | PHRASE | DeltaRel | CumRel | NormCumRel | Phrase# |
|---|---|---|---|---|---|
| CHAOTIC | SYSTEM | 195 | 195 | 0.1480638 | 1 |
| NONLINEAR | MOTION | 157 | 352 | 0.2672741 | 2 |
| CHAOTIC | SYSTEMS | 89 | 441 | 0.3348519 | 3 |
| CHAOTIC | DYNAMICS | 61 | 502 | 0.3811693 | 4 |
| BIFURCATION | NONLINEAR | 58 | 560 | 0.4252088 | 5 |
| CHAOS | SYSTEM | 55 | 615 | 0.4669704 | 6 |
|  | ATTRACTOR | 54 | 669 | 0.5079727 | 7 |
| NONLINEAR | OSCILLATIONS | 51 | 720 | 0.546697 | 8 |
| NONLINEAR | OSCILLATION | 32 | 752 | 0.5709947 | 9 |
| DYNAMICAL SYSTEMS | NONLINEAR | 29 | 781 | 0.5930144 | 10 |
| NONLINEAR | MOTIONS | 28 | 809 | 0.6142749 | 11 |
|  | ATTRACTORS | 28 | 837 | 0.6355353 | 12 |
| CHAOTIC | PERIODIC | 26 | 863 | 0.6552771 | 13 |
| NONLINEAR | OSCILLATOR | 25 | 888 | 0.6742597 | 14 |
| CHAOTIC | NONLINEAR | 16 | 904 | 0.6864085 | 15 |
| CHAOS | DYNAMICS | 16 | 920 | 0.6985573 | 16 |
| BIFURCATION | MOTION | 16 | 936 | 0.7107062 | 17 |
|  | PERIODIC ORBIT | 16 | 952 | 0.722855 | 18 |
|  | LYAPUNOV EXPONENT | 15 | 967 | 0.7342445 | 19 |
|  | LYAPUNOV EXPONENTS | 14 | 981 | 0.7448747 | 20 |
| CHAOS | SYSTEMS | 13 | 994 | 0.7547456 | 21 |
| BIFURCATIONS | NONLINEAR | 12 | 1006 | 0.7638573 | 22 |
| NONLINEAR | OSCILLATING | 11 | 1017 | 0.7722096 | 23 |
| NONLINEAR | PERIODIC SOLUTIONS | 11 | 1028 | 0.7805619 | 24 |
| DYNAMICAL SYSTEMS | STOCHASTIC | 11 | 1039 | 0.7889142 | 25 |
| DYNAMICAL SYSTEM | NONLINEAR | 11 | 1050 | 0.7972665 | 26 |
| CHAOTIC | MOTION | 11 | 1061 | 0.8056188 | 27 |
| BIFURCATION | INSTABILITY | 11 | 1072 | 0.8139711 | 28 |
| CHAOS | QUANTUM | 10 | 1082 | 0.8215642 | 29 |
| BIFURCATION | ORBITS | 10 | 1092 | 0.8291572 | 30 |
|  | CORRELATION DIMENSION | 10 | 1102 | 0.8367502 | 31 |
| CHAOS | THEORY | 9 | 1111 | 0.8435839 | 32 |
| CHAOTIC | DISTRIBUTION | 7 | 1118 | 0.848899 | 33 |
| CHAOTIC | DIMENSION | 7 | 1125 | 0.8542141 | 34 |
| CHAOTIC | MAP | 7 | 1132 | 0.8595292 | 35 |
| BIFURCATION | EVOLUTION | 7 | 1139 | 0.8648443 | 36 |
| BIFURCATION | OSCILLATIONS | 7 | 1146 | 0.8701595 | 37 |
| DYNAMICAL SYSTEM | STOCHASTIC | 6 | 1152 | 0.8747153 | 38 |
| CHAOTIC | LYAPUNOV | 6 | 1158 | 0.8792711 | 39 |
| BIFURCATION | OSCILLATORY | 6 | 1164 | 0.8838269 | 40 |
| BIFURCATION | ORBIT | 6 | 1170 | 0.8883827 | 41 |
|  | NONLINEAR DYNAMICS | 6 | 1176 | 0.8929385 | 42 |
|  | NONLINEAR DYNAMICAL | 6 | 1182 | 0.8974943 | 43 |
| CHAOTIC | COUPLING | 5 | 1187 | 0.9012908 | 44 |
| CHAOTIC | SERIES | 5 | 1192 | 0.9050873 | 45 |
| CHAOTIC | EQUATIONS | 5 | 1197 | 0.9088838 | 46 |

TABLE 7-continued

MARGINAL UTILITY INDICATORS

| THEME | PHRASE | DeltaRel | CumRel | NormCumRel | Phrase# |
|---|---|---|---|---|---|
| CHAOTIC | QUANTUM | 5 | 1202 | 0.9126803 | 47 |
| CHAOTIC | CONTROL | 5 | 1207 | 0.9164768 | 48 |
| BIFURCATION | LIMIT CYCLE | 5 | 1212 | 0.9202733 | 49 |
| DYNAMICAL SYSTEMS | NON-LINEAR | 4 | 1216 | 0.9233106 | 50 |
| CHAOTIC | FLUCTUATIONS | 4 | 1220 | 0.9263478 | 51 |
| CHAOTIC | OSCILLATIONS | 4 | 1224 | 0.929385 | 52 |
| CHAOTIC | THEORY | 4 | 1228 | 0.9324222 | 53 |
| CHAOTIC | COMPLEX | 4 | 1232 | 0.9354594 | 54 |
| BIFURCATIONS | INSTABILITIES | 4 | 1236 | 0.9384966 | 55 |
| BIFURCATION | BISTABILITY | 4 | 1240 | 0.9415338 | 56 |
| BIFURCATION | HOMOCLINIC | 4 | 1244 | 0.944571 | 57 |
| CHAOTIC | ALGORITHM | 3 | 1247 | 0.9468489 | 58 |
| CHAOTIC | SIMULATIONS | 3 | 1250 | 0.9491268 | 59 |
| CHAOTIC | REGION | 3 | 1253 | 0.9514047 | 60 |
| CHAOTIC | BIFURCATION | 3 | 1256 | 0.9536826 | 61 |
| CHAOS | NONLINEAR | 3 | 1259 | 0.9559605 | 62 |
| BIFURCATIONS | HOMOCLINIC | 3 | 1262 | 0.9582384 | 63 |
| BIFURCATION | SADDLE-NODE | 3 | 1265 | 0.9605163 | 64 |
| CHAOTIC | CONTROLLING | 2 | 1267 | 0.9620349 | 65 |
| CHAOTIC | FRACTAL | 2 | 1269 | 0.9635535 | 66 |
| CHAOTIC | EQUATION | 2 | 1271 | 0.9650721 | 67 |
| CHAOTIC | REGIONS | 2 | 1273 | 0.9665907 | 68 |
| CHAOTIC | FEEDBACK | 2 | 1275 | 0.9681093 | 69 |
| CHAOTIC | ORBITS | 2 | 1277 | 0.9696279 | 70 |
| CHAOS | ENTROPY | 2 | 1279 | 0.9711465 | 71 |
| CHAOS | CORRELATION | 2 | 1281 | 0.9726651 | 72 |
| CHAOS | DISTRIBUTION | 2 | 1283 | 0.9741838 | 73 |
| CHAOS | DIMENSION | 2 | 1285 | 0.9757024 | 74 |
| CHAOS | MAP | 2 | 1287 | 0.977221 | 75 |
| BIFURCATIONS | SADDLE-NODE | 2 | 1289 | 0.9787396 | 76 |
| BIFURCATIONS | ORBITS | 2 | 1291 | 0.9802582 | 77 |
| BIFURCATION | TRANSCRITICAL | 2 | 1293 | 0.9817768 | 78 |
| BIFURCATION | LIMIT CYCLES | 2 | 1295 | 0.9832954 | 79 |
| CHAOTIC | HAMILTONIAN | 1 | 1296 | 0.9840547 | 80 |
| CHAOTIC | CYCLE | 1 | 1297 | 0.984814 | 81 |
| CHAOTIC | REGIMES | 1 | 1298 | 0.9855733 | 82 |
| CHAOTIC | DYNAMIC | 1 | 1299 | 0.9863326 | 83 |
| CHAOTIC | COMMUNICATION | 1 | 1300 | 0.9870919 | 84 |
| CHAOS | SIMULATION | 1 | 1301 | 0.9878512 | 85 |
| CHAOS | DYNAMIC | 1 | 1302 | 0.9886105 | 86 |
| CHAOS | DETERMINISTIC | 1 | 1303 | 0.9893698 | 87 |
| CHAOS | BIFURCATION | 1 | 1304 | 0.9901291 | 88 |
| CHAOS | COMPLEX | 1 | 1305 | 0.9908884 | 89 |
| CHAOS | EQUATIONS | 1 | 1306 | 0.9916477 | 90 |
| CHAOS | LYAPUNOV | 1 | 1307 | 0.992407 | 91 |
| CHAOS | MOTION | 1 | 1308 | 0.9931663 | 92 |
| CHAOS | CONTROL | 1 | 1309 | 0.9939256 | 93 |
| BIFURCATIONS | BISTABILITY | 1 | 1310 | 0.9946849 | 94 |
| BIFURCATIONS | DOUBLING | 1 | 1311 | 0.9954442 | 95 |
| BIFURCATION | OSCILLATE | 1 | 1312 | 0.9962035 | 96 |
| BIFURCATION | INSTABILITIES | 1 | 1313 | 0.9969628 | 97 |
| BIFURCATION | POINCARE | 1 | 1314 | 0.9977221 | 98 |
| BIFURCATION | MOTIONS | 1 | 1315 | 0.9984814 | 99 |
| BIFURCATION | LYAPUNOV | 1 | 1316 | 0.9992407 | 100 |
|  | PERIOD DOUBLING | 1 | 1317 | 1 | 101 |
| NONLINEAR | OSCILLATE | 0 | 1317 | 1 | 102 |
| CHAOTIC | COMMUNICATIONS | 0 | 1317 | 1 | 103 |
| CHAOTIC | FLUCTUATION | 0 | 1317 | 1 | 104 |
| CHAOTIC | CONTROLLER | 0 | 1317 | 1 | 105 |
| CHAOTIC | DISTRIBUTIONS | 0 | 1317 | 1 | 106 |
| CHAOTIC | NON-LINEAR | 0 | 1317 | 1 | 107 |
| CHAOTIC | OSCILLATORY | 0 | 1317 | 1 | 108 |
| CHAOTIC | ORBIT | 0 | 1317 | 1 | 109 |
| CHAOTIC | ENTROPY | 0 | 1317 | 1 | 110 |
| CHAOTIC | EXPONENTS | 0 | 1317 | 1 | 111 |
| CHAOTIC | EXPONENT | 0 | 1317 | 1 | 112 |
| CHAOTIC | DIFFUSION | 0 | 1317 | 1 | 113 |
| CHAOTIC | DETERMINISTIC | 0 | 1317 | 1 | 114 |
| CHAOTIC | AMPLITUDE | 0 | 1317 | 1 | 115 |
| CHAOTIC | BIFURCATIONS | 0 | 1317 | 1 | 116 |
| CHAOTIC | CORRELATION | 0 | 1317 | 1 | 117 |
| CHAOTIC | REGIME | 0 | 1317 | 1 | 118 |
| CHAOTIC | RANDOM | 0 | 1317 | 1 | 119 |
| CHAOTIC | SIMULATION | 0 | 1317 | 1 | 120 |
| CHAOS | FLUCTUATION | 0 | 1317 | 1 | 121 |

TABLE 7-continued

MARGINAL UTILITY INDICATORS

| THEME | PHRASE | DeltaRel | CumRel | NormCumRel | Phrase# |
|---|---|---|---|---|---|
| CHAOS | COMPLEXES | 0 | 1317 | 1 | 122 |
| CHAOS | DEGREES OF FREEDOM | 0 | 1317 | 1 | 123 |
| CHAOS | COMPLEXITY | 0 | 1317 | 1 | 124 |
| CHAOS | REGIONS | 0 | 1317 | 1 | 125 |
| CHAOS | REGIMES | 0 | 1317 | 1 | 126 |
| CHAOS | EXPONENTS | 0 | 1317 | 1 | 127 |
| CHAOS | NON-LINEAR | 0 | 1317 | 1 | 128 |
| CHAOS | COMMUNICATION | 0 | 1317 | 1 | 129 |
| CHAOS | RANDOM | 0 | 1317 | 1 | 130 |
| CHAOS | REGIME | 0 | 1317 | 1 | 131 |
| CHAOS | SIMULATIONS | 0 | 1317 | 1 | 132 |
| CHAOS | BIFURCATIONS | 0 | 1317 | 1 | 133 |
| CHAOS | EXPONENT | 0 | 1317 | 1 | 134 |
| CHAOS | COUPLING | 0 | 1317 | 1 | 135 |
| CHAOS | SERIES | 0 | 1317 | 1 | 136 |
| CHAOS | FEEDBACK | 0 | 1317 | 1 | 137 |
| CHAOS | ORBITS | 0 | 1317 | 1 | 138 |
| CHAOS | OSCILLATIONS | 0 | 1317 | 1 | 139 |
| CHAOS | PERIODIC | 0 | 1317 | 1 | 140 |
| BIFURCATIONS | LIMIT CYCLES | 0 | 1317 | 1 | 141 |
| BIFURCATIONS | LIMIT CYCLE | 0 | 1317 | 1 | 142 |
| BIFURCATIONS | OSCILLATORY | 0 | 1317 | 1 | 143 |
| BIFURCATIONS | MOTION | 0 | 1317 | 1 | 144 |
| BIFURCATION | DOUBLING | 0 | 1317 | 1 | 145 |
|  | PERIOD-DOUBLING | 0 | 1317 | 1 | 146 |

When the query term was a phrase combination, the two columns on the left were the phrases in the combination, and when the query term was a single phrase, the second column from the left was the phrase. The third column from the left was the marginal increase in relevant records retrieved due to the addition of that query term, and the fourth column was the cumulative increase in relevant records. The fifth column represented the cumulative records retrieved divided by the total records retrieved by the full query. The sixth column was the phrase number; the un-truncated query contained 146 terms.

The results indicated a Pareto Law-type phenomenon: Retention of the top 25 query terms (~17%) retrieved about 79% of the records retrieved by the total query. Retention of the top 50 query terms retrieved about 92% of total records, and retention of the top 101 records retrieved 100% of the total. The top 101 terms were selected as the final query, although if query size had been more severely limited, an 80 term query could have been used with perhaps 1.5% less efficiency.

The final query used for the information processing (Q2) is the following:
((CHAO* AND (SYSTEM* OR DYNAMIC* OR PERIODIC* OR NONLINEAR OR BIFURCATION* OR MOTION* OR OSCILLAT* OR CONTROL* OR EQUATION* OR FEEDBACK* OR LYAPUNOV OR MAP* OR ORBIT* OR ALGORITHM* OR HAMLTONIAN OR LIMIT* OR QUANTUM OR REGIME* OR REGION* OR SERIES OR SIMULATION* OR THEORY OR COMMUNICATION* OR COMPLEX* OR CONVECTION OR CORRELATION* OR COUPLING OR CYCLE* OR DETERMINISTIC OR DIMENSION* OR DISTRIBUTION* OR DUFFING OR ENTROPY OR EQUILIBRIUM OR FLUCTUATION* OR FRACTAL* OR INITIAL CONDITION* OR INVARIANT* OR LASER* OR LOGISTIC OR LORENZ OR MAGNETIC FIELD* OR MECHANISM* OR MODES OR NETWORK* OR ONSET OR TIME OR FREQUENC* OR POPULATION* OR STABLE OR ADAPTIVE OR CIRCUIT* OR DISSIPAT* OR EVOLUTION OR EXPERIMENTAL OR GROWTH OR HARMONIC* OR HOMOCLINIC OR INSTABILIT* OR OPTICAL)) OR (BIFURCATION* AND (NONLINEAR OR HOMOCLINIC OR QUASIPERIODIC OR QUASI-PERIODIC OR DOUBLING OR DYNAMICAL SYSTEM* OR EVOLUTION OR INSTABILIT* OR SADDLE-NODE* OR MOTION* OR OSCILLAT* OR TRANSCRITICAL OR BISTABILITY OR LIMIT CYCLE* OR POINCARE OR LYAPUNOV OR ORBIT*)) OR (NONLINEAR AND (PERIODIC SOLUTION* OR OSCILLAT* OR MOTION* OR HOMOCLINIC)) OR (DYNAMICAL SYSTEM* AND (NONLINEAR OR STOCHASTIC OR NON-LINEAR)) OR ATTRACTOR* OR PERIOD DOUBLING* OR CORRELATION DIMENSION* OR LYAPUNOV EXPONENT* OR PERIODIC ORBIT* OR NONLINEAR DYNAMICAL) NOT (CHAO OR CHAOBOR* OR CHAOTROP* OR CAROTID OR ARTERY OR STENOSIS OR PULMONARY OR VASCULAR OR ANEURYSM* OR ARTERIES OR VEIN* OR TUMOR* OR SURGERY)

Example 4

Determination of Levels of Emphasis

This example presents two approaches to determining levels of emphasis. The first is the standard document clustering approach, and the second is the text element assignment approach claimed in this patent.

Document Clustering Approach—Abrupt Wing Stall

A text mining study of the aerodynamic discipline of Abrupt Wing Stall was performed. A taxonomy of the discipline (subdivision of the discipline into categories and sub-categories) was generated by text element clustering, using factor matrix filtering to select the most important text elements. Document clustering (combination of similar documents into groups) was performed using available clustering algorithms. The 61 document clusters with two or more Abstracts per cluster were extracted.

Each document cluster was assigned to the most appropriate category in the taxonomy defined by the text element clustering, based on the theme suggested by the highest frequency technical keywords in each document cluster (Alternatively, a taxonomy could have been defined by the document clustering, and the document clusters could have been assigned to the document clustering-generated taxonomy). The number of records in each taxonomy category from all the clusters in the category was calculated, and is shown in Table 8. In this table, the top two levels of the taxonomy were presented. The top hierarchical level was composed of ANGLE-OF-ATTACK-INDUCED STALL and SHOCK AND AEROELASTIC COUPLING-INDUCED STALL categories, and the second hierarchical level was composed of ANGLE-OF-ATTACK, LIFT AUGMENTATION, SHOCK INTERACTION, and AEROELASTICITY. The first column is the cluster number, and the matrix elements are the number of records in the cluster in the specific second-level taxonomy category. The numbers in each second level category were summed, and were summed in turn to give the total number of documents in each of the two first level categories.

TABLE 8

DOCUMENT CLUSTERING TAXONOMY
ABRUPT WING STALL TAXONOMY
DOCUMENT CLUSTER ENTRIES
ANGLE-OF-ATTACK INDUCED STALL SHOCK AND AEROELASTIC-INDUCED STALL

| CLUSTER NUMBER | ANGLE OF ATTACK | LIFT AUGMENTATION | SHOCK INTERACTION | AEROELASTICITY |
|---|---|---|---|---|
| 1 | 42 | | | |
| 2 | | | 27 | |
| 3 | 27 | | | |
| 4 | 23 | | | |
| 5 | | | 21 | |
| 6 | 19 | | | |
| 7 | 18 | | | |
| 8 | | 17 | | |
| 9 | 17 | | | |
| 10 | | | 15 | |
| 11 | | 15 | | |
| 12 | | | 14 | |
| 13 | 14 | | | |
| 14 | 13 | | | |
| 15 | | | | 13 |
| 16 | | 12 | | |
| 17 | 12 | | | |
| 18 | 12 | | | |
| 19 | | | 12 | |
| 20 | | | 11 | |
| 21 | | | | 11 |
| 22 | 11 | | | |
| 23 | | | 11 | |
| 24 | | | 11 | |
| 25 | | | 10 | |
| 26 | 10 | | | |
| 27 | | | 10 | |
| 28 | | | | 10 |
| 29 | | | 9 | |
| 30 | 9 | | | |
| 31 | | | 9 | |
| 32 | | | 8 | |
| 33 | 8 | | | |
| 34 | | | 8 | |
| 35 | 8 | | | |
| 36 | 8 | | | |
| 37 | 7 | | | |
| 38 | | | | 7 |
| 39 | 7 | | | |
| 40 | 7 | | | |
| 41 | | | | 6 |
| 42 | 6 | | | |
| 43 | 6 | | | |
| 44 | 6 | | | |
| 45 | | | | 6 |
| 46 | | | 5 | |
| 47 | | | 5 | |
| 48 | 5 | | | |
| 49 | 5 | | | |
| 50 | | | 4 | |
| 51 | | | 4 | |
| 52 | 4 | | | |
| 53 | | 4 | | |
| 54 | 3 | | | |
| 55 | 3 | | | |
| 56 | | | 3 | |
| 57 | | | | 3 |

TABLE 8-continued

DOCUMENT CLUSTERING TAXONOMY
ABRUPT WING STALL TAXONOMY
DOCUMENT CLUSTER ENTRIES
ANGLE-OF-ATTACK INDUCED STALL SHOCK AND AEROELASTIC-INDUCED STALL

| CLUSTER NUMBER | ANGLE OF ATTACK | LIFT AUGMENTATION | SHOCK INTERACTION | AEROELASTICITY |
|---|---|---|---|---|
| 58 | | | 2 | |
| 59 | | 2 | | |
| 60 | | | 2 | |
| 61 | | | 2 | |
| SUM-LEVEL 2 | 310 | 50 | 203 | 56 |
| SUM-LEVEL 1 | | 360 | | 259 |
| SUM-TOTAL | | 619 | | |

The 61 clusters covered about 99% of the total documents in the database. About 58% of the documents were classified as 'angle-of-attack induced stall', while the remaining 42% were viewed as 'shock and aeroelastic coupling induced stall'. 'Angle-of-attack induced stall' sub-divided into slightly over 5/6 angle-of-attack variation, and slightly under 1/6 lift augmentation due to effectively changing angle-of-attack through flap modifications. 'Shock and aeroelastic coupling induced stall' subdivided into slightly under 4/5 shock-induced stall due to boundary layer separation, and slightly over 1/5 aeroelastic coupling induced stall due to change in vortex breakdown location from aeroelastic feedback.

Text Element Assignment Approach—Electrochemical Power Sources

A taxonomy of electrochemical energy-related technologies was developed through visual inspection of the Abstract phrase frequencies. The developed taxonomy was subsequently used to approximate global levels of emphasis (GLE). This type of analysis helped identify adequately and inadequately supported system and subsystem tech base areas.

A three level taxonomy was required to provide sufficient detail on the various electrochemical energy-related technologies. The first two levels of the taxonomy were developed using a phrase frequency-only analysis. Phrases generated with the phrase frequency analysis were classified into two generic types of categories: system specific (e.g., SOLID OXIDE FUEL CELL, LITHIUM ION BATTERIES, STEAM REFORMING, ELECTRIC DOUBLE-LAYER CAPACITORS) and generic (ELECTROLYTES, CAPACITY, ELECTRODES, DISCHARGE, CATHODES, ANODES). One feature of the manually generated taxonomy was allocation of Abstract phrases and associated frequencies to specific categories in order to estimate GLE of specific systems. A method was required to relate the generic phrases to their associated specific systems (i.e., what fraction of the ELECTRODES frequencies should be allocated to the BATTERIES or FUEL CELLS categories?).

The method selected was to perform a proximity analysis using the second level taxonomy categories as themes. The second level of the taxonomy consisted of high technical content system-specific phrases from the phrase frequency analysis data. Phrases in close physical (and thematic) proximity to the system-specific phrases were generated, and the more generic tech base phrases were assigned to the related system-specific categories weighted by their occurrence frequencies.

The results of the taxonomy development and GLE analyses are presented in Table 9. The sum of the phrase frequencies for each category, used as the proxy metric for the GLE, is given in parentheses, immediately following the taxonomy group heading. In the descriptive narrative that follows, the category heading is followed by the sum of the phrase frequencies (in parentheses) for that category.

Taxonomy Level 1

The highest taxonomy level consisted of two categories: Electrochemical Converters (17,227) that were comprised of fuel cell technologies, and Electrochemical Source and Storage Devices (24,804) consisted of battery and electrochemical capacitor technologies.

Taxonomy Level 2

Fuel Cells

Fuel Cell research addressed the following tech base areas: system components and component configurations (4,038); properties and characteristics (2,683); sources/fuels (2,385); materials (2,358); conversion processes (1,363); conversion byproducts (1,011); operating conditions (885); and potential applications (267).

Batteries

Batteries research addressed the following tech base areas: materials (7,850), properties and characteristics (4,643), component technologies (4,531), processes and phenomena (2,658), types (2,195), and applications (1,121)

Electrochemical Capacitors

Electrochemical capacitors research addressed the following tech base areas: Properties and characteristics (604); Component technologies (568); materials (435); and types (199).

TABLE 9

ABSTRACT TAXONOMY

| LEVEL 1 | LEVEL 2 | LEVEL 3 |
|---|---|---|
| ECHEM CONVERTER (17,227) | FUEL CELLS (17,227) | Fuel cell components and component configurations (4,038) |
| | | Fuel cell properties and characteristics (2,682) |
| | | Fuel cell energy sources/fuels (2,385) |
| | | Fuel cell component materials (2,358) |
| | | Fuel cell types (2,238) |
| | | Fuel cell conversion processes (1,363) |
| | | Fuel cell conversion process byproduct (1,011) |
| | | Fuel cell operating conditions (885) |
| | | Fuel cell application (267) |

TABLE 9-continued

ABSTRACT TAXONOMY

| LEVEL 1 | LEVEL 2 | LEVEL 3 |
|---|---|---|
| ECHEM SOURCES & STORAGE DEVICES (24,804) | BATTERIES (22,998) | Battery materials (7,850) |
| | | Properties and characteristics (4,643) |
| | | Battery components (4,531) |
| | | Battery processes and phenomena (2,658) |
| | | Battery types (2,195) |
| | | Battery applications (1,121) |
| | ECHEM CAPACITORS (1,806) | Capacitor properties and characteristics (604) |
| | | Capacitor components (568) |
| | | Capacitor materials (435) |
| | | Capacitor types (199) |

Example 5

Citation Mining

This example:

i) Demonstrated the feasibility of tracking the myriad impacts of research on other research, development, and applications, using the technical literature.

ii) Demonstrated the feasibility of identifying a broad range of research product user characteristics, using the technical literature.

iii) Related thematic characteristics of citing papers to their cited papers.

This example described a novel process, Citation Mining, that used the best features of citation bibliometrics and text mining to track and document the impact of basic research on the larger R&D community. In Citation Mining, text mining of the cited and citing papers (trans-citation) supplemented the information derived from the semi-structured field bibliometric analyses. Text mining illuminated the trans-citation thematic relationships, and provided insights of knowledge diffusion to other intra-discipline research, advanced intra-discipline development, and extra-discipline research and development.

A proof-of-principle demonstration of Citation Mining for user population profiling and research impact was performed on four sets of cited papers. One group of papers was representative of basic research, and another group was representative of applied research. Two of the sets were selected Mexican and U.S. applied photo-voltaic research papers, and two of the sets were selected British and U.S. fundamental vibrating sand-pile research papers.

This example examined the bibliometrics of those papers that cited all four sets of papers mentioned above, then focused on the trans-citation coupled citing paper/cited paper text mining results for one of the sets, a highly cited U.S. vibrating sand-pile paper (3). Vibrating sand-piles model the behavior of granular systems used in agriculture (seeds, grains), geology (avalanches, soil mechanics), construction (gravel, sand), and manufacturing (powders, lubricants, sand-blasting). The underlying phenomena exhibited in their static and dynamic states were found in many disparate applications, such as fusion confinement, geological formations, self-assembly of materials, thin film structure ordering, shock-wave statistics, and crowded airspace. Statistically, the sand-pile paper selected had sufficient citing papers for adequate text mining statistics. It covered an exciting area of physics research, and its technical sub-themes had potential for extrapolation to other technical disciplines.

The analyses performed were of two types: bibliometrics and text mining. The text mining was subdivided into two components, manual concept clustering and statistical concept clustering. These different types of analyses are described in the following sections:

Bibliometrics Analysis

The citing paper summaries (records) were retrieved from the SCI. Analyses of the different non-free-text fields in each record were performed, to identify the infrastructure characteristics of the citing papers (authors, journals, institutions, countries, technical disciplines, etc).

This section starts by identifying the types of data contained in the SCI (circa early 2000), and the types of analyses that were performed on this information. A typical SCI record contains the following fields:

SCI Record Fields

1) Title—the complete title of the full paper.
2) Authors—all the authors of the full paper.
3) Source—journal name (e.g., Journal of Intelligent Information Systems).
4) Issue/Page(s)/Publication Date
5) Document Type—(e.g., Article, note, review, letter).
6) Language—the language of the full text document.
7) Cited References—the number and names of the references cited in the full paper
8) Times Cited—the number and names of the papers (whose records are contained in the SCI) that cited the full paper. Thus, the number shown in this field is a lower bound.
9) Related Records—records that share one or more references.
10) Abstract—the complete Abstract from the full paper.
11) Author Keywords/Indexer Keywords—keywords supplied by the author and/or indexer.
12) Addresses—organizational and street addresses of the authors. For multiple authors, this can be a difficult field to interpret accurately. Different authors from the same organizational unit may describe their organizational level differently. Different authors may abbreviate the same organizational unit differently.
13) Publisher How were the fields used in Citation Mining?

Title field was used in text mining together with the other unstructured text fields, Abstracts and Keywords, to perform the correlation analysis of the themes in the cited paper to those of the citing papers. Computational linguistics analysis was then performed.

Author field was used to obtain multi-author distribution profiles (e.g., number of papers with one author, number with two authors, etc).

Counts in Source field were used for journal name distributions, theme distributions, and development level distributions.

Document Type register allowed distributions of different document types to be computed (e.g., three articles, four conference proceedings, etc.).

Language field allowed distributions over languages to be computed.

Cited References allowed a historical analysis of the problem to be performed, and this field was used to analyze the interrelations among different groups working on related problems.

Times Cited register was important for computing impact.

The Addresses register allowed distributions of names and types of institutions, and countries, to be generated.

The present demonstration of citation mining included a comparison of a cited research unit from a developing country with a cited research unit from a developed country. It also compared a cited unit from a basic research field with a cited unit from an applied research field. Specifically, the technique used selected papers from a Mexican semiconductor applied research group (MA), a United States semiconductor applied research group (UA), a British fundamental research group (BF), and a United States fundamental research group (UF) (see Table 10). These papers were selected based on the desire to examine papers that were reasonably cited. Sets of papers having at least 50 external cites were selected for analysis in order to have a good phenomenological description.

TABLE 10

CITED PAPERS USED FOR STUDY

| GROUP | Times Cited | PAPERS |
|---|---|---|
| MA | 59 | Nair P. K. Sem. Sc. Tech. 3 (1988) 134–145 |
|  |  | Nair P. K. J Phys D - Appl Phys, 22 (1989) 829–836 |
|  |  | Nair M. T. S. Sem. Sc. and Tech. 4 (1989) 191–199 |
|  |  | Nair M. T. S. J Appl Phys, 75 (1994) 1557–1564 |
| UF | 307 | Jaeger HM, 1992, Science, V255, P1523 |
| BF | 119 | Mehta A, 1989, Physica A, V157, P1091 |
|  |  | Mehta A, 1991, Phys Rev Lett, V67, P394 |
|  |  | Barker GC, 1992, Phys Rev A, V45, P3435 |
|  |  | Mehta A, 1996, Phys Rev E, V53, P92 |
| UA | 89 | Tuttle, Prog. Photovoltaic v3, 235 (1995) |
|  |  | Gabor, Appl. Phys. Lett. v65, 198 (1994) |
|  |  | Tuttle, J. Appl. Phys. v78, 269 (1995) |
|  |  | Tuttle, J. Appl. Phys. v77, 153 (1995) |
|  |  | Nelson, J. Appl. Phys. v74 5757 (1993) |

In addition, selection and banding of variables were key aspects of the bibliometric study. While specific variable values were of interest in some cases (e.g., names of specific citing institutions), there tended to be substantial value in meta-level groupings (e.g., institution class, such as government, industry, academia). Objectives of the study were to demonstrate important variables, types of meta-level groupings providing the most information and insight, and those conditions under which non-dimensionalization became useful. However, two analyses at the micro-level were performed involving specific correlations between both citing author and references for BF and UF papers. This latter analysis was directly important for the performers of scientific research.

Manual Concept Clustering

The purpose of the manual concept clustering was to generate a taxonomy (technical category classification scheme) of the database from the quantified technical phrases extracted from the free-text record fields. To generate the database, the citing papers' Abstracts were aggregated. Computational linguistics analyses were then performed on the aggregate. Technical phrases were extracted using the Database Tomography process. An algorithm extracted all single, adjacent double, and adjacent triple word phrases from the text, and recorded the occurrence frequency of each phrase. While phrases containing trivial/stop words at their beginning or end were eliminated by the algorithm, extensive manual processing was required to eliminate the low technical content phrases. Then, a taxonomy of technical sub-categories was generated by manually grouping these phrases into cohesive categories. Intra-discipline applications, and extra-discipline impacts and applications were identified from visual inspection of the phrases.

Statistical Concept Clustering

The purpose of the statistical concept clustering was to generate taxonomies of the database semi-automatically, again from the quantified technical phrases extracted from the free-text record fields. The clustering analysis further used quantified information about the relationships among the phrases from co-occurrence data (the number of times phrases occur together in some bounded domain). The statistical clustering analyses results complemented those from the manual concept clustering, and offered added perspectives on the thematic structure of the database.

After the phrase frequency analyses were completed, co-occurrence matrices of Abstract words and phrases (each matrix element Mij was the number of times phrase or word i occurred in the same record Abstract as phrase or word j) were generated using the TechOasis phrase extraction and matrix generation software. As in the phrase frequency analysis, the phrases extracted by the TechOasis natural language processor required detailed manual examination, to eliminate the low technical content phrases. The co-occurrence matrices were input to the WINSTAT statistical clustering software, where clusters (groups of related phrases based on co-occurrence frequencies) based on both single words and multi-word phrases were generated. It should be noted that the study in this sample was performed before the development of factor matrix filtering. Future citation mining studies could use factor matrix filtering before the text clustering step.

Two types of statistical clustering were performed, high and low level. The high level clustering used only the highest frequency technical phrases, and resulted in broad category descriptions. The low level clustering used low frequency phrases related to selected high frequency phrases, and resulted in more detailed descriptions of the contents of each broad category.

High Level Clustering

The TechOasis phrase extraction from the citing Abstracts produced two types of lists. One list contained all single words (minus those filtered with a stop word list), and the other list contained similarly filtered phrases, both single and multi-word. Both lists required further manual clean-up, to insure that relatively high technical content material remained. The highest frequency items from each list were input separately to the TechOasis matrix generator, and two co-occurrence matrices, and resulting factor matrices, were generated.

The co-occurrence matrices were copied to an Excel file, and the matrix elements were non-dimensionalized. To generate clusters defining an overall taxonomy category structure for the citing papers, the Mutual Information Index was used as the dimensionless quantity. This indicator, the ratio of: the co-occurrence frequency between two phrases squared ($C_{ij}^2$) to the product of the phrase occurrence frequencies ($C_i * C_j$), incorporated the co-occurrence of each phrase relative to its occurrence in the total text. The co-occurrence matrix row and column headings were arranged in order of decreasing frequency, with the highest frequency phrase occurring at the matrix origin. Based on the intrinsic nature of word and phrase frequencies, the row and column heading frequencies decreased rapidly with distance from the matrix origin. With increasing distance from the origin, the matrix became sparser, although the phrases themselves had higher but more focused technical content. In parallel, the Mutual Information Index's values decreased rapidly as the distance from the matrix origin increased. Thus, the Mutual Information Index was useful for relating the highest frequency terms only, and for providing the top-level structural description of the taxonomy categories.

Low Level Clustering

To obtain a more detailed technical understanding of the clusters and their contents, the lower frequency phrases in each cluster were identified. A different matrix element non-dimensional quantity was required, one whose magnitudes remained relatively invariant to distance from the matrix origin. In addition, a different approach for clustering the low frequency phrases in the sparse matrix regions was required, one that related the very detailed low frequency phrases to the more general high frequency phrases that defined the cluster structure. In this way, the low frequency phrases were placed in their appropriate cluster taxonomy categories.

The method chosen to identify the lower frequency phrases started with the cluster taxonomy structure defined by grouping the higher frequency phrases using the Average Neighbor agglomeration technique and the Mutual Information Index. Then, for each high frequency phrase in each cluster, all phrases whose value of the Inclusion Index $I_i$ (the ratio of $C_{ij}$ to $C_i$ (the frequency of occurrence of phrase i in the total text)) exceeded some threshold were found. Phrase i had the lower frequency of the matrix element pair (i,j). A threshold value of 0.5 for $I_i$ was used. The resultant lower frequency phrases identified by this method occurred rarely in the text, but when they did occur, they were in close physical (and thematic) proximity to the higher frequency phrases.

The first results obtained were the citation bibliometrics. A frequency distribution of fraction of total papers in each author band vs. number of authors per paper showed that the papers citing basic research dominated the low end of the spectrum (single author), while the papers citing applied research dominated the high end (6–7 authors). The papers citing basic research (BF and UF) had a similar number of authors per paper, with a maximum in the frequency distribution at two authors per paper. The UA citing papers showed Gaussian-like authorship distribution with three and four authors per paper, while the MA group citing papers showed a distribution similar to the groups citing fundamental research papers but with fewer single-author papers. These four sets showed author distributions where 90% of the papers had less than six authors. These results confirmed the diversity of collaborative group compositions over different disciplines and levels of development.

The citing journal discipline frequency results showed that each paper set had defined its main discipline well. Also, there was a symmetry in the cross citing disciplines. UF and BF groups were cited more than 80% in fundamental journals and close to 10% in applied journals. Similarly, MA and UA groups were cited close to 50% in applied journals and 45% in fundamental journals.

The discipline distribution of the citing papers, produced by analyzing the papers' Abstracts and Titles, was slightly different from the citing journal theme distribution. These free-text fields provided far more precise information than can be obtained from the journal discipline.

In three of the four sets analyzed, the component papers were published in different years. The MA set was published from 1989 to 1994, UA from 1994 to 1995, BF from 1989 to 1996, while UF included only one paper published in 1992.

The single highly-cited paper feature of the UF set allowed additional analyses and perspectives. As time evolved, citing papers from disciplines other than those of the cited paper emerged. An important point was the four-year delay of the systematic appearance of the more applied engineering and materials science citing papers.

Most cites appeared in articles. The four analyzed sets were cited in review articles and letters.

English was the dominant language of all the paper sets analyzed.

Profiles of the citing institutions showed that academia had the highest citing rates. Industry publications cited the advances in high-technological developments, but were not citing the advances in fundamental research. Research Centers followed applied and fundamental research about equally. Direct government participation was not significant in the fields studied. Government/national laboratories were classified under research centers.

There were 44 countries represented in the citing paper sets analyzed. USA had the most cites in aggregate. India had the largest cites of the MA set; Japan had the largest cites of the UA set. The UA set contained work related to high technology, and the MA set was dedicated to explore low-cost technology. Therefore, this last set was cited by the less affluent countries of India, Romania and Mexico. India and Mexico also cited fundamental research, but not Romania. The low-cost technology papers were cited by developing countries. Developed countries cited the mostly high-technology papers.

The analysis of the most common citing authors showed that there was a close relation between the citing authors for both BF and UF groups. There was a common citing author who occupied the highest position in the frequency plot in both sets (Hermann, HJ).

In contradistinction, MA and UA had no intersection between their topics (low cost photovoltaic thin films and high efficient photovoltaic cells, respectively), from the perspective of the highest citing authors. Previous citation results have shown that applied research authors tended to cite more fundamental research, along relatively stratified lines.

There were common features in the number of references in those papers that cite the core applied and fundamental papers, but there were also some differences. For instance, at the lower end of the citing paper references distribution spectrum (0–20), the applied papers' citing papers dominated. At the higher end of the spectrum (21–50+), the fundamental papers' citing papers dominated, with the exception of a BF anomaly at 41–50.

Faraday's work (1831) appeared within the twenty papers most cited in the UF and BF citing papers. This indicated the fundamental and seminal character of the experimental work performed by Faraday. Also, Reynolds' work (1885) appeared within the twenty most cited papers in the references of the BF set. These two references also indicated the longevity of the unsolved problems tackled by the UF and BF groups.

The highest frequency co-cited papers had three interesting characteristics. They were essentially all in the same general physics area, they were all published in fundamental science journals (mainly physics), and they were all relatively recent, indicating a dynamic research area with high turnover.

The corresponding analysis of the most common references in the applied MA and UA groups showed clearly that these two groups had no correlations. However, in the detailed correlation analysis, there was one paper in the intersection of these two groups.

This ends the bibliometric analysis. The following section illustrates the usefulness of text mining analysis.

Manual Concept Clustering

The Abstract of the highly cited vibrating sand-pile paper (3) is quoted below:

> Granular materials display a variety of behaviors that are in many ways different from those of other substances. They cannot be easily classified as either solids or liquids. This has prompted the generation of analogies between the physics found in a simple sandpile and that found in complicated microscopic systems, such as flux motion in superconductors or spin glasses. Recently, the unusual behavior of granular systems has led to a number of new theories and to a new era of experimentation on granular systems.

This paper had ~300 citing papers listed in the SCI. The highest frequency single, adjacent double, and adjacent triple word phrases from the aggregate citing papers (aligned with the central themes of the cited paper) were represented by the following generic taxonomy: Theory/modeling; Experiments/measurements/instruments/variables; Structure/Properties; Phenomena.

There were hundreds of technical phrases in each taxonomy category, and those judged representative of each category were selected for the purposes of illustration. Those representative phrases (Bolded) aligned with the central themes of the aggregate citing papers offered the following intra-discipline portrait of the citing aggregate. These papers reflected a balanced theoretical/modeling effort (Molecular Dynamics Simulations, Monte Carlo Simulations, Kinetic Theory) and experimental effort (Magnetic Resonance Imaging, Charge Coupled Device Camera) targeted at studying the motions of granular particles. The papers focused on examination of the structure(s) and properties of vibrating sand-piles (Angle Of Repose, Coefficient Of Restitution), and the intrinsic phenomena of these collective systems (Collisions Between Particles, Fractional Brownian Motion), with emphasis on segregation (Size Segregation, Axial Segregation, Radial Segregation), relaxation (Relaxation Dynamics, Relaxation Time Tau), avalanching (Avalanche Durations, Avalanche Size), fluidization (Onset of Fluidization, Formation of Convection Cells), and collective behaviors (Collective Particle Motion, Self-Organized Criticality).

While the citing paper phrases mainly reflected emphasis on studies of granular piles, the phenomenological results and insights on segregation, relaxation, fluidization, avalanching, and collective behavior were extrapolated to some extra-discipline applications.

These are shown on Table 10 (sample category abbreviated record Titles follow the phrases):

TABLE 10

EXTRA-DISCIPLINE APPLICATIONS

| Category | Phrases | Titles |
| --- | --- | --- |
| geological formations and processes | (Earthquake*, Rock Avalanches, Carbonate Turbudite Deposition), | Sedimentary evolution of the early Paleocene deep-water Gulf of Biscay<br>A fragmentation-spreading model for long-runout rock avalanches |
| soil mechanics | (Soil Mechanics, Hillslope Gradient), | Evidence for nonlinear, diffusive sediment transport on hillslopes and implications for landscape morphology<br>Analysis of vertical projectile penetration in granular soils |
| industrial applications interacting object dynamics | (Screw Feeder*, Industrial), (Traffic Congestion, War Game*). | Precision dosing of powders by vibratory and screw feeders<br>Study on crowded two-dimensional airspace - Self-organized criticality<br>Derivation and empirical validation of a refined traffic flow |
| materials | (Rheolog*, Untwinned Single Crystals, Chemical Shift Tensors), | Vortex avalanches at one thousandth the superconducting transition temperature<br>Mesoscale self-assembly of hexagonal plates using lateral capillary forces |
| films | (Molecular Fluids, Adsorbed Polymer Layers), | A model for the static friction behavior of nanolubricated contacts<br>Spontaneous formation of ordered structures in thin films of metals |
| multi-phase systems | (Flow Immunosensors, Fluidized Bed*), | Advances in flow displacement immunoassay design<br>Rheophysical classification of concentrated suspensions and granular pastes<br>From bubbles to clusters in fluidized beds |
| gas dynamics | (Gas Flow, Shock Waves, Shock Front), | Statistics of shock waves in a two-dimensional granular flow<br>Scale invariant correlations in a driven dissipative gas |
| micro particles | (Pollen Exine Sculpturing, Molecular, Spinule) | The effects of genotype and ploidy level on pollen surface sculpturing in maize |
| And microscale cooperative effects | (Tokamak, Plasma*, Lattice Gas). | Sandpiles, silos and tokamak phenomenology: a brief review<br>Logarithmic relaxations in a random-field lattice gas subject to gravity |

To validate the text mining results, each of the ~300 citing paper Abstracts was read, and those Abstracts reflecting applications and extra-discipline impacts were identified. All of the applications and extra-discipline papers identified from reading the Abstracts could be identified/retrieved from examination of the anomalous text mining-derived phrases with a threshold frequency of two. The applications taxonomy of the previous section was validated using this Abstract reading and manual classification process, and judged to be a reasonable classification of the applications and extra-discipline impacts. Identification of the applications and extra-discipline impacts most unrelated to the main themes of the cited paper was easiest because of the highly anomalous nature of their representative phrases. Identification of the intra-discipline applications was the most difficult, since the phraseology used was similar to that of the cited paper themes.

The citing papers representing categories of development and disciplines aligned and non-aligned with those of the cited paper are shown in the matrix of Table 11.

TABLE 11

DEVELOPMENT CATEGORY AND CITED PAPER THEME ALIGNMENT OF CITING PAPERS

| | | TIME | | | | | | | | |
|---|---|---|---|---|---|---|---|---|---|---|
| | D/A | 1992 | 1993 | 1994 | 1995 | 1996 | 1997 | 1998 | 1999 | 2000 |
| TECH DEV | 31 | | | | | | | | | |
| APPL RES | 23 | | | | | | | 1 | 1 | 1 |
| APPL RES | 22 | | | | | 1 | | | 3 | |
| APPL RES | 21 | | | | | | 1 | 1 | | |
| BAS RES | 13 | 1 | 2 | 2 | 2 | 2 | 3 | | 1 | |
| BAS RES | 12 | | 2 | 3 | 6 | 4 | 10 | 8 | 10 | 1 |
| BAS RES | 11 | 3 | 23 | 28 | 27 | 43 | 43 | 30 | 33 | 4 |

CODE: MATRIX ELEMENT IS NUMBER OF PAPERS

In Table 11, the abscissa represents time. The ordinate, in the second column from the left, is a two-character tensor quantity, D/A, representing the level of development and the degree of alignment between the main themes of the citing and cited papers. The first number represents the level of development characterized by the citing paper (1=basic research; 2=applied research; 3=advanced development/applications), and the second number represents the degree of alignment between the main themes of the citing and cited papers (1=strong alignment; 2=partial alignment; 3=little have been subsumed within the citing journal theme. However, given the breadth of most journal themes, this result had minimal information content (e.g., citing paper X was published in a Physics journal vs. a Materials journal).

Statistical Concept Clustering

High Level Clustering

For illustrative purposes, a sample truncated co-occurrence matrix based on phrases from the ~300 citing Abstracts is shown on Table 12.

TABLE 12

PHRASE CO-OCCURRENCE MATRIX

| # Records | phrase | particles | granular | results | system | Experiments | granular materials | grains | Flow | dynamics | motion | simulations | function | number | formation | segregation |
|---|---|---|---|---|---|---|---|---|---|---|---|---|---|---|---|---|
| 45 | particles | 45 | 10 | 5 | 8 | 8 | 7 | 8 | 6 | 4 | 7 | 11 | 2 | 4 | 2 | 2 |
| 45 | granular | 10 | 45 | 5 | 4 | 8 | 4 | 8 | 8 | 4 | 6 | 3 | | 4 | 5 | 1 |
| 40 | results | 5 | 5 | 40 | 12 | 2 | 5 | 8 | 4 | 1 | 4 | 10 | 4 | 3 | 2 | 3 |
| 39 | system | 8 | 4 | 12 | 39 | 4 | 1 | 9 | 2 | 9 | 6 | 10 | 3 | 6 | 3 | 2 |
| 37 | experiments | 8 | 8 | 2 | 4 | 37 | 10 | 6 | 12 | 6 | 9 | 3 | 1 | 3 | 6 | 4 |
| 37 | granular materials | 7 | 4 | 5 | 1 | 10 | 37 | 6 | 7 | 3 | 6 | 3 | 1 | 5 | 8 | 6 |
| 37 | grains | 8 | 8 | 8 | 9 | 6 | 6 | 37 | 6 | 5 | 5 | 4 | 4 | 6 | 3 | 6 |
| 34 | flow | 6 | 8 | 4 | 2 | 12 | 7 | 6 | 34 | 5 | 7 | 2 | 4 | 2 | 5 | 4 |
| 33 | dynamics | 4 | 4 | 1 | 9 | 6 | 3 | 5 | 5 | 33 | 3 | 4 | 3 | 3 | 2 | 3 |
| 33 | motion | 7 | 6 | 4 | 6 | 9 | 6 | 5 | 7 | 3 | 33 | 3 | 3 | 4 | 4 | 1 |
| 28 | simulations | 11 | 3 | 10 | 10 | 3 | 3 | 4 | 2 | 4 | 3 | 28 | 2 | 2 | 1 | 4 |
| 25 | function | 2 | | 4 | 3 | 1 | 1 | 4 | 4 | 3 | 3 | 2 | 25 | 3 | 1 | 2 |
| 21 | number | 4 | 4 | 3 | 6 | 3 | 5 | 6 | 2 | 3 | 4 | 2 | 3 | 21 | 1 | 1 |
| 20 | formation | 2 | 5 | 2 | 3 | 6 | 8 | 3 | 5 | 2 | 4 | 1 | 1 | 1 | 20 | 2 |
| 20 | segregation | 2 | 1 | 3 | 2 | 4 | 6 | 6 | 4 | 3 | 1 | 4 | 2 | 1 | 2 | 20 | alignment). Each matrix element represents the number of citing papers in each of the nine categories.

There are three interesting features on Table 11. First, the tail of total annual citation counts is very long, and shows little sign of abating. This is one characteristic feature of a seminal paper.

Second, the fraction of extra-discipline basic research citing papers to total citing papers ranged from about 15–25% annually, with no latency period evident.

Third, a four-year latency period existed prior to the emergence of the higher development category citing papers. This correlates with the results from the bibliometrics component.

Finally, the alignment of the citing journal theme to the main theme of the cited paper was estimated for all citing papers. In essentially all cases, the citing paper theme could In the final data analysis, a clustering of the 153 highest frequency technical content phrases in the matrix rows was then performed using the Excel add-in statistical package WINSTAT.

The highest level categorization based on the highest frequency 153 phrases produced three distinct clusters: Structure/Properties, Flow-Based Experiments, Modeling and Simulation. In the description of each cluster that follows, phrases that appeared within the clusters were capitalized.

1) Structure/Properties

This cluster contained MIXTURES of LARGE GRAINS and SMALL GRAINS, with STRATIFICATION along ALTERNATING LAYERS based on SIZE SEGREGATION and grain SHAPE and GEOMETRICAL PROFILE. The MIXTURE formed a PILE with an ANGLE of REPOSE.

When the ANGLE of REPOSE was LARGER than a critical ANGLE, DYNAMICAL PROCESSES produced AVALANCHES, resulting in SURFACE FLOW within THIN LAYERS.

2) Flow-Based Experiments

This cluster contained EXPERIMENTS examining GRANULAR and SAND FLOW, The dependence of ENERGY DISSIPATION, due to COLLISIONS, on PACKING DENSITY was a focal area. The INFLUENCE of PIPE WALLS and PLATES on the SHEAR-driven VELOCITY and DENSITY PROFILES was studied, as well as ONSET of FLUIDIZATION and CONVECTIVE FLOW with its attendant FORMATION of CONVECTION CELLS.

3) Modeling and Simulation

This cluster contained MODELS and NUMERICAL SIMULATIONS based on EXPERIMENTAL RESULTS, OBSERVATIONS, MEASUREMENTS, and DATA. The SIMULATION METHODS MODELED the CHARACTERISTICS of DYNAMIC EVOLUTION from INITIAL CONDITIONS to STEADY STATE. A strong focal area was the CHARACTERISTICS of POWER SPECTRUM POWER LAW DISTRIBUTIONS, and their ROLE in the DYNAMIC EVOLUTION from INITIAL INSTABILITY to CRITICALITY. Sound PROPAGATION, especially its relation to DEPTH and PRESSURE, as a function of TIME and VIBRATION FREQUENCY, AMPLITUDE, and ACCELERATION was modeled with the statistical mechanics concepts of GRANULAR TEMPERATURE through KINETIC THEORY. Additionally, GRAVITY and VIBRATIONS were PHENOMENA used in the EQUATIONS to model the COMPACTION of GRANULAR MEDIA.

Low Level Clustering

Four types of results were obtained with the lower frequency phrases. Many of the lower frequency phrases were closely associated with one higher frequency phrase only; most lower frequency phrases were closely associated with one of the three clusters only; a few lower frequency phrases were associated with more than one cluster; and only a majority of the lower frequency phrases that related to applications or other disciplines were uniquely related to a single cluster. Sample relationships from each of these four types follow.

a) Lower Frequency Phrases Unique to One Higher Frequency Phrase (High Frequency Phrase: Low Frequency Phrases)
REPOSE: VIBRATIONAL ACCELERATIONAL AMPLITUDE; STRATIFICATION: FACETED GRAINS; FLOW: VERTICAL GLASS PIPE, KINEMATIC SIEVING; COLLISIONS: LONG-RANGE CORRELATIONS; MODEL: COUPLED NONLINEAR STOCHASTIC EQUATIONS, SELF-ORGANIZED CRITICALITY; SIMULATION: DISCRETE ELEMENT METHOD; RELAXATION: STRONG SPATIAL CLUSTERING.

The phrases in this category, on average, tended to be longer and more detailed/specific than the phrases in any of the other categories. They also tended to be the lowest frequency phrases, and their length and detail characteristics were consonant with the very lowest frequency phrases.

b) Lower Frequency Phrases Unique to One Cluster (Cluster High Frequency Phrases: Low Frequency Phrase)
LARGE GRAINS, SMALL GRAINS, REPOSE, STRATIFICATION: ALTERNATING LAYERS; COLLISIONS, CONVECTION CELLS, DISSIPATION EXPERIMENTS, FLOW, PACKING, VELOCITY PROFILES: ONSET OF FLUIDIZATION; DYNAMICS, RELAXATION: CONFIGURATIONAL ENTROPY; MODEL, SIMULATIONS: MKDV EQUATION The low frequency phrases associated uniquely with the flow-based experiments cluster tended to be associated with the largest number of high frequency phrases, whereas the low frequency phrases associated uniquely with the modeling and simulation cluster tended to be associated with the smallest number of high frequency phrases. This reflected the more closely-knit nature of the flow-based experiments cluster relative to the more diverse nature of the modeling and simulation cluster, and was confirmed by examining all the high frequency phrases in each cluster.

c) Low Frequency Phrases Shared by All Three Clusters (High Frequency Phrases: Low Frequency Phrase)
POWER LAW, EXPERIMENTS, AVALANCHE: AVALANCHE DURATIONS; SIMULATIONS, EXPERIMENTS, STRATIFICATION: CONTACT NETWORK; DYNAMICS, ONSET, AVALANCHE: TOP LAYER; MODEL, FLOW, STRATIFICATION: STATIC GRAINS As a general rule, the low frequency phrases in this category tended to be relatively generic, at least compared to phrases in the other three categories.

D) Low Frequency Phrases from Applications or other Disciplines (High Frequency Phrase(s): Low Frequency Phrase)
DENSITY WAVES: TRAFFIC FLOW; MODEL: AIR TRAFFIC; MODEL: CELL PELLETS; DYNAMICS, MODEL: DUNES; DYNAMICS, FLOW: IMMUNOSENSORS; MODEL, FLOW, AVALANCHES: GEOLOGICAL; MODEL, SIMULATION: WAR GAME; MODEL, DISSIPATION: VISCOELASTIC; GRANULAR TEMPERATURE: GAS FLUIDIZED BED; CONVECTION CELLS, EXPERIMENTS, FLOW, ONSET, VELOCITY PROFILES: TYPES OF RHEOLOGY The clustering for relating themes and concepts was exceptionally complex. The categorization taxonomies, and subsequent allocations of phrases among the categories, were functions of the agglomeration technique, association metrics, phrase extraction algorithm, and interpretation of the results. In the present study, the highest level taxonomy was essentially invariant among these parameters, and was used for the examples. Interestingly, it was not substantially different from the highest level taxonomy obtained by visual inspection of the highest frequency phrases, as reported earlier.

In summary, the first two objectives of this study were to demonstrate the feasibility of tracking the myriad impacts of research on other research, development, and applications, using the technical literature, and demonstrate the feasibility of identifying a broad range of research product user characteristics, using the technical literature. Both of these objectives were accomplished, along with some interesting technical insights about vibrating sandpile dynamics and temporal characteristics of information diffusion from research to applications.

Example 6

Literature-Based Discovery

The following steps describe the conduct of a literature-based discovery study in detail. The example chosen is finding a treatment for Raynaud's Disease, using data from the pre-1985 time frame. This is the same data used by Professor Donald Swanson in his initial literature-based discovery paper, published in 1986 (4). Since the study has not yet been performed, no final data is presented. The detailed process constitutes the example.

1) Retrieve Raynaud's literature from Medline—1966–1985

2) Generate main characteristics (taxonomies) of Raynaud's literature

3) Generate queries to define directly-related literatures

4) Retrieve directly-related literatures

5) Identify candidate discovery terms from directly-related literatures

6) Generate queries to define indirectly-related literatures

7) Retrieve indirectly-related literatures

8) Identify candidate discovery terms from indirectly-related literatures

9) Merge all discovery terms and prioritize

The key feature of the above process is the linking of directly and indirectly-related solution literatures to problem literatures by concepts. Previous approaches, such as the mainline approach of Professor Swanson, link these literatures (mainly directly related) by works or phrases. The use of concepts eliminates that severe limitations of exact work matching, and ensures that all the thematic categories/concepts identified will have been associated directly and indirectly-related literatures. No major pathways from the potential solution will be overlooked. Additionally, concepts do not need to be limited to representation by the words in the database text. Synonyms can be added to represent a concept more comprehensively. The use of advanced clustering methods, such as factor matrix filtering-multi-link clustering, is crucial to enhancing the capabilities of this approach to literature-based discovery.

Each of the above steps consists of the following sub-steps:

1) Retrieve Raynaud's literature from Medline—1966–1985

The Medline Raynaud's literature will be defined as all the records from 1966–1985 that can be retrieved using the PubMed search engine with the query "RAYNAUD'S DISEASE OR RAYNAUD[TW]". This retrieval will include records with Abstracts and records without Abstracts.

For those records without Abstracts, a pseudo-Abstract will be entered into the Abstract field. This pseudo-Abstract consists of the Mesh and Title fields combined. A validation study is being performed that will show the degree to which the pseudo-Abstract reflects the information content of the actual Abstract.

Completion of this validation study, retrieval of the 1966–1985 Medline Raynaud's records, and insertion of the pseudo-Abstract field in those records without Abstracts constitutes the first step of the plan.

2) Generate main characteristics (taxonomies) of Raynaud's literature

Perform a phrase frequency analysis of the Raynaud's records with ACCESS and TechOasis (other proven software could be used as well). Select high frequency high technical content phrases for both cases.

2A—Manual Clustering

Perform manual clustering of ACCESS phrases. Identify dependent variable intermediate literatures that can be impacted by independent variables, and add additional categories (not amenable to change by independent variables) as well. These additional categories are for completeness of the taxonomy, and will not contribute to the selection of related literatures.

2B—Statistical Clustering

Combine similar phrases using fuzzy logic and manual combination. Perform factor matrix multi-link clustering, and any other proven approaches desired.

It should be remembered that the scope and size of the directly-related categories will reflect what exists in the literature, not necessarily the intrinsic importance of the category to the problem. Based on manual and statistical clustering results, generate a final taxonomy that integrates both results.

Performance of the myriad clustering techniques on the Raynaud's records, and integration of the clustering results to generate a final taxonomy, constitutes the second step of this plan.

3) Generate queries to define directly-related literatures

3A—Stand-alone Phrases

For each major taxonomy category, select representative stand-alone phrases as query terms. These are phrases that are not ambiguous with respect to the technology of interest.

One selection criterion for query inclusion is that the ratio of Raynaud's records that contain this phrase to Medline records that contain this phrase be larger than the ratio of total Raynaud's records to total Medline records. How much larger is an open question. For intermediate literatures that are closely tied to Raynaud's, the ratio will be substantially larger. These would reflect Raynaud's-unique mechanisms. For intermediate literatures that impact many different diseases, including Raynaud's, the ratio would not be nearly as large.

Another selection criterion is that the literature that this phrase represents is disjoint from the literatures represented by phrases in other taxonomy categories. A matrix of literature overlaps is required to test for this effect. Initially, gross category overlaps will be assessed. If that number is small, then individual literature overlaps from specific phrases need not be tested. In the final query, any overlaps between the intermediate literatures and the Raynaud's literature will be eliminated with use of the NOT Boolean.

For each category, insure that the level of detail of each phrase, and the associated coverage of scope of records retrieved, is about the same. Insure that these features are the same for all categories. The objective here is to have the retrievals for each category of comparable breadth of scope.

3B—Combination Phrases

For each major taxonomy category, identify generic high frequency phrases. These are phrases that are ambiguous, but in combination with other like phrases, are transformed into combinations that are not ambiguous with respect to the technology of interest. Perform a proximity analysis around these generic theme phrases, and identify other similarly ambiguous phrases closely related to the theme phrase. Connect the theme phrase and each related phrase by the AND Boolean, and call this union a combination phrase.

One selection criterion for query inclusion of the combination phrase is that the ratio of Raynaud's records that contain this phrase to Medline records that contain this phrase be larger than the ratio of total Raynaud's records to total Medline records. How much larger is an open question. For intermediate literatures that are closely tied to Raynaud's, the ratio will be substantially larger. These would reflect Raynaud's-unique mechanisms. For intermediate literatures that impact many different diseases, including Raynaud's, the ratio would not be nearly as large.

Another selection criterion is that the literature that this phrase represents is disjoint from the literatures represented by phrases in other taxonomy categories. A matrix of literature overlaps is required to test for this effect. Initially, gross category overlaps will be assessed. If that number is small, then individual literature overlaps from specific phrases need not be tested.

For each category, insure that the level of detail of each phrase combination, and the associated coverage of scope of records retrieved, is about the same. Insure that these features are the same for all categories. The objective here is to have the retrievals for each category of comparable breadth of scope.

Identification of stand-alone and combination phrases, quantifying their actual presence in Raynaud's records relative to their expected presence, and insuring the disjointedness of each cluster literature from the other cluster literatures and the Raynaud's literature, constitutes the third step of this plan.

4) Retrieve directly-related literatures

For each taxonomy category, insert the phrases into the PubMed search engine, and retrieve the records.

Retrieval of Medline records, using phrases from each of the taxonomy categories, constitutes the fourth step of this plan.

5) Identify candidate discovery terms from directly-related literatures

Generate phrase frequency and proximity analyses for each retrieval, and combine analysis results for each category. Select phrases that have specific characteristics required (e.g., for the Raynaud's problem, phrases that would represent novel treatments or causes), subject to the constraint that the ratio of 1) records in which each phrase appears to total records in the directly-related intermediate literature (summed over the records in all its categories) be larger than the ratio of 2) total records in the directly-related intermediate literature (summed over the records in all its categories) to total records in Medline database. Using algorithm developed for full system test, compute number of categories in which each phrase appears. Rank phrases by number of categories first and sum of frequencies over categories second.

Identification of candidate discovery phrases that represent causes or novel treatments or concepts, and meet the criteria of multi-category occurrence, high frequency occurrence in aggregate over all categories, and higher occurrence in intermediate literatures than would be expected from chance alone, constitute the fifth step of the plan.

6) Generate queries to define indirectly-related literatures

Select phrases that rank high in step 5), but have the characteristics of intermediate literatures rather than treatments or causes. For example, the phrase EICOSAPENTAENOIC ACID is sufficiently specific, and has the characteristics of an independent variable (treatment), that it could be selected as a candidate discovery term. On the other hand, the phrase HYPERINSULINEMIA does not have the characteristics of an independent variable, but rather those of a dependent variable (disease over which a person does not have control). It could therefore be selected as a query term for an indirectly-related literature, with the hope that subsequent analysis of this literature could uncover independent variables that could serve as additional discovery terms (i.e., if a treatment for HYPERINSULINEMIA could be identified, then the elimination of HYPERINSULINEMIA could result in remediation of Raynaud's).

Cluster the query terms for the indirectly-related literatures. One option is to generate a square matrix whose axes are the query terms. The matrix elements represent the overlaps of the Medline literatures retrieved with each query term pair. Highly overlapping phrases (i.e., phrases that would retrieve highly overlapping literatures from Medline) would be grouped into clusters, with the goal that all clusters generated would be orthogonal (disjoint). Other approaches may be possible, depending on numbers of phrases generated, and degree of overlap. Each cluster represents a query for an indirectly-related literature.

Each indirectly-related literature cluster must be disjoint from every other indirectly-related literature cluster, as well as disjoint from every directly-related literature cluster and the Raynaud's literature. This will eliminate double-counting of records, and therefore eliminate double counting of the phrases within those records. Additionally, the phrases in each indirectly-related literature cluster must be disjoint from the phrases in the Raynaud's literature, but there is no requirement that they be disjoint from the phrases in the directly-related intermediate literatures.

Identification of phrases, quantifying their actual presence in Raynaud's records relative to their expected presence, and insuring the disjointedness of each indirectly-related cluster literature from the other directly and indirectly-related cluster literatures and the Raynaud's literature, constitutes the sixth step of this plan.

7) Retrieve indirectly-related literatures

For each phrase or phrase grouping (phrases whose Medline literatures have overlap) that has the characteristics of an intermediate literature (dependent variable amenable to influence by an independent variable), insert identified phrases or phrase groupings into PubMed search engine, and retrieve indirectly-related literatures.

Retrieval of Medline records, using phrases from each of the intermediate literature groups identified, constitutes the seventh step of the plan.

8) Identify candidate discovery terms from indirectly-related literatures

Generate phrase frequency and proximity analyses for each retrieval, and combine analysis results for each category of intermediate literature, defined by phrase groupings. Select phrases that have specific characteristics required (e.g., for the Raynaud's problem, phrases that would represent novel treatments or causes), subject to the constraint that the ratio of 1) records in which each phrase appears to total records in the indirectly-related intermediate literature (summed over the records in all its categories) be larger than the ratio of 2) total records in the indirectly-related intermediate literature (summed over the records in all its categories) to total records in Medline database. Using algorithm developed for full system test, compute number of intermediate-literature categories in which each phrase appears. Rank phrases by number of categories first and sum of frequencies over categories second.

Identification of candidate discovery phrases that represent causes or novel treatments or concepts, and meet the criteria of multi-category occurrence, high frequency occurrence in aggregate over all categories, and higher occurrence in intermediate literatures than would be expected from chance alone, constitute the eighth step of the plan.

9) Merge all discovery terms and prioritize

Combine the discovery terms from the directly-related and indirectly-related literatures. There are two levels of priority for the candidate discovery phrases from the indirectly-related literatures, and one level of priority for the candidate discovery phrases from the directly related literatures. The phrases are subject to the requirement that they must have the properties of discovery (treatment or cause in case of Raynaud's). Additionally, the phrases from the indirectly-related literatures are subject to the constraint that the ratio of 1) records in which each phrase appears to total records in the indirectly-related intermediate literature (summed over the records in all its categories) be larger than the ratio of 2) total records in the indirectly-related intermediate literature (summed over the records in all its categories) to total records in Medline database. The phrases from the directly-related literatures are subject to the constraint that the ratio of 1) records in which each phrase appears to total records in the directly-related intermediate literature (summed over the records in all its categories) be larger than the ratio of 2) total records in the directly-related intermediate literature (summed over the records in all its categories) to total records in Medline database.

For the indirectly-related literatures, the number of indirectly-related literature categories in which each candidate discovery phrase appears will be the highest priority metric, and the aggregate phrase frequency summed over the indirectly-related literature categories will be the next priority metric. For those phrases selected from the indirectly-related literatures, the number of directly-related categories that their indirectly-related categories impact are added to the number of directly-related literature categories in which they may appear, to arrive at the total number of directly-related literature categories to be used as the metric.

Additionally, the frequencies of these phrases will be summed over the categories in the indirectly-related literature, and reduced such that the sum of the frequencies of the phrases defined from the indirectly-related literatures does not exceed the sum of the frequencies of the phrases that defined the indirectly-related intermediate literature categories. The candidate discovery phrases from the indirectly-related intermediate literatures will be weighted according to their frequencies in these literatures to arrive at their final reduced frequencies. This reduced frequency will be added the frequency sum over categories in the directly-related categories to get a total frequency sum to be used for the metric.

Merging of the candidate discovery phrases from the directly-related intermediate literatures and the indirectly-related intermediate literatures, applying the metrics to the combined list of phrases, and selecting the most likely candidate phrases, constitutes the ninth step of the plan.

Example 7

Literature-Based Asymmetry Detection

The purpose of this study was to predict the bilateral asymmetry of cancer incidence in selected body organs using the frequency of organ specific cancer case reports contained in the Medline database.

Four types of cancers were examined: lung, kidney, teste, and ovary. For each cancer, all Medline case report articles were retrieved. A word factor matrix was generated for each cancer database retrieved. Similar to the factor matrix trivial text element elimination method of Example 1, and the factor matrix conflation method of Example 2, differences in the high factor loading bilateral terms were examined.

Then, for each cancer examined, records were retrieved from the Medline database that focused solely on 1) cancer of the right organ and 2) cancer of the left organ, using organ-specific queries. For example, to obtain the Medline records focused on cancer of the left kidney, the following query was used: (LEFT KIDNEY OR LEFT RENAL) AND KIDNEY NEOPLASMS AND CASE REPORT[MH] NOT (RIGHT KIDNEY OR RIGHT RENAL). The ratio of numbers of right organ to left organ articles for the period 1980–1999 was compared to actual patient incidence data obtained from the NCI's SEER database for the period 1979–1998.

The factor matrix asymmetry identification results are shown in Table 13, for the case of lung cancer. While these specific results were extracted from a thirty factor matrix, many other factor matrices were examined, and the results were similar. Table 13 contains the first 24 words from the dominant tail of Factor 1 of the thirty factor matrix. The first column is the ranking order, the second column is the word, and the third column is the factor loading of the word for Factor 1. The lateral term 'right' had a substantial factor loading of −0.376, while the lateral term 'left' had a much lower loading (in absolute value) of −0.266.

TABLE 13

FACTOR LOADINGS FOR FACTOR ONE OF THIRTY FACTOR LUNG CANCER FACTOR MATRIX

| Ranking | Factor 1 | Factor Loading |
| --- | --- | --- |
| 1 | shadow | 0.615 |
| 2 | chest | 0.599 |
| 3 | admitted | 0.579 |
| 4 | X-ray | 0.519 |
| 5 | Hospital | 0.517 |
| 6 | abnormal | 0.453 |
| 7 | transbronchial | 0.428 |
| 8 | film | 0.405 |
| 9 | right | 0.376 |
| 10 | field | 0.368 |
| 11 | biopsy | 0.347 |
| 12 | upper | 0.332 |
| 13 | shadows | 0.324 |
| 14 | admission | 0.311 |
| 15 | lobectomy | 0.306 |
| 16 | lobe | 0.293 |
| 17 | specimen | 0.293 |
| 18 | cough | 0.293 |
| 19 | lower | 0.287 |
| 20 | lung | 0.268 |
| 21 | CT | 0.268 |
| 22 | diagnosed | 0.266 |
| 23 | left | 0.266 |
| 24 | sputum | 0.259 |

The lateral asymmetries for lung cancer were expected to be significant, based on the factor loading differentials identified above. For those cancers that showed essentially identical lateral loadings (such as ovary and kidney), the asymmetries were expected to be very small.

The results from the subsequent Medline right lung only/left lung only cancer records retrieved are resented in Table 14, along with the results from the other cancers studied. The first column contains the organ in which the lateral asymmetry was studied; the second column contains the ratio of Medline case report records focused solely on right organ cancer to those focused solely on left organ cancer; and the third column contains a similar ratio obtained from the NCI SEER database of patient incidence records.

TABLE 14

RATIO OF RIGHT TO LEFT ORGAN CANCER INCIDENCE

| ORGAN | RNK | NCI |
| --- | --- | --- |
| LUNG | 1.358 | 1.395 |
| KIDNEY | 1.024 | 1.043 |
| TESTE | 1.128 | 1.134 |
| OVARY | 1.034 | 1.038 |

The agreement between the Medline record ratios and the NCI's patient incidence data ratios ranged from within three percent for lung cancer to within one percent for teste and ovary cancer.

In summary, this was the first known study to generate cancer lateral incidence asymmetries from the Medline database. A previous study (5) reported obtaining such ratios by analyzing the ratios of the phrases 'right' and 'left' from patient diagnostic records. The reason for using the secondary ratio of right/left phrase frequencies rather than the primary ratio of right/left record frequencies (i.e., ratio of actual number of patient occurrences) was unclear.

The present study results were based on the assumption that, in a large population, the number of cancer lateral incidence papers published in Medline was proportional to the actual number of cancer lateral incidence case report occurrences. The excellent agreement of the predictive model with the NCI data provided a strong measure of credibility to this assumption. Such an assumption implied that medical research reported on these cancers treated laterality as a random variable. Additionally, the factor matrix factor loading asymmetry detection technique was a sensitive indicator of potential asymmetries, and can serve as a guide to promising opportunities to pursue for uncovering asymmetries or stratification in any system where none were expected.

Obviously, many modifications and variations of the present invention are possible in light of the above teachings. It is therefore to be understood that, within the scope of the appended claims, the invention may be practiced otherwise than as specifically described.

References

1. Cattell, R. B. "The Scree Test for the Number of Factors." Multivariate Behavioral Research. 1. 245–276. 1966.
2. Xu, J. & Croft, W. B. Corpus-based stemming using cooccurrence of word variants. *ACM Transactions on Information Systems*. 16(1). Pages 61–81.
3. Jaeger, H. M., and Nagel, S. R. (1992). "Physics of the Granular State". Science. 256. 20 March, p. 1523–1531.
4. Swanson D R. 1986. Fish oil, Raynauds syndrome, and undiscovered public knowledge. *Perspectives in Biology and Medicine*. 30: 1. 7–18.
5. Goldman, J A, Chu, W W, Parker, D S, Goldman, R M: Term domain distribution analysis: a data mining tool for text databases. *Methods of Information in Medicine*. 38: 96–101. 1999.

What is claimed is:

1. A method of retrieving data, relevant to a topic of interest, from at least one collection of documents, comprising the steps of:

selecting at least one collection;

applying a test query to said at least one collection, thereby retrieving a first set of documents from said at least one collection, said test query including at least one test query term;

classifying each document in a representative sample of documents within said first set of documents according to their relevance to said topic;

extracting all phrases from said first set of documents selecting high frequency, high technical content phrases from said extracted phrases;

performing a phrase frequency analysis of at least group of said first set of documents having a greater relevance to said subject matter than other documents within said first set of documents to generate a list of phrases including phrase frequency data for each listed phrase;

grouping said selected high frequency, high technical content phrases into thematic categories;

identifying at least one anchor phrase within said phrase frequency analyzed documents for each of said thematic categories;

analyzing phrase co-occurrence of phrases in said phrase frequency analyzed documents to generate a list of co-occurrence pairs, each said co-occurrence pair consisting of an anchor phrase and another listed phrase, to generate a list of co-occurrence pairs including co-occurrence data for each listed co-occurrence pair;

combining said list of phrases with said list of co-occurrence pairs to form a list of candidate query terms;

selecting a plurality of listed query terms from said list of candidates;

applying an additional query to said at least one collection, said additional query being said plurality of said listed query terms, thereby retrieving an additional set of documents from said at least one collection;

classifying at least a representative sample of documents within said additional set of documents according to their relevance to said topic;

determining, based upon said classification of said representative sample of said additional set of documents, the ratio of relevant to non-relevant documents that are retrieved by each term of said selected plurality of listed query terms;

building a narrowed query consisting of those listed query terms within said plurality of query terms for which said ratio is above a predetermined lower limit;

applying said narrowed query to said collection, thereby retrieving another set of documents from said at least one collection.

2. The method of claim 1, wherein said ratio is equal to:

the number of times a listed query term appears in said set of relevant documents divided by the number of times said listed query term appears in said set of non-relevant documents; or the number of relevant documents including a listed query divided by the number of non-relevant documents including said listed query term.

3. The method of claim 1, further comprising the step of tagging said at least one anchor phrase and each phrase within all query terms selected for application to said collection during the selection of said plurality of listed terms from said list of candidates, said tagging distinguishing between anchor phrases, selected query terms, and non-query terms subsumed within said selected query terms.

4. The method of claim 1, further comprising the step of choosing one or more documents before selecting said at least one collection, and wherein all documents in said at least one collection cite said chosen one or more documents, or wherein all documents in said at least one collection are cited by said chosen one or more documents.

5. The method of claim 4, wherein said at least one collection consists of all documents citing said chosen one or more references, or wherein said at least one collection consists of all documents cited by said chosen one or more documents.

6. The method of claim 1, wherein at least one of said selected listed query terms is bibliographic.

7. The method of claim 6, wherein said at least one of said selected listed query terms is author name, journal name, or institution name.

8. The method of claim 6, wherein all of said selected listed query terms are bibliographic.

9. The method of claim 8, wherein said at least one of said selected listed query terms is author name, journal name, or institution name.

10. A method of determining levels of emphasis, comprising the steps of:
selecting a collection of documents, each document containing at least one unstructured field;
extracting all phrases from said unstructured field;
filtering all extracted phrases to generate a list of high technical content phrases;
generating a co-occurrence matrix of high technical content phrases for said unstructured field;
normalizing matrix cell values of said co-occurrence matrix to generate a normalized matrix for said field;
grouping phrases from said unstructured field by clustering techniques on said normalized matrix;
summing the phrase frequencies of occurrence within each group, thereby indicating a level of emphasis for each group generated from said collection.

11. The method of claim 10, wherein said normalization is achieved by equivalence index or inclusion index and said normalized matrix for said field is a normalized co-occurrence matrix.

12. The method of claim 10, wherein said normalization is achieved by standard statistical techniques and said normalized matrix for said field is a normalized correlation matrix.

13. The method of claim 12, wherein said filtering step comprises:
generating a factor matrix from said correlation matrix, each phrase being assigned a factor loading value for each factor within said factor matrix, said factor loading value representing the strength of association between said phrase and said factor;
selecting, as said high technical content phrases, phrases having a factor loading value which, for at least one of said factors, is above a threshold value.

14. The method of claim 13, wherein said filtering step further comprises:
determining, for at least one said factor, a difference in the factor loading values between more than one variant of a single phrase;
setting a threshold value for said difference, said threshold value being a value at or below which said variants are deemed to be similar;
establishing, based upon said comparison, whether said variants are similar or dissimilar with respect to said at least one factor;
conflating only said similar variants of said single phrase into a common phrase before selecting said high technical content phrases.

15. The method of claim 13, further comprising the steps of:
determining the difference between the factor loading values of two or more of said phrases in the factor matrix with respect to a single factor in said matrix;
setting a threshold value for said difference, said threshold value being a value at or below which said phrases are deemed to be similar;
establishing, based upon said comparison, whether said two or more phrases in said factor matrix are similar or dissimilar with respect to said factor.

16. The method of claim 10, wherein said collection of documents includes an additional field, and further comprising the steps of:
extracting all phrases from said additional field;
filtering all extracted phrases to generate a list of high technical content phrases;
generating a co-occurrence matrix of high technical content phrases for said additional field;
normalizing matrix cell values of said co-occurrence matrix to generate a normalized matrix for said additional field;
generating a cross-field co-occurrence matrix of high technical content phrases for said at least one field and said additional field;
normalizing matrix cell values of said cross-field co-occurrence matrix to generate normalized cross-field matrices; and
grouping phrases for each of said unstructured field by clustering techniques on each of said normalized matrices.

17. The method of claim 16, wherein said additional field is structured.

18. The method of claim 16, wherein said additional field is unstructured.

19. The method of claim 10, further comprising the step of choosing one or more documents before selecting said at least one collection, and wherein all documents in said at least one collection cite said chosen one or more documents, or wherein all documents in said at least one collection are cited by said chosen one or more documents.

20. A method of classifying documents retrieved during a collection search, comprising the steps of:
performing a phrase frequency analysis upon said documents to obtain theme and sub-theme relationships and taxonomies of all high technical content phrases in said documents.

21. A method of generating a taxonomy of a collection of documents, comprising the steps of:
selecting a collection of documents, each document containing at least one structured field;
extracting all phrases from said structured field;
factor matrix filtering all of said extracted phrases to generate a list of high technical content phrases;
generating a co-occurrence matrix of said listed phrases for said field;
normalizing cell values of said co-occurrence matrix to generate a normalized matrix for said field;
grouping said listed phrases for each said field using clustering techniques on said normalized matrix;
summing the frequencies of occurrence within each group, thereby indicating a level of emphasis for each group generated from said collection.

22. The method of claim 21, wherein said collection of documents includes an additional field, and further comprising the steps of:
extracting all phrases from said additional field
factor matrix filtering all of said extracted phrases to generate a list of high technical content phrases;
generating a co-occurrence matrix of said listed phrases for said additional field;
normalizing cell values of said co-occurrence matrices to generate a normalized matrix for said additional field;
generating at least one cross-field co-occurrence matrix for said at least one field and said additional field;
normalizing cross-field co-occurrence matrix cell values to generate a normalized cross-field matrix;
grouping said text elements for both of said fields using clustering techniques on each of said normalized matrices.

23. The method of claim 22, wherein said additional field is structured.

24. The method of claim 22, wherein said additional field is unstructured.

25. A method of literature-based problem solving, comprising the steps of:

identifying a problem;

selecting a source database comprising documents related to said problem, each of said documents including at least one unstructured field;

retrieving all documents relevant to said problem from said source database to form a set of initially retrieved documents;

extracting all phrases from said unstructured field of said set of initially retrieved documents;

factor matrix filtering all of said extracted phrases to generate a first list of high technical content phrases;

generating a co-occurrence matrix of said high technical content phrases from said first list;

normalizing matrix cell values of said co-occurrence matrix to generate a normalized matrix for said field;

grouping phrases from said unstructured field into thematic categories and subcategories by clustering techniques on said normalized matrix;

generating a directly related topical literature for each said subcategory by retrieving documents related to each of said subcategories, each said directly related topical literature being disjoint with said selected documents and with said directly related topical literature from said other subcategories, each document in each said directly related topical literature including at least one unstructured field;

extracting all phrases from said unstructured field of said directly related topical literature documents;

filtering all of said extracted phrases from said directly related topical literature documents to generate a second list of high technical content phrases;

generating a co-occurrence matrix of high technical content phrases from said second list;

normalizing matrix cell values of said co-occurrence matrix to generate a normalized matrix for said unstructured field from said topical literature documents;

grouping phrases from said unstructured field of said directly related topical literature documents into thematic categories by clustering techniques on said normalized matrix;

dividing said thematic categories into a first set of categories representing specific solutions to said problem and a second set of categories that do not represent specific solutions to said problem;

generating, for each of said second set of categories, a corresponding disjoint indirectly related literature;

extracting all phrases from each said indirectly related literature;

filtering all of said phrases extracted from said indirectly related literatures to generate a second list of high technical content phrases;

grouping said high technical content phrases from said second list into thematic categories for each said indirectly related literature, the set of categories consisting of said first set of categories and said high technical content phrases from said second list into thematic categories for each said indirectly related literature to form a set of basis categories;

generating, for each of said first set of categories, and for each of said indirectly related literature thematic categories that represent potential solutions to said problems, a third list of phrases, phrase combination, and phrase co-occurrences;

filtering said third lists to remove all phrases and phrase combinations that appear in said initially retrieved documents, thereby forming filtered third lists;

determining the number of categories and the sum of frequencies over all of said basis categories for each phrase and phrase co-occurrence on said filtered third list;

ranking said phrases and phrase co-occurrences on said filtered third list by the number of categories and the sum of frequencies over all of said basis categories.

26. The method of claim 25, further comprising the steps of:

subdividing said first set of categories, or said basis categories, into thematic sub-categories; and ranking said sub-categories for potential discovery by the number of categories in which they appear.

* * * * *